United States Patent
Ernström et al.

(10) Patent No.: US 12,416,701 B2
(45) Date of Patent: Sep. 16, 2025

(54) METHODS AND APPARATUSES TO ACCOUNT FOR TIMING ERRORS OF A USER EQUIPMENT IN POSITIONING MEASUREMENTS

(71) Applicant: Telefonaktiebolaget LM Ericsson (publ), Stockholm (SE)

(72) Inventors: Per Ernström, Stockholm (SE); Siva Muruganathan, Stittsville (CA); Erik Stare, Sollentuna (SE); Magnus Sandgren, Staffanstorp (SE); Iana Siomina, Täby (SE); Deep Shrestha, Linköping (SE); Ritesh Shreevastav, Upplands Väsby (SE); Florent Munier, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 17/924,154

(22) PCT Filed: May 12, 2021

(86) PCT No.: PCT/EP2021/062768
§ 371 (c)(1),
(2) Date: Nov. 9, 2022

(87) PCT Pub. No.: WO2021/229026
PCT Pub. Date: Nov. 18, 2021

(65) Prior Publication Data
US 2023/0184871 A1    Jun. 15, 2023

Related U.S. Application Data

(60) Provisional application No. 63/024,106, filed on May 13, 2020.

(51) Int. Cl.
*G01S 5/02* (2010.01)
*G01S 5/00* (2006.01)

(52) U.S. Cl.
CPC ............ *G01S 5/021* (2013.01); *G01S 5/0036* (2013.01); *G01S 5/0246* (2020.05)

(58) Field of Classification Search
CPC ....... G01S 5/021; G01S 5/0246; G01S 5/0036
(Continued)

(56) References Cited

U.S. PATENT DOCUMENTS 8,880,096 B2    11/2014  Rousu et al.
10,684,350 B2 *  6/2020  Dupray ................ H04W 4/029
(Continued)

FOREIGN PATENT DOCUMENTS

EP        3651511 B1 *  4/2021  ............ G01S 1/045
WO     2020088651 A1     5/2020

OTHER PUBLICATIONS

"CHO in MR-DC operation", 3GPP TSG-RAN WG3 Meeting #108-e, R3-203794, Ericsson, Online, Jun. 1-12, 2020, 2 pages.
(Continued)

*Primary Examiner* — Harry K Liu
(74) *Attorney, Agent, or Firm* — Murphy, Bilak & Homiller, PLLC

(57) ABSTRACT

Methods and apparatuses provide a mechanism to account for timing errors of a wireless device (12) in positioning measurements. In one example, a wireless device (12) performs reference-signal transmissions or measurements and sends information to a network node (20) that is involved in positioning of the wireless device (12). The information indicates associations of the reference-signal transmissions or measurements with respective timing groups of the wireless device (12). Each timing group represents a related set of transmission or reception timing
(Continued)

$$t_{A3} - t_{A2} = t_{B2} - t_{B1}$$

$$IPTD_{B-A} = t_{B1} - t_{A2} = t_{B2} - t_{A3}$$

errors within the wireless device (12). Based on the information, the network node (20) accounts for the different timing-group associations when performing positioning calculations that are based on the reference-signal transmissions or measurements performed by the wireless device (12).

20 Claims, 14 Drawing Sheets

(58) Field of Classification Search
USPC .......................................................... 342/450
See application file for complete search history.

(56) References Cited

U.S. PATENT DOCUMENTS

| | | |
|---|---|---|
| 2018/0035339 A1 | 2/2018 | Mitsui et al. |
| 2018/0180703 A1 | 6/2018 | Kim et al. |
| 2019/0208387 A1 | 7/2019 | Jiang et al. |
| 2020/0107286 A1 | 4/2020 | Akkarakaran et al. |
| 2020/0137715 A1 | 4/2020 | Edge et al. |

OTHER PUBLICATIONS

"CHO in MR-DC operation", 3GPP TSG-RAN WG3 Meeting #108-e, R3-203793, Ericsson, Online, Jun. 1-12, 2020, 6 pages.
Ericsson , "CHO and MR-DC operation", 3GPP TSG-RAN WG2 #109e, Tdoc R2-2003035, Electronic meeting, Apr. 20-30, 2020, 1-10.
"Enhancements on Timing Error Mitigations for improved Accuracy Discussion and Decision", 3GPP TSG RAN WG1 #104b-e, R1-2103170, Qualcomm Incorporated, e-Meeting, Apr. 12-20, 2021, 21 pages.
"Techniques mitigating UE Rx/Tx timing delays", 3GPP TSG-RAN WG1 Meeting #104-e, R1-2101754, Ericsson, e-Meeting, Jan. 25-Feb. 5, 2021, 21 pages.
3GPP , "3GPP TS 36.423 V16.5.0", 3rd Generation Partnership Project; Technical Specification Group Radio Access Network; Evolved Universal Terrestrial Radio Access Network (E-UTRAN); X2 application protocol (X2AP) (Release 16), Apr. 2021, 1-500.
3GPP , "3GPP TS 37.340 V16.5.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2021, 1-84.

3GPP , "3GPP TS 38.300 V16.5.0", 3rd Generation Partnership Project; Technical Specification Group Radio Access Network; NR; NR and NG-RAN Overall Description; Stage 2 (Release 16), Mar. 2021, 1-151.
3GPP , "3GPP TS 38.423 V16.5.0", 3rd Generation Partnership Project; Technical Specification Group Radio Access Network; NG-RAN; Xn application protocol (XnAP) (Release 16), Apr. 2021, 1-461.
3GPP , "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.1.0, Mar. 2020, 1-74.
3GPP , "3rd Generation Partnership Project; Technical Specification Group Radio Access Network; Evolved Universal Terrestrial Radio Access Network (E-Utran); X2 application protocol (X2AP) (Release 16)", 3GPP TS 36.423 V16.1.0, Mar. 2020, 1-438.
3GPP , "3rd Generation Partnership Project; Technical Specification Group Radio Access Network; NG-RAN; Xn application protocol (XnAP) (Release 16)", 3GPP TS 38.423 V16.1.0, Mar. 2020, 1-334.
3GPP , "3rd Generation Partnership Project; Technical Specification Group Radio Access Network; NR; NR and NG-RAN Overall Description; Stage 2 (Release 16)", 3GPP TS 38.300 V16.1.0, Mar. 2020, 1-133.
Apple Inc. , et al., "(TP for NR_Mob_enh BL CR for TS 38.423): Early Data Forwarding for CHO", 3GPP RAN WG3 Meeting #107bis-e, R3-201927, Apr. 20-30, 2020, 1-13.
Ericsson , "CHO in MR-DC operation", 3GPP TSG-RAN WG3 Meeting #107bis-e, R3-202367, Online, Apr. 20-30, 2020, 1-4.
Ericsson , "CHO in MR-DC operation", 3GPP TSG-RAN WG3 Meeting #107bis-e, R3-202780, Online, Apr. 20-30, 2020, 1-4.
Intel Corporation , "Introduction of NR mobility enhancement", 3GPP TSG-RAN WG2 Meeting #109 electronic, R2-2001748, Elbonia, Feb. 24-Mar. 6, 2020, 1-16.
3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.
Catt, "NR Positioning with DL/UL Measurements", 3GPP TSG RAN WG1 Ad-Hoc Meeting 1901, R1-1900312, Taipei, Jan. 21-25, 2019, 1-5.
Qualcomm Incorporated, "Enhancements on Timing Error Mitigations for improved Accuracy", 3GPP TSG RAN WG1 #104e, R1-2101468, e-Meeting, Jan. 25-Feb. 5, 2021, 1-12.
Zte, et al., "NR DL-TDOA positioning", 3GPP TSG RAN WG2 Meeting #107, R2-1909225, Prague, Czech, Aug. 26-30, 2019, 1-6.

* cited by examiner

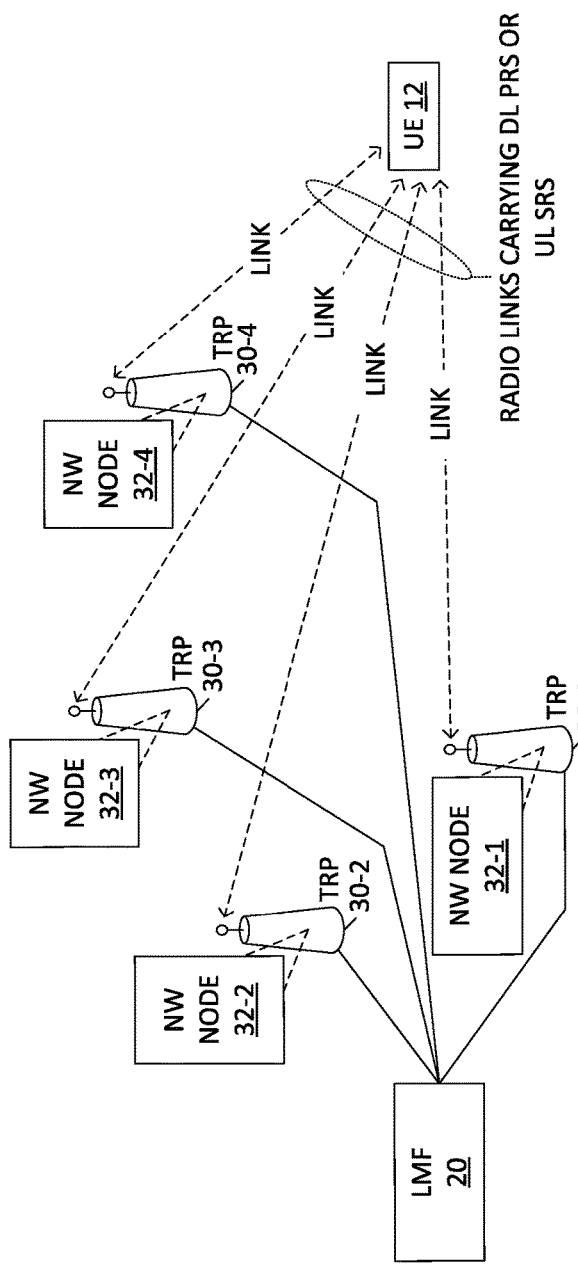
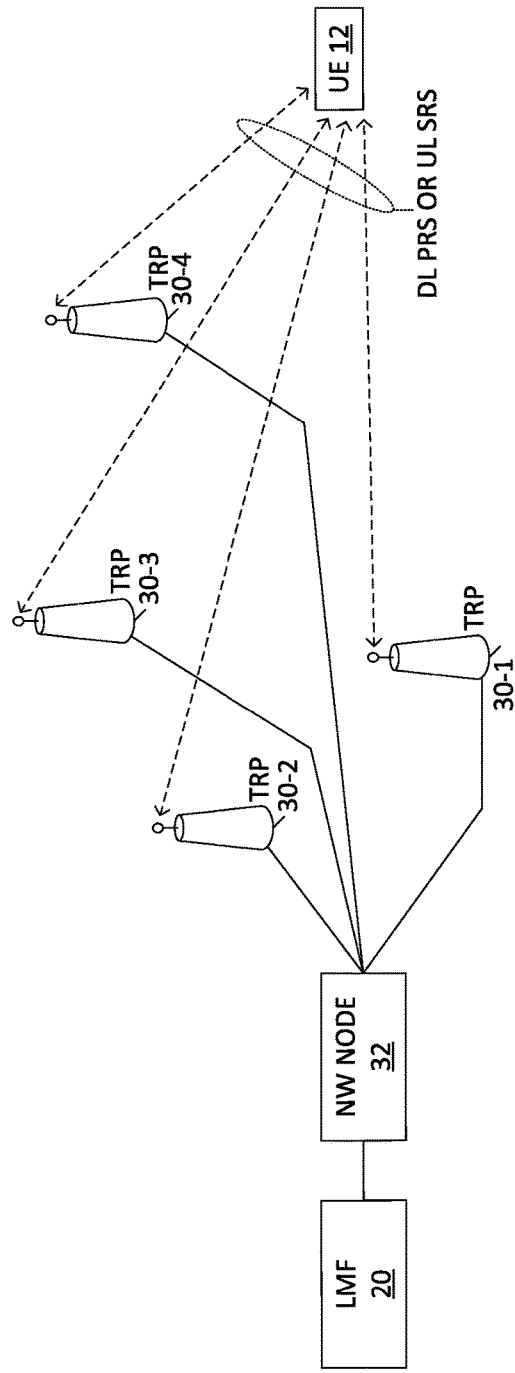

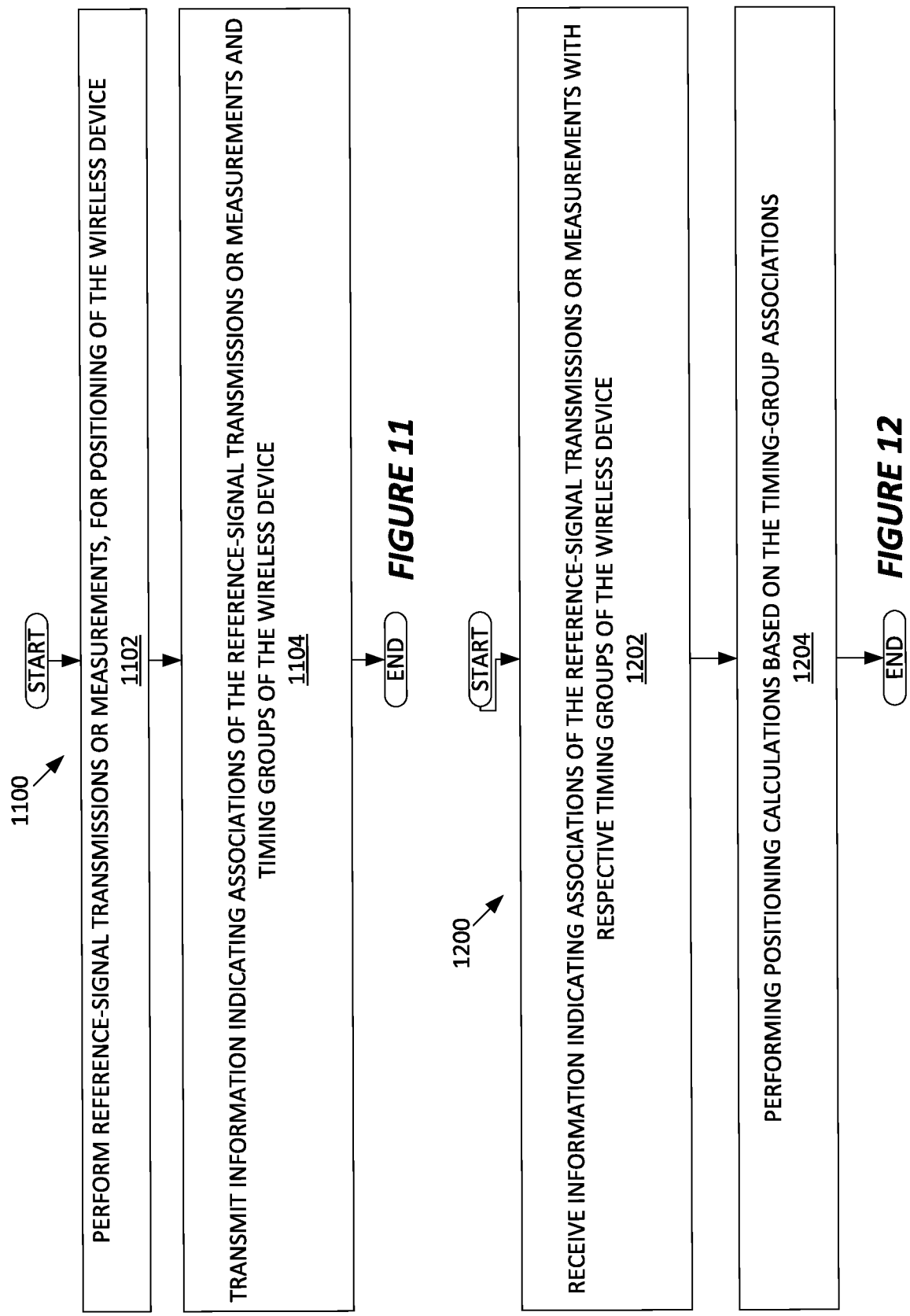

METHODS AND APPARATUSES TO ACCOUNT FOR TIMING ERRORS OF A USER EQUIPMENT IN POSITIONING MEASUREMENTS

TECHNICAL FIELD

Methods and apparatus disclosed herein account for timing errors of a User Equipment (UE) in positioning measurements.

BACKGROUND

Positioning has been a topic in Long Term Evolution (LTE) standardization since Release 9 of the Third Generation Partnership Project (3GPP) specifications. The primary objective was initially to fulfill regulatory requirements for emergency call positioning, but other use cases are becoming important, such as positioning for Industrial Internet-of-Things (I-IoT). In Fifth Generation New Radio (5G NR), the term "location management function" or "LMF" denotes the location node. There are also interactions between the location node and the gNodeB via the NRPPa protocol, where "NRPPa" denotes the NR Positioning Protocol A. The interactions between the gNodeB of an NR network and a User Equipment (UE) are supported via the Radio Resource Control (RRC) protocol, while the location node interfaces with the UE via the LTE positioning protocol (LPP). LPP is common to both NR and LTE.

In the legacy LTE standards, the following techniques are supported:

Enhanced Cell ID—Essentially, this approach is based on cell ID information to associate the device to the serving area of a serving cell, and then additional information to determine a finer granularity position.

Assisted GNSS—GNSS information retrieved by the device, supported by assistance information provided to the device from E-SMLC.

OTDOA (Observed Time Difference of Arrival)—the device estimates the time difference of reference signals from different base stations and sends to the E-SMLC for multilateration.

UTDOA (Uplink TDOA)—the device is requested to transmit a specific waveform that is detected by multiple location measurement units (e.g., an eNB) at known positions. These measurements are forwarded to E-SMLC for multilateration.

In NR Rel. 16 a number of positioning features were specified.

A new Downlink (DL) reference signal, the NR DL PRS (Positioning Reference Signal) was specified. The main benefit of this signal in relation to the LTE DL PRS is the increased bandwidth, configurable from 24 to 272 Resource Blocks (RBs), which gives a big improvement in accuracy for measuring Time of Arrival (TOA). The NR DL PRS can be configured with a comb factor of 2, 4, 6 or 12. Comb-12 allows for twice as many orthogonal signals as the comb-6 LTE PRS. The NR DL PRS can also be beamswept.

In NR Rel. 16, enhancements of the NR Uplink (UL) Sounding Reference Signals (SRS) were specified. The Rel. 16 NR SRS for positioning allows for a longer signal, up to 12 symbols (compared to 4 symbols in Rel. 15), and a flexible position in the slot (only last six symbols of the slot can be used in Rel. 15). It also allows for a staggered comb RE pattern for improved TOA measurement range and for more orthogonal signals based on comb offsets (comb 2, 4 and 8) and cyclic shifts. The use of cyclic shifts longer than the Orthogonal Frequency Division Multiplexing (OFDM) symbol divided by the comb factor, however, is not supported by Rel. 16 despite that this is the main advantage of comb-staggering, at least in indoor scenarios. Power control based on neighbor cell Synchronization Signal Block (SSB)/DL PRS is supported as well as spatial Quasi Co-Located (QCL) relations towards a Channel State Information Reference Signal (CSI-RS), an SSB, a DL PRS, or another SRS.

In NR Rel. 16 the following UE measurements are specified:

DL Reference Signal Time Difference (RSTD), allowing for e.g., DL TDOA positioning;

Multi cell UE Rx-Tx Time Difference measurement, allowing for multi cell Round-Trip-Time (RTT) measurements; and DL PRS Reference Signal Received Power (RSRP).

In NR Rel. 16, the following gNB measurements are specified:

UL Relative Time of Arrival (UL-RTOA), which is useful for UL TDOA positioning;

gNb Rx-Tx time difference, which is useful for multi cell RTT measurements;

UL SRS-RSRP; and

Angle of Arrival (AoA) and ZoA ("Z" denotes Vertical angle of Arrival).

In December 2019, a study item on positioning with focus on Industrial IoT (I-IoT) scenarios was initiated. One important problem to overcome in order to achieve the tough accuracy requirements associated with I-IoT is the positioning errors induced by UE transmission (Tx) timing errors that impact the accuracy of the UE reception-transmission (Rx-Tx) time difference measurements.

In NR Rel. 15 and Rel. 16 transmission configuration indicator (TCI) states are used for Downlink (DL) transmissions. A TCI state contains QCL properties of one or two reference signals and is used by the UE when receiving another reference signal. For every RS, the UE is provided with a TCI state, and the RSs in the TCI state serve as QCL sources when the UE receives the RS. The way the UE is provided the TCI state (the signaling mechanism) differs depending on how fast the updates need to be performed. In the NR Rel. 16 work on Multiple Input Multiple Output (MIMO) enhancements, it was proposed to mimic the DL transmission framework utilizing TCI states also for the UL in order to facilitate flexible multi-panel transmission of all channels and signals (see R1-1909225, RAN1 #98, Prague, Czech Republic, August 26th-30th). This proposal was not adopted for Rel. 16 but may appear in Rel. 17.

Example Positioning Solutions

The following example is for multi-RTT based positioning, but analogous methods can be used also for UL/DL TDOA based positioning.

The distance from the UE to transmission and reception point (TRP) number k can be written as $$d^k(\bar{p}) = |\bar{p} - \bar{r}^k| = \sqrt{\sum_{i=1}^{3}(p_i - r_i^k)^2}$$

where $\bar{p}=(p_1 p_2 p_3)$ is the unknown UE position and $\bar{r}^k=(r_1^k r_2^k r_3^k)$ is the known position of TRP k.

To find the UE position $\bar{p}$ based on estimates $$d^k = c \cdot \frac{RTT^k}{2}$$

of the distances between the UE and the k TRPs can be viewed as solving the overdetermined equation system $$d^k = \sqrt{\sum_{i=1}^{3}(p_i - r_i^k)^2}$$

for $\bar{p}$.

There exist many ways to solve overdetermined equation systems like this. One class of solutions utilize optimization techniques based on a cost function constructed as follows.

$$f(\bar{p}) = \sum_{k=1}^{N} w^k \cdot g\left(\left|d^k - \sqrt{\sum_{i=1}^{3}(p_i - r_i^k)^2}\right|\right)$$

where g, referred to here as the 'elemental cost function', is an increasing function of real numbers larger than or equal to zero and $w^k$ is a weight. By minimizing the cost function $f(\bar{p})$ an approximate solution is found to the overdetermined equation system. As an example, the elemental cost function g can be chosen as $g(x)=x^2$ and the weights $w^k$ could all be set to 1, in which case the minimization of $f(\bar{p})$ gives the least squares solution to the overdetermined equation system. To make the solution more robust towards outliers (e.g., due to that some Transmission Reception Points (TRPs) may be Non Line of Sight (NLOS), g can be selected to flatten out for large x, e.g., as $g(x)=1-\text{sech}(\omega \cdot x)$ where $\omega$ controls the steepness of the function. The weights $w^k$ could be set, e.g., to account for differences in measurement uncertainty in $d^k$ for the different TRPs.

For two-dimensional (2D) positioning, the UE vertical positioning is assumed to be known. What was described above works also for this case with the change that $p_3$ is known and thus the overdetermined equation system is solved only for $p_1$ and $p_2$ and consequently optimization of $f(\bar{p})$ is only done over $p_1$ and $p_2$.

SUMMARY

Methods and apparatuses provide a mechanism to account for timing errors of a wireless device in positioning measurements. In one example, a wireless device performs reference-signal transmissions or measurements and sends information to a network node that is involved in positioning of the wireless device. The information indicates associations of the reference-signal transmissions or measurements with respective timing groups of the wireless device. Each timing group represents a related set of transmission or reception timing errors within the wireless device. Based on the information, the network node accounts for the different timing-group associations when performing positioning calculations that are based on the reference-signal transmissions or measurements performed by the wireless device.

In one or more embodiments described in this disclosure, positioning accuracy is improved by any one or more of: utilizing multiple measurements towards the same TRP but based on different UE antenna panels for SRS transmissions and/or UE RSTD/UE Rx-Tx time difference measurements; knowledge of what UE antenna panel has been used for SRS transmissions and/or UE RSTD/UE Rx-Tx time difference measurements, with such knowledge coming from signaling to give such knowledge to the positioning node and/or control through signaling or pre-configuration of what UE antenna panel is used for SRS transmissions and/or UE RSTD/UE Rx-Tx time difference measurements; and signaling to the network (e.g., the location server) of UE Tx and/or Rx timing errors for UE antenna panels or error differences between different panels, known by the UE. Here, "antenna panels" are an example antenna configuration and, more broadly, the UE has multiple antennas—e.g., multiple antenna panels—and there are path delay differences—timing differences—internal to the UE, as between the different antennas.

Mechanisms for avoiding or reducing the signal-timing measurement errors that arise from the timing differences between the different antennas include, in the example context of the different antennas being different antenna panels, any one or more of: (1) restricting which UE antenna panel to use for SRS transmission through SRS configuration; (2) beam and panel sweeping of the SRS; (3) reporting of which UE antenna panel that is used for each SRS transmission; (4) performing multiple UE RSTD/UE Rx-Tx time difference measurements towards the same TRP but utilizing different UE antenna panels; (5) reporting of which UE antenna panel that was used for each UE RSTD/UE Rx-Tx time difference measurement; (6) indicating implicitly or explicitly (e.g., sending an indication) whether the same or different antenna panels were used for the different measurement components comprising the same RSTD measurement; (7) performing UE Inter Panel Time Difference measurements; (8) estimating systematic errors related to RX/TX timing errors for different UE antenna panels; (9) forming measurement differences for which systematic errors related to RX/TX timing errors cancel out; (10) identifying the suitable antenna panel for SRS transmission and/or RSTD/UE Rx-Tx measurements; (11) the network node controlling of whether the UE is allowed or not to use different antenna panels for two different components comprising the same measurement, e.g., by sending a controlling parameter or indicator (e.g., "allowed" or "not allowed") in the assistance data or measurement configuration—with such control impacting how the measurement is performed or how the measurement is reported (e.g. may need to be compensated with respect to a reference antenna panel); and (12) compensating to achieve performance of a "reference" antenna panel among the different antenna panels.

When different panels are used for different components comprising the same measurement, the UE may select one of the different antenna panels as a reference panel configuration (e.g., based on a pre-defined rule or based on a network configuration such as using as a reference the antenna panel configuration of the reference TRP or reference PRS) and compensate one or both of the components comprising the measurement to achieve such an effect on the component(s) as if it(they) were performed based on the reference antenna panel.

Another example embodiment comprises a method of accounting for path delay differences internal to a User Equipment (UE) as between different antennas of the UE in signal-timing measurements made for signals transmitted between the UE and a plurality of transmission/reception points (TRPs) of a wireless communication network for positioning of the UE. The method includes at least one of:

avoiding the introduction of systemic errors arising from the internal path delay differences by coordinating, such as by signaling, which antenna is used at the UE with respect to each TRP among the involved TRPs or with respect to each radio resource among a plurality of radio resources configured for conveyance of the signals; and accounting for the systemic errors in positioning-related calculations that are on the signal-timing measurements.

In another example embodiment, UE configured for operation with respect to a wireless communication network includes communication interface circuitry configured for transmitting and receiving signals according to a Radio Access Technology (RAT) of the wireless communication network. The UE further includes processing circuitry that is operatively associated with the communication interface circuitry and configured to perform at least one of: (a) performing signal-timing measurements involving downlink signals received on different antennas of the UE and compensating the measurements for path delay differences internal to the UE as between the different antennas, and reporting the compensated measurements to the network and/or using them at the UE for positioning-related calculations; (b) performing signal-timing measurements involving downlink signals received on different antennas of the UE and reporting the measurements to the network for positioning-related calculations, along with reporting path delay differences internal to the UE as between the different antennas, for network-based compensation of the measurements; and (c) transmitting uplink signals from the different antennas for use in positioning-related calculations by the network and reporting transmit-path delay differences between the different antennas of the UE.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 4 and 5 are block diagrams of example details for the network of FIG. 3.

FIG. 11 illustrates another example method according to one or more embodiments.

FIG. 12 illustrates another example method according to one or more embodiments.

DETAILED DESCRIPTION

Figure 1:
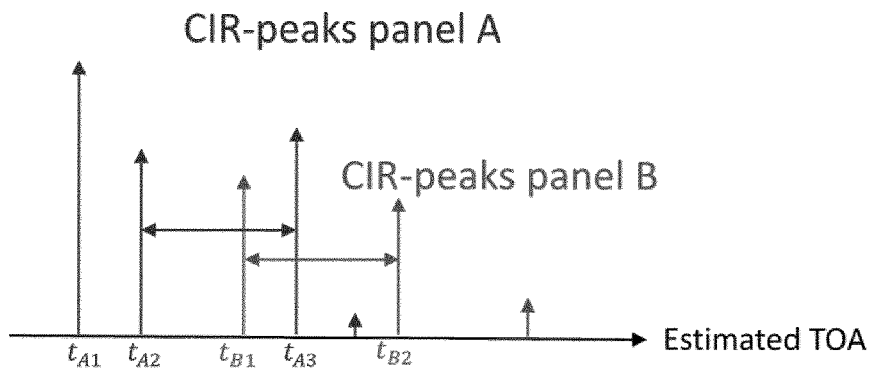
FIGS. 1 and 2 are diagrams of example relationships and signal processing that may be used for detecting Line-of-Sight (LoS) propagation paths, in the context of positioning a User Equipment (UE) using measurements on radio signals going between the UE and one or more Transmission/Reception Points (TRPs) of a wireless communication network.

Signal-timing measurements made using multiple receive and/or transmit antennas of a UE are influenced by the internal path delays of the UE with respect to the different antennas. Specifically, to the extent that the measurements involve signal reception or transmission using the different antennas, differences in the internal path delays associated with the different antennas introduce a source of errors in the measurements. For example, time-of-arrival measurements for a signal impinging on two different antennas of the UE will reflect any differences in the path delays internal to the UE with respect to the different antennas. RX and TX timing-measurements, for example, are dependent on internal path delays of the UE with respect to the antenna(s) used for signal reception/transmission. Path refers to a propagation path between a transmission point and a UE but can also refer to the peak in the power delay profile of the channel impulse response (CIR) corresponding to the propagation path.

In an example case, the different antennas are different "antenna panels" of the UE. Especially for high frequencies a UE may have multiple antenna panels. Millimeter-wave Mobile BroadBand (MBB) UEs today typically have three antenna panels on different sides of the UE, each consisting of four dual polarized antenna elements. Today's UEs select one of the antenna panels for transmission. The delay between baseband timing and the actual RX/TX timing at the antenna panel may differ between different panels, for example, because of different group delays in the circuit paths coupling to the respective antenna panels. These delays may to some extent be known based on a theoretical calculation of the delays and/or based on measurements performed on individual UEs. The known part of the delays could be compensated for by "calibrating" the UE to adapt its baseband TX timing accordingly depending on what antenna panel is used for the transmission. Similarly, the UE could be calibrated to take the known delays into account in TOA measurements depending on what antenna panel is used for the reception.

However, the knowledge of the delays will not be exact, especially since delays may vary with time. And calibration of individual UE is a costly undertaking. Consequently, UE RX/TX timing as defined at the antenna will not be exact and it will vary between UE antenna panels. The delay differences—also referred to as inter-antenna timing differences—cause errors in received-signal-time-difference (RSTD) measurements in instances where the measurements involve different UE antenna panels for reception of the Downlink (DL) Reference Signals (RS) used for the Time-of-Arrival (TOA) measurements. For example, consider an example case where the UE uses a first antenna panel for receiving DL RS from one Transmission/Reception Point (TRP) of a wireless communication network, and uses a second antenna panel for receiving DL RS from another TRP of the network—e.g., the UE may select the "best" panel to use with respect to different TRPs.

To the extent that the two antenna panels have different path delays internal to the UE, the differences in TOA as measured using signals received on the first panel versus signals received on the second panel include, as an error term, the inter-panel timing differences internal to the UE. Thus, DL TDOA measurements for positioning calculation are impacted. Inter-antenna timing differences may also introduce errors on the Uplink (UL), such as when a UE uses different antennas to transmit Sounding Reference Signals (SRS), for UL TOA measurements at multiple TRPs of the network.

That is, the receiver paths internal to the UE for different antennas may have timing differences that affect received-signal timing measurements made by the UE (the DL direction). Further, the transmitter paths internal to the UE for the different antennas may have timing differences that affect received-signal timing measurements made by the network with respect to UL signals transmitted by the UE from different ones of the antennas. The receiver-path timing differences may or may not be the same as the transmitter-path timing differences. Some types of measurements, such as Round-Trip-Time (RTT) measurements involve both UL and DL signals and are affected by both the timing differences in the receive direction and the timing differences in the transmit direction.

A UE may be configured with an UL RS (given e.g., by RS type and ID) to use for: (a) the time to use for deciding the TX frame timing in the UE Rx-Tx Time difference measurement; or (b) the spatial precoding or antenna panel to use for deciding the TX frame timing in the UE Rx-Tx Time difference measurement. The UE adjusts the UE Rx-Tx time difference measurement result to account for timing adjustments or the spatial precoding used for the UL RS and/or antenna panel used for the UL RS. Here and throughout this disclosure unless noted otherwise or unless excluded as a matter of context, the word "or" means "and/or," such that saying "A or B" allows for only "A," only "B," and "A and B." Any usage of "and/or" does not change the general understanding of the word "or" as used herein.

Systematic errors arising from inter-antenna timing differences can have a very large impact on positioning accuracy, particularly when aiming for submeter positioning accuracy. For example, assume that for each UE antenna panel m of M UE antenna panels, there are RTT based distance estimates $$d^{k,m} = \frac{c \cdot RTT^{k,m}}{2} \quad \begin{array}{l} m = 1, 2, \ldots, M \\ k \in \mathbb{S}(m) \end{array}$$

towards a subset $$\mathbb{S}(m) \subseteq \{1, 2, \ldots, N\}$$

of N TRPs of a wireless communication network.

The problem of finding the position of the UE can then be formulated as an over determined equation system $$d^{k,m} = \sqrt{\sum_{i=1}^{3}(p_i - r_i^k)^2} \quad \begin{array}{l} m = 1, 2, \ldots, M \\ k \in \mathbb{S}(m) \end{array}$$

where $$\bar{p} = (p_1 p_2 p_3)$$

is the unknown UE position
and $$\bar{r}^k = (r_1^k r_2^k r_3^k)$$

is the known position of TRP k.

Because of the inter-panel timing differences—i.e., the differences in the path delays internal to the UE with respect to the different antenna panels—the estimates $d^{k,m}$ have an unknown systematic error $\varepsilon^m = \varepsilon_{RX}^m + \varepsilon_{TX}^m$, which is the same for all $k \in \mathbb{S}(m)$ for a given m. In the below discussion some alternative solutions to take advantage of this fact are given. One may assume here that the same antenna panel is used for RX of the DL Positioning Reference Signal (PRS) used for the UE RX-TX time difference measurement and for the TX of the SRS used for the gNB RX-TX time difference measurement, but the solutions are easily generalized to the case where different panels are used for RX and TX.

Consider an approach based on using a reference TRP—a selected or specified one of the involved TRPs—for each UE antenna panel to cancel systematic errors. For each UE antenna panel m select one reference TRP h(m) for which there exists a distance estimate, i.e., which is part of $\mathbb{S}(m)$: $h(m) \in \mathbb{S}(m)$.

Create a new overdetermined equation system by subtracting, from each distance estimate, the distance estimate of the reference TRP for the corresponding UE antenna panel $$d^{k,m} - d^{h(m),m} = \sqrt{\sum_{i=1}^{3}(p_i - r_i^k)^2} - \sqrt{\sum_{i=1}^{3}(p_i - r_i^{h(m)})^2} \quad \begin{array}{l} m = 1, 2, \ldots, M \\ k \in \mathbb{S}(m) \; k \neq h(m) \end{array}$$

The subtraction cancels the systematic error which is common within one UE antenna panel at the cost of losing one equation for each UE antenna panel.

There exist many ways to solve overdetermined equation systems like this. One class of solutions utilize optimization techniques based on a cost function constructed as follows.

$$f(\bar{p}) = \sum_{m=1}^{M} \sum_{k \in \mathbb{S}(m)} w^k \cdot g\left(\left| d^{k,m} - d^{h(m),m} - \sqrt{\sum_{i=1}^{3}(p_i - r_i^k)^2} + \sqrt{\sum_{i=1}^{3}(p_i - r_i^{h(m)})^2} \right|\right)$$

where g, referred to here as the "elemental cost function", is an increasing function of real numbers larger than or equal to zero and $w^k$ is a weight. By minimizing the cost function $f(\bar{p})$ an approximate solution is found to the overdetermined equation system. As an example, the elemental cost function g can be chosen as $g(x) = x^2$ and the weights $w^k$ could all be set to 1, in which case the minimization of $f(\bar{p})$ gives the least squares solution to the overdetermined equation system. The weights $w^k$ could be set, for example, to take into account differences in measurement uncertainty in $(d^{k,m}-d^{h(m),m})$.

Another example involves estimating the systematic errors as part of positioning based on introducing an unknown variable $\varepsilon^m$ for the systematic timing error corresponding to each UE antenna panel m. The overdetermined equation system can then be written as $$d^{k,m} - \varepsilon^m = \sqrt{\sum_{i=1}^{3}(p_i - r_i^k)^2} \quad \begin{matrix} m = 1, 2, \ldots, M \\ k \in \mathbb{S}(m) \end{matrix}$$

where one now has 3+M unknowns $\bar{p}=(p_1 p_2 p_3)$ and $\bar{\varepsilon}=(\varepsilon^1, \varepsilon^2, \ldots, \varepsilon^M)$ (or 2+M unknowns $p_1$, $p_2$, $\varepsilon^1$, $\varepsilon^2$, ..., $\varepsilon^M$ for two-dimensional (2D) positioning).

There exist many ways to solve overdetermined equation systems like this. One class of solutions utilize optimization techniques based on a cost function constructed as follows.

$$f(\bar{p}, \bar{\varepsilon}) = \sum_{m=1}^{M} \sum_{k \in \mathbb{S}(m)} w^k \cdot g\left(\left|d^{k,m} - \varepsilon^m - \sqrt{\sum_{i=1}^{3}(p_i - r_i^k)^2}\right|\right)$$

where g, referred to here as the 'elemental cost function', is an increasing function of real numbers larger than or equal to zero and $w^k$ is a weight. By minimizing the cost function $f(\bar{p})$ an approximate solution is found to the overdetermined equation system. As an example, the elemental cost function g can be chosen as $g(x)=x^2$ and the weights $w^k$ could all be set to 1, in which case the minimization of $f(\bar{p}, \bar{\varepsilon})$ gives the least squares solution to the overdetermined equation system. In order to make the solution more robust towards outliers (e.g., due to that some TRPs may be NLOS) g could be selected to flatten out for large x, e.g., as $g(x)=1-\mathrm{sech}(\omega \cdot x)$ where $\omega$ controls the steepness of the function. The weights $w^k$ could be set e.g., to take into account differences in measurement uncertainty in $d^k$ for the different TRPs.

This solution has the benefit of being robust against outliers as described above and also by allowing for weights related to a single TRP rather than pairs of TRPs.

Another approach involves estimate systematic errors first to reduce complexity. For example, if for a TRP k there exist measurements utilizing more than one antenna panel that can be used to reduce the number of unknowns in the equation system $$d^{k,m} - \varepsilon^m = \sqrt{\sum_{i=1}^{3}(p_i - r_i^k)^2} \quad \begin{matrix} m = 1, 2, \ldots, M \\ k \in \mathbb{S}(m) \end{matrix}$$

and thereby reduce the complexity in the positioning step. Assume that for TRP k there exist measurements $d^{k,a}$ and $d^{k,b}$. One may then find $d^{k,a}-\varepsilon^a=d^{k,b}-\varepsilon^b$ or $\varepsilon^b=d^{k,b}-d^{k,a}+\varepsilon^a$ One may use such findings to remove the unknown $\varepsilon^b$ from the equation system and also from the cost function above. Doing so saves complexity in the positioning step but may reduce positioning accuracy since all information is not necessarily taken into account in an optimal way.

More generally, for a given TRP k, let $\mathbb{M}(k)$ be the set of UE panels for which there exist RTT based distance estimates $$d^{k,m} = \frac{c \cdot RTT^{k,m}}{2} \quad \begin{matrix} k = 1, 2, \ldots, N \\ m \in \mathbb{M}(k) \end{matrix}$$

and define a reference antenna panel p(k) for each TRP k as $p(k)=\min(\mathbb{M}(k))$.

and sets of non-reference TRPs $\mathbb{M}'(k)=\mathbb{M}(k)-\{p(k)\}$. We then have $$\varepsilon^m - \varepsilon^{p(k)} = d^{k,m} - d^{k,p(k)} \begin{Bmatrix} k = 1, 2, \ldots, N \\ m \in \mathbb{M}'(k) \end{Bmatrix}$$

$$d^{k,p(k)} - \varepsilon^{p(k)} = \sqrt{\sum_{i=1}^{3}(p_i - r_i^k)^2} \quad \{k = 1, 2, \ldots, N\}$$

One may use these equations to solve for as many of the unknown systematic errors $\varepsilon^m$ as possible before using the full equation system for positioning.

Considering possible reformulations of the equation system, the overdetermined equation system can be reformulated in many mathematically equivalent ways. Using the preceding nomenclature, the equation system can be written as $$\varepsilon^m = d^{k,m} - d^{k,p(k)} + \varepsilon^{p(k)} \begin{Bmatrix} k = 1, 2, \ldots, N \\ m \in \mathbb{M}'(k) \end{Bmatrix}.$$

Similarly, the cost function could be constructed in many alternative ways, e.g., as $$f(\bar{p}, \bar{\varepsilon}) = \sum_{k=1}^{N} \sum_{m \in \mathbb{M}'(k)} w^{k,m} \cdot g\left(\left|\varepsilon^m - \varepsilon^{p(k)} - d^{k,m} - d^{k,p(k)}\right|\right) + \sum_{k=1}^{N} w^k \cdot g\left(\left|d^{k,p(k)} - \varepsilon'^{p(k)} - \sqrt{\sum_{i=1}^{3}(p_i - r_i^k)^2}\right|\right)$$

Note that $d^{k,m}-d^{k,p(k)}$ may be interpreted as an Inter Panel Time Difference (IPTD) measurement. The IPDT between panel m and panel n is $\varepsilon^{m,n} \equiv \varepsilon^m - \varepsilon^n$.

Now consider an example solutions to improve UL/DL TDOA positioning accuracy based on UE antenna panel info and assume that for each UE antenna panel m of the M UE antenna panels, there are TOA measurements towards a subset $\mathbb{S}(m)$ of the TRPs.

Select one TRP and one antenna panel as reference. One may assume without loss of generality that the reference TRP is TRP 1, the reference antenna panel is panel 1 and that there is a TOA measurement for the reference TRP using antenna panel 1. Note that one can always renumber the TRP's and the antenna panels and modify formulas accordingly.
Define $$S'(m) = \begin{cases} S(m) & m \neq 1 \\ S(1) - \{1\} & m = 1 \end{cases}$$

One can then form TOA estimates $\delta^{k,m}$ relative to the TOA of the reference TRP (TRP 1) and reference antenna panel (antenna panel 1) as $$\delta^{k,m} = c \cdot (TOA^{k,m} - TOA^{1,1}) \begin{cases} m = 1, 2, \ldots, M \\ k \in S'(m) \end{cases}$$

Note that for $k \neq 1$, this is simply RSTD measurements towards the non-reference-TRPs utilizing different UE antenna panels $$\delta^{k,m} = c \cdot RSTD^{k,m}$$

$\delta^{1,m}$, for $m \neq 1$, are not normal RSTD measurements but estimates of the difference in reference TRP TOA using different antenna panels compared to using the reference antenna panel. As above, these measurements made be referred to as IPTD measurements. Note also that $\delta^{1,1} \equiv 0$ and is therefore excluded by excluding TRP 1 from S'(1).

The problem of finding the position of the UE can then be formulated as an over determined equation system $$\delta^{k,m} = \sqrt{\sum_{i=1}^{3}(p_i - r_i^k)^2} - \sqrt{\sum_{i=1}^{3}(p_i - r_i^1)^2} \begin{cases} m = 1, 2, \ldots, M \\ k \in S'(m) \end{cases}$$

where $$\bar{p} = (p_1 p_2 p_3)$$

is the unknown UE position, and $$\bar{r}^k = (r_1^k r_2^k r_3^k)$$

is the known position of TRP k.

It is known that the measurements $TOA^{k,m}$ have a systematic error which is the same for all $k \in S(m)$ for a given m. Consequently, also the estimates $\delta^{k,m}$ have a systematic error which is the same for all $k \in S(m)$ for a given m. Furthermore, the systematic error is zero for $\delta^{k,1}$ for all $k \in S(1)$.

In an approach that involves estimating the systematic errors as part of positioning, one may introduce an unknown variable $\varepsilon^m$ for the systematic error corresponding to each UE antenna panel except for the reference antenna panel, i.e. for $m = 2, \ldots, M$. Also define $\varepsilon^1 \equiv 0$. The overdetermined equation system can then be written as $$\delta^{k,m} - \varepsilon^m = \sqrt{\sum_{i=1}^{3}(p_i - r_i^k)^2} - \sqrt{\sum_{i=1}^{3}(p_i - r_i^1)^2} \begin{cases} m = 1, 2, \ldots, M \\ k \in S'(m) \end{cases}$$

where we now have 3+M−1 unknowns $$\bar{p} = (p_1 p_2 p_3)$$

and $$\bar{\varepsilon} = (\varepsilon^2, \varepsilon^3, \ldots, \varepsilon^M)$$

(or 2+M−1 unknowns $p_1$, $p_2$, $\varepsilon^2$, $\varepsilon^3$, ..., $\varepsilon^M$ for 2D positioning).

There exist many ways to solve overdetermined equation systems like this. One class of solutions utilize optimization techniques based on a cost function constructed as follows.

$$f(\bar{p}, \bar{\varepsilon}) = \sum_{k=1}^{N} \sum_{m \in S'(m)} w^{k,m} \cdot g\left(\left|\delta^{k,m} - \varepsilon^m - \sqrt{\sum_{i=1}^{3}(p_i - r_i^k)^2} + \sqrt{\sum_{i=1}^{3}(p_i - r_i^{ref})^2}\right|\right)$$

where g, referred to here as the 'elemental cost function', is an increasing function of real numbers larger than or equal to zero and $w^{k,m}$ is a weight. By minimizing the cost function $f(\bar{p})$ an approximate solution is found to the overdetermined equation system. As an example, the elemental cost function g can be chosen as $g(x) = x^2$ and the weights $w^{k,m}$ could all be set to 1, in which case the minimization of $f(\bar{p}, \bar{\varepsilon})$ gives the least squares solution to the overdetermined equation system. The weights $w^{k,m}$ could be set, for example, to take into account differences in measurement uncertainty in $\delta^{k,m}$.

One may first solve for some of the unknowns $\varepsilon^m$ before positioning in order to reduce complexity in the positioning step.

In an example approach that relies on estimating the systematic errors and UE clock offset as part of positioning, one may use the overdetermined equation system as used when estimating the systematic errors above, but further introduce an additional unknown variable d for the line of sight distance to the reference TRP and an equation $$d = \sqrt{\sum_{i=1}^{3}(p_i - r_i^1)^2}.$$

One may note that if the reference TRP is line of sight, c·d may be interpreted as the UE clock offset relative to the reference TRP.

By substituting d for $\sqrt{\sum_{i=1}^{3}(p_i - r_i^1)^2}$ in the overdetermined equation system and noting that $\delta^{1,1} \equiv 0$ and $\varepsilon^1 \equiv 0$, one can write the new overdetermined equation system as $$\delta^{k,m} - \varepsilon^m + d = \sqrt{\sum_{i=1}^{3}(p_i - r_i^k)^2} \begin{cases} m = 1, 2, \ldots, M \\ k \in S(m) \end{cases}$$

where there are now 3+M unknowns $$\bar{p} = (p_1 p_2 p_3),$$

$$\bar{\varepsilon} = (\varepsilon^2, \varepsilon^3, \ldots, \varepsilon^M)$$

and d, or 3+M−1 for 2D positioning.

There exist many ways to solve overdetermined equation systems like this. One class of solutions utilize optimization techniques based on a cost function constructed as follows.

$$f(\overline{p}, \overline{\varepsilon}, d) = \sum_{m=1}^{M} \sum_{k \in \mathbb{S}(m)} w^{k,m} \cdot g\left(\left|\delta^{k,m} - \varepsilon^m + d - \sqrt{\sum_{i=1}^{3}(p_i - r_i^k)^2}\right|\right)$$

where g, referred to here as the "elemental cost function", is an increasing function of real numbers larger than or equal to zero and $w^k$ is a weight. By minimizing the cost function $f(\overline{p}, \overline{\varepsilon}, d)$ an approximate solution is found to the overdetermined equation system. As an example, the elemental cost function g can be chosen as $g(x)=x^2$ and the weights $w^k$ could all be set to 1, in which case the minimization of $f(\overline{p}, \overline{\varepsilon}, d)$ gives the least squares solution to the overdetermined equation system. In order to make the solution more robust towards outliers (e.g., due to that some TRPs may be NLOS) g could be selected to flatten out for large x, for example, as $g(x)=1-\text{sech}(\omega \cdot x)$ where $\omega$ controls the steepness of the function. The weights $w^{k,m}$ could be set, for example, to account for differences in measurement uncertainty in $TOA^{k,m}$ for the different TRPs.

This solution has the benefit of allowing for the solution for robustness against outliers described above and also allowing for weights related to a single TRP rather than pairs of TRPs.

One may first solve for some of the unknowns $\varepsilon^m$ before positioning in order to reduce complexity in the positioning step. This can also be viewed as making IPTD measurements and using them as estimates of the inter panel time differences $\varepsilon^{m,n} \equiv \varepsilon^m - \varepsilon^n$.

Now consider example solutions for control and reporting of the UE antenna panel(s) used for SRS transmission(s) by the UE. One approach relies on UE antenna panel restrictions for SRS transmissions. The UE reports the number of antenna panels that the UE can utilize for SRS transmission to the network as capability information. The network controls which UE antenna panel the UE shall use through SRS configuration. One possible method is that the network configures the UE to use the same antenna panel for all SRS transmissions to ensure that the systematic transmit timing error is the same for all SRS transmissions.

Another method is that the network configures the UE with one SRS resource per antenna panel and TRP utilizing the antenna panel restriction to select antenna panel and utilizing a spatial relation or UL TCI state to select TRP.

Now consider restriction in SRS resource or SRS resource set. A UE antenna panel ID field may be introduced, for example, in the SRS-Resource and/or in the SRS-PosResource-r16 IEs defined in 3GPP TS 38.331. Such introductions are bolded in the example ASN.1 appearing below:

```
SRS-Resource ::=                        SEQUENCE {
    srs-ResourceId                          SRS-ResourceId,
    nrofSRS-Ports                           ENUMERATED {port1, ports2, ports4},
    ptrs-PortIndex                          ENUMERATED {n0, n1 }
        OPTIONAL, --Need R
    transmissionComb                            CHOICE {
        n2                                  SEQUENCE {
            combOffset-n2                           INTEGER (0..1),
            cyclicShift-n2                          INTEGER (0..7)
        },
        n4                                  SEQUENCE {
            combOffset-n4                           INTEGER (0..3),
            cyclicShift-n4                          INTEGER (0..11)
        }
    },
    resourceMapping                         SEQUENCE {
        startPosition                           INTEGER (0..5),
        nrofSymbols                             ENUMERATED {n1, n2, n4},
        repetitionFactor                        ENUMERATED {n1, n2, n4}
    },
    freqDomainPosition                      INTEGER (0..67),
    freqDomainShift                         INTEGER (0..268),
    freqHopping                             SEQUENCE {
        c-SRS                                   INTEGER (0..63),
        b-SRS                                   INTEGER (0..3),
        b-hop                                   INTEGER (0..3)
    },
    groupOr SequenceHopping                             ENUMERATED { neither,
        groupHopping, sequenceHopping },
    resourceType                            CHOICE {
        aperiodic                               SEQUENCE {
            ...
        },
        semi-persistent                         SEQUENCE {
            periodicity AndOffset-sp                    SRS-PeriodicityAndOffset,
            ...
        },
        periodic                                SEQUENCE {
            periodicity AndOffset-p                     SRS-PeriodicityAndOffset,
            ...
        }
    },
```

```
    sequenceId                         INTEGER (0..1023),
    spatialRelationInfo                SRS-SpatialRelationInfo
OPTIONAL, -- Need R
    ...,
    [[
    resourceMapping-r16                SEQUENCE {
        startPosition-r16              INTEGER (0..13),
        nrofSymbols-r16                ENUMERATED {n1, n2, n4},
        repetitionFactor-r16           ENUMERATED {n1, n2, n4}
    }                                                           OPTIONAL --
Need R
    ]],
        [[
        ueAntennaPanelId-r17                   INTEGER
(0..maxNrofUEantennaPanels-1)
            OPTIONAL, -- Need R
            ]]
}
SRS-PosResource-r16::=                 SEQUENCE {
    srs-PosResourceId-r16              ,
    transmissionComb-r16                       CHOICE {
        n2-r16                         SEQUENCE {
            combOffset-n2-r16                  INTEGER (0..1),
            cyclicShift-n2-r16                 INTEGER (0..7)
        },
        n4-r16                         SEQUENCE {
            combOffset-n4-16                   INTEGER (0..3),
            cyclicShift-n4-r16                 INTEGER (0..11)
        },
            n8-r16                             SEQUENCE {
            combOffset-n8-r16                  INTEGER (0..7),
            cyclicShift-n8-r16                 INTEGER (0..5)
        },
            ...
    },
    resourceMapping-r16                    SEQUENCE {
        startPosition-r16                  INTEGER (0..13),
        nrofSymbols-r16                        ENUMERATED {n1, n2, n4, n8, n12}
    },
    freqDomainShift-r16                    INTEGER (0..268),
    freqHopping-r16                        SEQUENCE {
        c-SRS-r16                          INTEGER (0..63)
    },
    groupOrSequenceHopping-r16                 ENUMERATED { neither,
groupHopping, sequenceHopping },
    resourceType-r16                       CHOICE {
        aperiodic-r16                      SEQUENCE {
        ...
        },
        semi-persistent-r16
                periodicityAndOffset-sp-r16    SEQUENCE {
                                               SRS-
PeriodicityAndOffset-r16,
        ...
        },
        periodic-r16                       SEQUENCE {
            periodicityAndOffset-p-r16                 SRS-PeriodicityAndOffset-r16,
            ...
        }
    },
    sequenceId-r16                         INTEGER (0..65535),
    spatialRelationInfoPos-r16                     SRS-
SpatialRelationInfoPos-r16             OPTIONAL, -- Need R
    ... ,
        [[
        ueAntennaPanelId-r17                       INTEGER
(0..maxNrofUEantennaPanels-1)
            OPTIONAL, -- Need R
            ]]
}
```

Alternatively, a UE antenna panel ID field is introduced in the SRS-ResourceSetId and/or in the SRS-PosResourceSetId-r16 IEs defined in 38.331. In this case the restriction applies to all SRS resources within the SRS resource set. The use of multiple UE antenna panels would then be achieved by configuring multiple SRS resource sets.

As a third alternative, a 'fixed-ue-AntennaPanel' field is introduced in the SRS-ResourceSetId and/or in the SRS-PosResourceSetId-r16 IEs defining whether all SRS resources within the SRS resource set should be transmitted utilizing the same UE antenna panel or not.

As a fourth alternative the restriction to utilize the same UE antenna panel for all SRS resources within an SRS resource set is mandated UE behavior.

Now consider a UL TCI-based restriction. A generic UL TCI concept as discussed in the Rel. 16 MIMO enhancement work is introduced. Example ANS.1 appears below with the UE antenna panel ID field in the UL-TCI-State IE:

in the SRS resource set IE in which case it would apply to all SRS resources in the SRS resource set. A third alternative would be to update the UL TCI state applicable to each SRS resource via medium access control (MAC) control element (CE). The UE would then be configured over RRC with a number of UL TCI states.

```
UL-TCI-State-r17 ::=           SEQUENCE {
    ul-Tci-StateId-r17         ,
    servingCellId              ServCellIndex,
    referenceSignal            CHOICE {
        ssb-Index              SSB-Index,
        csi-RS-Index           NZP-CSI-RS-ResourceId,
        srs                    SEQUENCE {
            resourceSelection-r16      CHOICE {
                srs-ResourceId-r16         SRS-ResourceId,
                srs-PosResourceId-r16
            },
            uplinkBWP                  BWP-Id
        },
        dl-PRS-r16             DL-PRS-Info-r16,
    ueAntennaPanelId-R17           INTEGER (0..maxNrofUEantennaPanels-1)
    }
}
```

The UE would be configured with a number of UL TCI states that could be utilized for multiple reference signals by using the UL TCI state id. Thus, an SRS resource could be assigned an UL TCI state by adding an UL TCI state id field in the SRS resource IE as exemplified in the ASN.1 code below. Alternatively, an UL TCI state id field could be added A subset of these UL TCI states would be activated over RRC for the SRS. MAC CE would be used to select one of the active UL TCI states for the SRS, e.g., adding a new IE for SRS-PosResource-r16 as shown in bold in the example ANS.1 below:

```
SRS-PosResource-r16:=          SEQUENCE {
    srs-PosResourceId-r16      ,
    transmissionComb-r16       CHOICE {
        n2-r16                 SEQUENCE {
            combOffset-n2-r16          INTEGER (0..1),
            cyclicShift-n2-r16         INTEGER (0..7)
        },
        n4-r16                 SEQUENCE {
            combOffset-n4-16           INTEGER (0..3),
            cyclicShift-n4-r16         INTEGER (0..11)
        },
        n8-r16                 SEQUENCE {
            combOffset-n8-r16          INTEGER (0..7),
            cyclicShift-n8-r16         INTEGER (0..5)
        },
        ...
    },
    resourceMapping-r16        SEQUENCE {
        startPosition-r16          INTEGER (0..13),
        nrofSymbols-r16            ENUMERATED {n1, n2, n4, n8, n12}
    },
    freqDomainShift-r16        INTEGER (0..268),
    freqHopping-r16            SEQUENCE {
        c-SRS-r16                  INTEGER (0..63)
    },
    groupOrSequenceHopping-r16         ENUMERATED {neither,
        groupHopping, sequenceHopping },
    resourceType-r16           CHOICE {
        aperiodic-r16              SEQUENCE {
            ...
        },
        semi-persistent-r16        SEQUENCE {
            periodicityAndOffset-sp-r16    SRS-PeriodicityAndOffset-r16,
            ...
        },
        periodic-r16               SEQUENCE {
            periodicityAndOffset-p-r16     SRS-PeriodicityAndOffset-r16,
            ...
        }
    },
    sequenceId-r16             INTEGER (0..65535),
    spatialRelationInfoPos-r16         SRS-SpatialRelationInfoPos-r16
```

```
OPTIONAL, --Need R
    ...,
    [[
    ul-Tci-StateId-r17           UL-TCI-StateId-r17,
    OPTIONAL, -- Need R
    ]]
}
```

Another example approach relies on implicit UE antenna panel restrictions based on antenna panel relations. Here, instead of restricting the UE antenna panel by explicitly configuring an antenna panel ID as in the solutions above, an antenna panel relation to another reference signal is introduced. The UE would be restricted to use the same antenna panel as used for the other reference signal. A spatial relation (or UL TCI state) could be used in combination with an antenna panel relation and could relate to another reference signal possibly transmitted from/to a different TRP. If an SRS is configured with an antenna panel restriction towards RS A and a spatial relation towards RS B the UE uses the same antenna panel for the SRS as for RS A and it uses the best beam for RS B under the restriction that the same antenna panel is used as for RS A.

The antenna panel relation would consist of a reference to a reference signal through a reference signal ID in a similar way as the spatial relation or UL-TCI-State. It could also include additional info like serving cell id for the cell transmitting the reference signal.

The antenna panel relation could be introduced in ASN.1 based signaling e.g. in one the following ways:
  in the SRS-Resource and/or in the SRS-PosResource-r16 IEs
  in the SRS-ResourceSetId and/or in the SRS-PosResourceSetId-r16 IEs
  as a part of an UL TCI state
  as an addition to the spatial relation An example ASN.1 code is given below with proposed new information for SRS antenna panel relations shown in bold:

the benefits of this approach, beam sweeping can sometimes be more resource effective than transmitting an SRS towards each TRP using a spatial relation towards a DL PRS or SSB e.g., when there are many TRPs and the beams are not very narrow. Further, the beam and panel sweep allows the gNB or other involved radio network node to perform multiple gNB Rx-Tx time difference measurements for the same UE and TRP but based on an SRS transmitted using different UE antenna panels. This allows for reducing the effect of TX timing errors on positioning accuracy.

Note that today's mm-wave MBB UEs typically have four dual polarized antenna elements per antenna panel which allows for a very limited number of rather wide beams. Thus, one approach to accounting for or compensating for the IPTD internal to the UE relies on a predefined mapping of beams and panels to SRS resource sets and SRS resources. Here, the UE signals its capability in terms of number of antenna panels M and the number of beams per antenna panel N and the network configures the UE with an SRS resource set with M×N SRS resources. The SRS resource set configuration includes an indication that the UE shall perform beam and panel sweeping.

The UE maps its M×N beams to the M×N SRS resources in a predefined way such that the network knows what SRS resources are transmitted from which UE antenna panel. As an example embodiment, the UE maps the N beams of a first panel to the first N SRS resources in configuration list order (srs-ResourceIdList IE in the SRS-ResourceSet IE), the N beams of a second panel to the (N+1), (N+2), ..., (N+N) 'th SRS resources in configuration list order, and so on.

```
SRS-AntennaPanelRelationInfo-r17 ::=         SEQUENCE {
    servingCellId-r17                ServCellIndex OPTIONAL, -- Need S
    referenceSignal-r17              CHOICE {
        ssb-IndexServing-r17             SSB-Index,
        csi-RS-IndexServing-r17          NZP-CSI-RS-ResourceId,
        srs-AntennaPanelRelation-r17     SEQUENCE {
            resourceSelection-r17            CHOICE {
                srs-ResourceId-r17               SRS-ResourceId,
                srs-PosResourceId-r17            SRS-PosResourceId-r16
            },                           BWP-Id
            uplinkBWP-r17
        },
        ssbNcell-r17                     SSB-InfoNcell-r16,
        dl-PRS-r17                       DL-PRS-Info-r16
    }
}
```

In one embodiment, the antenna panel relation would be part of an UL TCI state and the UL TCI state for an SRS resource can be updated via MAC CE, in which case the antenna relation is updated as part of the UL TCI state update.

Now consider an example solution that involves SRS beam and panel sweeping. Here, the UE transmits the SRS in a separate beam sweep for each UE antenna panel. Among In one embodiment the UE maps the N UE antenna panels to N different SRS resource sets and the M different beams to M different SRS resources within a SRS resource set.

In an alternative embodiment the UE panels can have different numbers of beams and the configuration and mapping is adapted correspondingly.

In yet another embodiment the UE have the capability to perform multiple alternative types of beam and panel sweeps, e.g., one beam and panel sweep with a low number of wide beams and one beam and panel sweep with a larger number of narrow beams. In this embodiment the UE reports its multiple beam and panel sweep capabilities and the network selects which beam and panel sweep to configure.

In one embodiment, the UE transmit only one beam per antenna panel and thus the 'beam and antenna panel sweep' may be viewed as an antenna panel sweep.

Now consider an approach that uses explicit beam and antenna panel configurations. For example, the UE signals its capability in terms of number of antenna panels M and the number of beams per antenna panel N, and the network configures the UE with an SRS resource set with a number of SRS resources. Each SRS resource configuration includes a beam ID and a UE antenna panel ID. This can be implemented as two separate fields in the SRS-Resource IE and/or in the SRS-PosResource-r16 in 38.331 ASN.1. Alternatively, the beam ID is included in the SRS-Resource IE and/or in the SRS-PosResource-r16 IEs while the UE antenna panel ID is included in the SRS-ResourceSetId and/or in the SRS-PosResourceSetId-r16 IEs.

Alternatively, a generic UL TCI concept as discussed in the Rel. 16 MIMO enhancement work is introduced and the beam ID and UE antenna panel ID are included in the UL-TCI-State IE, for example, as given in the ASN.1 below with the new panel information shown in bold:

```
UL-TCI-State ::=                    SEQUENCE {
  ul-Tci-StateId                      ,
  servingCellId                       ServCellIndex,
  referenceSignal                     CHOICE {
    ssb-Index                           SSB-Index,
    csi-RS-Index                          NZP-CSI-RS-ResourceId,
    srs                                 SEQUENCE {
      resourceSelection-r16               CHOICE {
        srs-ResourceId-r16                  SRS-ResourceId,
        srs-PosResourceId-r16
      },
      uplinkBWP                         BWP-Id
    },
    dl-PRS-r16                          DL-PRS-Info-r16,
    ueAntennaPanelId-r17                INTEGER
    (0..maxNrofUEantennaPanels-1),
    beamId-r17                          INTEGER
    (0..maxNrofUEBeamsPerAntennaPanel-1)
  }
}
```

The UE would be configured with a number of UL TCI states that could be utilized for multiple reference signals by using the UL TCI state id. Thus, an SRS resource would be assigned an UL TCI state e.g., by adding an UL TCI state id field in the SRS resource IE.

An example ASN.1 is provided where the spatial relation info is updated to include the number of antenna panels and number of resources/beams to be used for each antenna panel.

```
SRS-PosResource-r16:=                          SEQUENCE {
  srs-PosResourceId-r16                          ,
  transmissionComb-r16                           CHOICE {
    n2-r16                                         SEQUENCE {
      combOffset-n2-r16                              INTEGER (0..1),
      cyclicShift-n2-r16                             INTEGER (0..7)
    },
    n4-r16                                         SEQUENCE {
      combOffset-n4-16                               INTEGER (0..3),
      cyclicShift-n4-r16                             INTEGER (0..11)
    },
    n8-r16                                         SEQUENCE {
      combOffset-n8-r16                              INTEGER (0..7),
      cyclicShift-n8-r16                             INTEGER (0..5)
    },
    ...
  },
  resourceMapping-r16                            SEQUENCE {
    startPosition-r16                              INTEGER (0..13),
    nrofSymbols-r16                                ENUMERATED {n1, n2, n4, n8, n12}
  },
  freqDomainShift-r16                            INTEGER (0..268),
  freqHopping-r16                                SEQUENCE {
    c-SRS-r16                                      INTEGER (0..63)
  },
  groupOrSequenceHopping-r16                     ENUMERATED {neither,
  groupHopping, sequenceHopping },
  resourceType-r16                               CHOICE {
    aperiodic-r16                                  SEQUENCE {
      ...
    },
    semi-persistent-r16                            SEQUENCE {
      periodicityAndOffset-sp-r16                    SRS-PeriodicityAndOffset-r16,
      ...
    },
    periodic-r16                                   SEQUENCE {
      periodicityAndOffset-p-r16                     SRS-PeriodicityAndOffset-r16,
      ...
    }
  },
  sequenceId-r16                                 INTEGER (0..65535),
  spatialRelationInfoPos-r16                     SRS-SpatialRelationInfoPos-r16
  OPTIONAL, -- Need R
  ...,
  [[
  spatialRelationAntennaPanel-r17
```

```
        SpatialRelationAntennaPanel-r17
        ]]
}
SRS-SpatialRelationInfo ::=         SEQUENCE {
    servingCellId                       ServCellIndex
OPTIONAL, -- Need S
    referenceSignal                     CHOICE {
        ssb-Index                           SSB-Index,
        csi-RS-Index                        NZP-CSI-RS-ResourceId,
        srs                             SEQUENCE {
            resourceId                      SRS-ResourceId,
            uplinkBWP                           BWP-Id
        }
    }
}
SRS-SpatialRelationInfoPos-r16 ::=              SEQUENCE {
    servingCellId-r16                   ServCellIndex           OPTIONAL, -- Need
S
    referenceSignal-r16                     CHOICE {
        ssb-IndexServing-r16                    SSB-Index,
        csi-RS-IndexServing-r16                 NZP-CSI-RS-ResourceId,
        srs-SpatialRelation-r16                 SEQUENCE {
            resourceSelection-r16                   CHOICE {
                srs-ResourceId-r16                      SRS-ResourceId,
                srs-PosResourceId-r16
            },
            uplinkBWP-r16                           BWP-Id
        },
        ssbNcell-r16                        SSB-InfoNcell-r16,
        dl-PRS-r16                          DL-PRS-Info-r16
    }
}
SpatialRelationAntennaPanel-r17::=                   SEQUENCE {
    ueAntennaPanelId-r17                    INTEGER
{0..maxNrOfUEantennaPanels},
    beamId-r17                              INTEGER
(0..maxNrofUEBeamsPerAntennaPanel-1)
    ...
}
DL-PRS-Info-r16 ::=                 SEQUENCE {
    trp-Id-r16                          INTEGER (0..255),
    dl-PRS-ResourceSetId-r16                INTEGER (0..7),
    dl-PRS-ResourceId-r16               INTEGER (0..63) OPTIONAL - Cond Pathloss
}
```

Note that the NW can choose to configure a SRS beam sweep only using one UE antenna panel or it can configure a sweep over multiple/all antenna panels in a well-defined manner.

In an alternative embodiment the UE panels can have different numbers of beams.

In some embodiments, "UE antenna panels" may be interpreted as "UL TCI TX timing groups" and ASN.1 field names may be modified accordingly.

In one embodiment the UE reports the direction of the UE beams for each antenna panel for example, in a local coordinate system. This enables UL DOD (Direction of Departure) estimates based on NW measurements on the UL SRS.

Now consider UE antenna panel reporting for SRS transmission, which may use antenna panel reporting in separate message or as part of measurement report. The UE reports the antenna panel ID utilized for each transmission of an SRS resource. Reporting of the antenna panel ID can be done, for example, as a separate message or as part of the UE Rx-Tx time difference measurement report.

In one embodiment the UE is restricted to use the same UE antenna panel for the transmission of a configured SRS resource during a certain time period and the UE reports the antenna panel ID utilized for the transmission of an SRS resource within each time period. This time period could be preconfigured or it could be signaled, for example as part of the SRS-Resource IE, as part of the SRS-ResourceSet IE (in the latter case it would apply to all SRS Resources in the SRS Resource set) or as part of the UE Rx-Tx time difference measurement. Alternatively, the time period could be the measurement time period for the UE Rx-TX time difference measurements the UE has been configured with.

Now consider UL TCI based antenna panel reporting. In an example case, the SRS-SpatialRelationInfo is replaced by a general UL TCI concept as discussed in the Rel. 16 MIMO enhancement work. When the UE is configured with one or more UL TCI states the UE reports which UE antenna panel ID the UE uses for transmissions associated with each configured UL TCI state. When the UE antenna panel ID the UE uses for transmissions associated with an UL TCI state is changed the new antenna panel ID is reported by the UE.

In an alternative embodiment reporting of which UE antenna panel ID the UE uses for transmissions associated with each configured UL TCI state is instead done periodically.

In another embodiment, reporting is restricted to UL TCI states of configured SRS resources. In one or more embodiment, "UE antenna panels" may be interpreted as "UL TCI TX timing groups".

As for handling multiple UE antenna panels in UE TOA measurements, consider a solution that relies on multiple UE TOA measurements per TRP. The UE performs multiple RSTD/UE-Rx-Tx time difference measurements towards the same TRP using different UE antenna panels and reports these measurements. In different embodiments the UE performs these measurements (1) based on the same DL PRS resource using multiple RX chains to make multiple measurements at the same time using different antenna panels, (2) based on different occasions of the same DL PRS resource, (3) based on different parts of the same DL PRS resource, e.g., (a) different symbols within the same slot, (b) different repetitions of the DL PRS resource, (c) based on different DL PRS resource sets for the same TRP, or (d) based on a combination of these options.

NR-DL-TDOA-RequestLocationInformation IE in the LPP protocol in TS 37.355 indicating if separate RSTD measurements should be performed using each of the UE antenna panels. In an alternative embodiment a field is introduced in the NR-DL-TDOA-RequestLocationInformation IE in the LPP protocol in TS 37.355 which lists the UE antenna panel IDs for which measurements shall be performed (e.g., as in ASN.1 given below).

```
-- ASN1START
NR-DL-TDOA-RequestLocationInformation-r16 ::= SEQUENCE {
    nr-DL-PRS-RstdMeasurementInfoRequest-r16        ENUMERATED {
true }                     OPTIONAL,                -- Need ON
    nr-RequestedMeasurements-r16                    BIT STRING {
    prsrsrpReq (0)
        } (SIZE(1..8)),
    nr-AssistanceAvailability-r16                   BOOLEAN,
    nr-DL-TDOA-ReportConfig-r16                     NR-DL-TDOA-
ReportConfig-r16 OPTIONAL,                          -- Need ON
    additionalPaths-r16                             ENUMERATED {
requested } OPTIONAL,                               -- Need ON
    ... ,
    [[
    nr-DL-TDOA-UE-AntennaPanelIdList-r17            NR-
DL-TDOA-UE-AntennaPanelIdList-r17
    ]]
}
NR-DL-TDOA-ReportConfig-r16 ::= SEQUENCE {
    maxDL-PRS-RSRP-MeasurementsPerTRP-r16           INTEGER (1..8)
    OPTIONAL,
    maxDL-PRS-RSTD-MeasurementsPerTRPPair-r16       INTEGER (1..4)
    OPTIONAL
    timingReportingGranularityFactor-r16            INTEGER (FFS)
    OPTIONAL --FFS in RAN4
}
NR-DL-TDOA-UE-AntennaPanelIdList-r17 ::= SEQUENCE (SIZE(1..
maxNrofUEantennaPanels)) OF INTEGER (0..maxNrofUEantennaPanels-1)
-- ASN1STOP
```

The UE reports to the network the number of UE antenna panels it can use to receive the DL PRS and its capability to perform multiple RSTD/UE-Rx-Tx time difference measurements towards the same TRP using different UE antenna panels. In some embodiments the UE also reports its capabilities to perform multiple RSTD/UE-Rx-Tx time difference measurements simultaneously based on the same DL PRS resource.

The network configures the UE to perform multiple RSTD/UE-Rx-Tx time difference measurements towards the same TRP using different UE antenna panels and reports these measurements.

In one embodiment the UE performs RSTD measurements using different antenna panels for the target TRP TOA measurement while using the same 'reference antenna panel' for the reference TRP TOA measurement. In one embodiment the UE selects the reference antenna panel and reports the corresponding UE antenna panel ID to the networks as part of the RSTD measurement report.

In one embodiment the configuration for the UE-Rx-Tx time difference measurements is performed through a field introduced in the NR-Multi-RTT-RequestLocationInformation IE in the LPP protocol in TS 37.355 indicating if separate UE-Rx-Tx time difference measurements should be performed using each of the UE antenna panels. In an alternative embodiment a field is introduced in the NR-Multi-RTT-RequestLocationInformation IE in the LPP protocol in TS 37.355 which lists the UE antenna panel IDs for which measurements shall be performed.

In one embodiment the configuration for the RSTD measurements is performed through a field introduced in the NR-DL-TDOA-RequestLocationInformation Field Descriptions nr-AssistanceAvailability—this field indicates whether the target device may request additional PRS assistance data from the server. TRUE means allowed and FALSE means not allowed.

nr-RequestedMeasurements—this field specifies the NR DL-TDOA measurements requested. This is represented by a bit string, with a one value at the bit position means the particular measurement is requested; a zero value means not requested.

nr-DL-PRS-RstdMeasurementInfoRequest—this field indicates whether the target device is requested to report DL PRS Resource ID(s) or DL PRS Resource Set ID(s) used for determining the timing of each TRP in RSTD measurements.

maxDL-PRS-RSRP-MeasurementsPerTRP—this field specifies the maximum number of DL PRS RSRP measurements on different DL PRS resources from the same TRP.

maxDL-PRS-RSTD-MeasurementsPerTRPPair—this field specifies the maximum number of. DL PRS RSTD measurements per pair of TRPs. The maximum number is defined across all positioning frequency layers.

timingReportingGranularityFactor—this field specifies the reporting granularity for the UE timing measurements (DL RSTD, the UE Rx-Tx time difference).

nr-DL-TDOA-UE-AntennaPanelIdList-r17—this new field specifies the UE antenna panel Ids of the antenna panels width which the UE should perform and report separate NR DL TDOA measurements. The UE reports the RSTD/UE- Rx-Tx time difference measurements indicating which UE antenna panel was used e.g., as a new field in the NR-DL-TDOA-MeasElement-r16/NR-Multi-RTT-MeasElement-r16 IE. For the RSTD case the UE reports the antenna panel used both for the TOA measurement towards the target TRP and towards the reference TRP (see example ASN.1 for the RSTD case below). To allow for multiple measurements towards the same TRP but utilizing different UE antenna panels the number of measurements may be extended e.g., as in the ASN.1 example below for the RSTD case.

```
-- ASN1START
NR-DL-TDOA-SignalMeasurementInformation-r16 ::= SEQUENCE {
    dl-PRS-ReferenceInfo-r16              DL-PRS-IdInfo-r16,
    nr-DL-TDOA-MeasList-r16               NR-DL-TDOA-MeasList-r16,
    ...
}
NR-DL-TDOA-MeasList-r16 ::= SEQUENCE (SIZE(1.. nrMaxTRPs)) OF NR-
DL-TDOA-MeasElement-r16
NR-DL-TDOA-SignalMeasurementInformation-r17 ::= SEQUENCE {
    dl-PRS-ReferenceInfo-r16              DL-PRS-IdInfo-r16,
    nr-DL-TDOA-MeasList-r17NR-DL-TDOA-MeasList-r17,
    ...
}
NR-DL-TDOA-MeasList-r17 ::= SEQUENCE (SIZE(1..
nrMaxTDOAmeasurements)) OF NR-DL-TDOA-MeasElement-r16
NR-DL-TDOA-MeasElement-r16 ::= SEQUENCE {
    trp-ID-r16                            TRP-ID-r16
       OPTIONAL,
    nr-DL-PRS -ResourceId-r16             NR-DL-PRS-ResourceId-r16
OPTIONAL,
    nr-DL-PRS-ResourceSetId-r16           NR-DL-PRS-ResourceSetId-
r16 OPTIONAL,
    nr-TimeStamp-r16                      NR-TimeStamp-r16,
    nr-RSTD-r16                           INTEGER (0..ffs),
    --FFS on the value range
    nr-AdditionalPathList-r16             NR-AdditionalPathList-r16
       OPTIONAL,
    nr-TimingMeasQuality-r16              NR-
TimingMeasQuality-r16,
    nr-PRS-RSRP-Result-r16                INTEGER (FFS)
       OPTIONAL, -- FFS, value range to be decided in RAN4.
    nr-DL-TDOA-AdditionalMeasurements-r16          NR-
DL-TDOA-AdditionalMeasurements-r16,
    ...
}
NR-DL-TDOA-AdditionalMeasurements-r16 ::= SEQUENCE (SIZE (1..3)) OF
NR-DL-TDOA-AdditionalMeasurementElement-r16
NR-AdditionalPathList-r16 ::= SEQUENCE (SIZE(1..2)) OF NR-AdditionalPath-
r16
NR-DL-TDOA-AdditionalMeasurementElement-r16 ::= SEQUENCE {
    nr-DL-PRS-ResourceId-r16              OPTIONAL,
    nr-DL-PRS-ResourceSetId-r16           NR-DL-PRS-ResourceSetId-
r16 OPTIONAL,
    nr-TimeStamp-r16                      NR-TimeStamp-r16,
    nr-RSTD-ResultDiff-r16                INTEGER (0..ffs), --FFS
on the value range to be decided in RAN4
    dl-PRS-RSRP-ResultDiff-rl 6 INTEGER              OPTIONAL, -
(FFS)
- FFS on the value range to be decided in
RAN4
    nr-AdditionalPathList-r16             NR-AdditionalPathList-r16
       OPTIONAL,
    ... ,
    [[
    ue-AntennaPanelId-r17                 INTEGER
(0..maxNrofUEantennaPanels-1)
       OPTIONAL, -- Need R
    ue-ReferenceAntennaPanelId-r17        INTEGER
(0..maxNrofUEantennaPanels-1)
       OPTIONAL, -- Need R
    ]]
}
nrMaxTRPs INTEGER :: = 256             -- Max TRPs per UE
nrMaxTDOAmeasurements INTEGER : := 768 -- MAX TRPs per UE
times max antenna panels per UE
-- ASN1STOP
```

UE Indication of Whether the Same or Different Antenna Panels were Used for the Two RSTD Measurement Components The UE indicates implicitly or explicitly (e.g., sending an indication) whether the same or different antenna panels were used for the different measurement components comprising the same RSTD measurement.

UE Reporting of which UE Antenna Panel was Used for a UE TOA Measurement

The UE reports the RSTD/UE-Rx-Tx time difference measurements indicating which UE antenna panel was used e.g., as a new field in the NR-DL-TDOA-MeasElement-r16/NR-Multi-RTT-MeasElement-r16 IE (see example ASN.1 for the RSTD case below).

Solutions for UE Reporting or Compensation of RX and TX Timing Errors

The UE achieves knowledge on the relative errors in RX and/or TX timing errors between different antenna panels. Next the UE Either

- compensates TX timing and/or RSTD/UE RX/TX time difference measurements for the estimated relative errors, or
- reports the relative errors to the network, for example, as part of the RSTD/UE RX/TX time difference measurement reports.

In one embodiment the reporting or compensation of the relative errors is done relative to a reference antenna panel for which TX and/or RX timing is kept fixed. The choice of

```
-- ASN1START
NR-DL-TDOA-SignalMeasurementInformation-r16 ::= SEQUENCE {
    dl-PRS-ReferenceInfo-r16                DL-PRS-IdInfo-r16,
    nr-DL-TDOA-MeasList-r16                 NR-DL-TDOA-MeasList-r16,
    ...
}
NR-DL-TDOA-MeasList-r16 ::= SEQUENCE (SIZE(1.. nrMaxTRPs)) OF NR-DL-TDOA-MeasElement-r16
NR-DL-TDOA-MeasElement-r16 ::= SEQUENCE {
    trp-ID-r16                              TRP-ID-r16
        OPTIONAL,
    nr-DL-PRS-ResourceId-r16                NR-DL-PRS-ResourceId-r16
OPTIONAL,
    nr-DL-PRS-ResourceSetId-r16             NR-DL-PRS-ResourceSetId-r16 OPTIONAL,
    nr-TimeStamp-r16                        NR-TimeStamp-r16,
    nr-RSTD-r16                             INTEGER (0..ffs),
    -- FFS on the value range
    nr-AdditionalPathList-r16               NR-AdditionalPathList-r16
        OPTIONAL,
    nr-TimingMeasQuality-r16                NR-TimingMeasQuality-r16,
    nr-PRS-RSRP-Result-r16                  INTEGER (FFS)
        OPTIONAL, -- FFS, value range to be decided in RAN4.
    nr-DL-TDOA-AdditionalMeasurements-r16   NR-DL-TDOA-AdditionalMeasurements-r16,
    ...
}
NR-DL-TDOA-AdditionalMeasurements-r16 ::= SEQUENCE (SIZE (1..3)) OF NR-DL-TDOA-AdditionalMeasurementElement-r16
NR-AdditionalPathList-r16 ::= SEQUENCE (SIZE(1..2)) OF NR-AdditionalPath-r16
NR-DL-TDOA-AdditionalMeasurementElement-r16 ::= SEQUENCE {
    nr-DL-PRS-ResourceId-r16                OPTIONAL,
    nr-DL-PRS-ResourceSetId-r16             NR-DL-PRS-ResourceSetId-r16 OPTIONAL,
    nr-TimeStamp-r16                        NR-TimeStamp-r16,
    nr-RSTD-ResultDiff-r16                  INTEGER (0..ffs), -- FFS
on the value range to be decided in RAN4
    dl-PRS-RSRP-ResultDiff-r16INTEGER (FFS)            OPTIONAL, -
- FFS on the value range to be decided in RAN4
    nr-AdditionalPathList-r16               NR-AdditionalPathList-r16
        OPTIONAL,
    ... ,
    [[
    ue-AntennaPanelId-r17                   INTEGER (0..maxNrofUEantennaPanels-1)
        OPTIONAL, -- Need R
    ]]
}
nrMaxTRPs INTEGER :: = 256                  -- Max TRPs per UE
-- ASN1STOP
``` reference antenna panel could be based on a pre-defined rule or selected and signaled by the network. In one sub-embodiment the identity (ID) of the selected reference antenna panel is signaled to the network.

In one embodiment the UE knowledge on the RX timing difference between different antenna panels is achieved through Inter Panel Time Difference Measurements (IPTD).

In an alternative embodiment the UE estimates absolute errors in RX and/or TX timing errors for different antenna panels and reports or compensates for these errors e.g., as part of the RSTD/UE RX/TX time difference measurement reports.

In one embodiment the UE knowledge on the absolute or relative errors in RX and/or TX timing errors between different antenna panels is achieved through calibration and pre-configuration of the UE.

In one embodiment the absolute or relative errors in RX and/or TX timing errors between different antenna panels is signaled by the network (e.g., by the location server over LPP) to the UE.

Solutions to Handle NLOS Issues

One reason for using multiple UE antenna panels is to cover different UE RX/TX directions in a better way. The UE panels are located on different sides of the UE and thus cover different directions. The LOS path may thus be easily detected by one UE antenna panel, directed towards the TRP in question while the LOS path may be strongly suppressed and hard or impossible to detect by another UE antenna panel, located on a different side of the UE. This is clearly a problem for the combined use of measurements based on different antenna panels described here. There is a risk that measurements made by different antenna panels correspond to different paths. Here a number of solutions to mitigate this problem are given.

LoS Indicators

Use LOS indicators to verify that the first path is LOS in each panel measurement (examples of LOS indicators are that first path is the strongest path, Ricci type of fading, etc.).

Use only measurements that are classified as LOS.

Ensure same AoA

Measure the AOA and RSRP based on each UE antenna panel.

Utilize the measurement with the antenna panel giving the highest RSRP and measurements with antenna panels that give the same AOA (within measurement errors) as the measurement with the antenna panel giving the highest RSRP.

Fitting the CIR as measured using different UE antenna panels to each other

Identify one or more of the peaks in the CIR as measured by different antenna panels as corresponding to the same propagation path but seen with different antenna panels. The identification of two peaks seen by different antenna panels as corresponding to the same propagation path can be based on e.g.

That they have the same direction of arrival.

That the same peak delay pattern is seen with different antenna panels, i.e., that the time difference between two or more peaks are the same as measured with different antenna panels.

Note that the peak delay pattern can be based on a subset of the peaks, since all peaks are not necessarily seen by all antenna panels.

A combination of peak delay pattern and consistent direction of arrivals of the peaks in the peak delay pattern.

Calculate the Inter Panel Time Difference (IPTD) as the difference in TOA for one of the identified peaks as measured with two different UE antenna panels.

Based on the Inter Panel Time Differences (IPTDs) and the TOA of the first peak as measured using one of antenna panels one may also calculate the TOA of the first path as it would be seen by another antenna panel. As an example, if the first peak is seen by antenna panel A and measured to have TOAA, then $TOA_B=TOA_A+IPTD_{B-A}$.

Note that it is enough that an IPTD can be measured based on one PRS transmitted from one TRP (or SRS received by one TRP). It can then be used to compensate for IPTD in a TOA measurement based on a PRS transmitted from a different TRP (or SRS received by a different TRP).

In FIG. 1, Peak 1 and peak 2 in the CIR measured by UE antenna panel A is identified as corresponding to the same propagation paths as peak 2 and peak 3 in the CIR measured by UE antenna panel A based on that the pairs of peaks have the same TOA difference, i.e., that $t_{A3}-t_{A2}=t_{B2}-t_{B1}$. The Inter Panel Time Difference (IPTD) can thus be calculated as the TOA difference between panel B peak 1 and panel A peak 2 or as the TOA difference between panel B peak 2 and panel A peak 3, i.e., $IPTD_{B-A}=t_{B1}-t_{A2}=t_{B2}-t_{A3}$. One may also calculate the TOA of the first path (A1) as it would be seen by antenna panel B if it could be measured as $t_{A1}+IPTD_{B-A}$.

The functions above can be performed by the measuring node (the UE for DL TDOA and the gNB for UL TDOA) which has direct access to the full CIR and AOA measurements. Alternatively, rich reporting of multiple peaks (delay, peak power, peak AoA) from the measuring node allows these functions to performed by another node, e.g., the location server.

In one embodiment the UE performs IPTD measurements and use them to compensate RSTD measurements for the inter panel time difference between the antenna panels used for the target TRP and the reference TRP TOA measurements, i.e., $RSTD_{compensated}=RSTD+IPTD_{R-T}$ where R is the antenna panel used for the reference TRP and T is the antenna panel used for the target TRP. The UE the report the compensated RSTD measurement to the network e.g., to the location server over LPP. In another embodiment the UE performs IPTD measurements and report the IPDT measurements and uncompensated RSTD measurements to network e.g., to the location server over LPP.

In one embodiment the network controls whether the UE should compensate RSTD measurements for IPTDs or not e.g., through signaling over LPP.

The IPTD measurements could be done based on the same reference signal as the RSTD measurement. Alternatively, a separate reference signal (e.g., a separate DL PRS resource set for DL RSTD or a separate UL SRS resource set for UL RSTD) could be configured for the IPTD measurements. This reference signal would be configured to allow the UE to perform TOA measurements utilizing multiple antenna panels, e.g., by utilizing more symbols for each occasion than the reference signal used for the RSTD measurement. In one embodiment the separate reference signal for IPTD measurements would be configured and transmitted less often (e.g., with longer periodicity) than the reference signal used for the RSTD measurement (saving radio resources but still allowing for RSTD compensation as long as the time variations of the IPTDs are small between reference signal transmissions).

Figure 2:
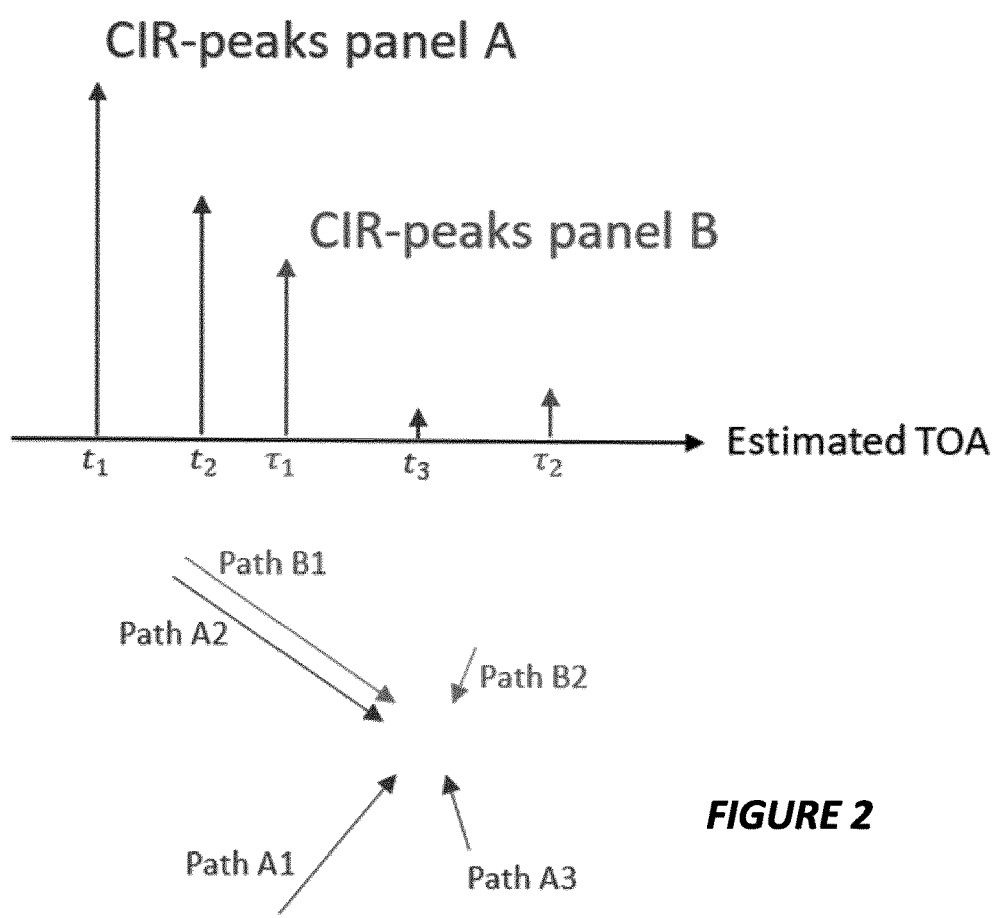

Referring to FIG. 2, Peak 1 in the CIR measured by UE antenna panel B is identified as corresponding to the same propagation path as peak 2 in the CIR measured by UE antenna panel A based on that they have the same direction of arrival. The Inter Panel Time Difference (IPTD) can thus be calculated as the TOA difference between panel B peak 1 and panel A peak 2, i.e., $IPTD_{B-A}=t_{B1}-t_{A2}$. One may also calculate the TOA of the first path (A1) as it would be seen by antenna panel B if it could be measured as $t_{A1}+IPTD_{B-A}$.

Identifying the Suitable UE Antenna Panels for SRS Transmissions and RSTD/UE Rx-Tx Measurements As has been described above the network can with various mechanisms restrict SRS transmissions and RSTD/UE Rx-Tx measurements to be performed by a single UE antenna panel, to a subset of the UE antenna panels or by all UE antenna panels. Unless all UE antenna panels are used, a selection of one or more antenna panels to use is needed.

This selection could be based on, for example:
Earlier performed RRM or positioning related measurements and reports
Earlier estimates of the UE position In one embodiment one or more UE RRM and/or positioning related measurement reports are enhanced to include an indication of which UE antenna panel that was used for the measurement.

In one example the UE antenna panel used for the PRS RSRP measurements for DL-AoD is reported in the corresponding measurement report.

RSRP measurement is performed based on multiple UE antenna panels and the result is reported per UE antenna panel. Example ASN.1 is shown below.

NR-DL-AoD-SignalMeasurementInformation

The IE NR-DL-AoD-SignalMeasurementInformation is used by the target device to provide NR DL AoD measurements to the location server. The measurements are provided as a list of TRPs, where the first TRP in the list is used as reference TRP. See the example ASN.1 immediately below.

```
-- ASN1START
NR-DL-AoD-SignalMeasurementInformation-r16 ::= SEQUENCE {
    nr-DL-AoD-MeasList-r16                              NR-DL-AoD-MeasList-r16,
    ...,
    nr-DL-AoD-AntennaPanelMeasList-r17                  NR-DL-AoD-
AntennaPanelMeasList-r17 --Cond MultiAntenna
}
NR-DL-AoD-AntennaPanelMeasList-r17 ::= SEQUENCE
(SIZE(1..nrMaxTRPs)) OF NR-DL-AoD-MeasList-r16
NR-DL-AoD-MeasList-r16 ::= SEQUENCE (SIZE(1...nrMaxTRPs)) OF NR-DL-
AoD-MeasElement-r16
NR-DL-AoD-MeasElement-r16 ::= SEQUENCE {
    trp-ID-r16                                          TRP-ID-r16
        OPTIONAL,
    nr-DL-PRS-ResourceId-r16                            NR-DL-PRS-ResourceId-r16
OPTIONAL,
    nr-DL-PRS-ResourceSetId-r16                         NR-DL-PRS-
ResourceSetId-r16 OPTIONAL,
    nr-TimeStamp-r16                                    NR-TimeStamp-r16,
    nr-PRS-RSRP-Result-r16                              INTEGER (FFS)
        OPTIONAL, -- Need RAN4 inputs on value range
    nr-DL-PRS-RxBeamIndex-r16                           INTEGER (1..8),
    nr-TimingMeasQuality-r16                            NR-
TimingMeasQuality-r16,
    nr-DL-Aod-AdditionalMeasurements-r16                NR-DL-AoD-
AdditionalMeasurements-r16,
    ...,
    antennaPanelId-r17 INTEGER {0..maxNrOfAntennaPanel}
}
NR-DL-AoD-AdditionalMeasurements-r16 ::= SEQUENCE (SIZE (1..7)) OF
NR-DL-AoD-AdditionalMeasurementElement-r16
NR-DL-AoD-MeasurementElement-r16 ::= SEQUENCE {
    nr-DL-PRS-ResourceId-r16                            NR-DL-PRS-ResourceId-r16
        OPTIONAL,
    nr-DL-PRS-ResourceSetId-r16                         NR-DL-PRS-
ResourceSetId-r16 OPTIONAL,
    nr-TimeStamp-r16                                    NR-TimeStamp-r16,
    nr-PRS-RSRP-ResultDiff-r16                          INTEGER (FFS)
        OPTIONAL, -- Need RAN4 inputs on value range
    nr-DL-PRS-RxBeamIndex-r16                           INTEGER (1..8),
    ...
}
nrMaxTRPsINTEGER :: = 256                               -- Max TRPs
-- ASN1STOP
```

Reported UE near field detection of body blocking of one or more UE antenna panels In one embodiment one or more UE RRM and/or positioning related measurements are enhanced to be performed using multiple UE antenna panels to improve such a selection mechanism.

In one example the UE RSRP measurement is performed based on multiple UE antenna panels and the result is reported per UE antenna panel.

NR-DL-AoD-SignalMeasurementInformation Field Descriptions nr-PRS-RSRP-Result—this field specifies the reference signal received power (RSRP) measurement, as defined in 3GPP TS 38.331. Based on such measurements the network can select one UE antenna panel or a subset of UE antenna panels to use for SRS transmissions and/or RSTD/UE Rx-Tx measurements.

In one embodiment the antenna panel most suitable for the serving cell or the reference TRP could be selected.

In another embodiment antenna panels, for which the positioning reference signals are not expected to be heard strongly enough to allow for positioning measurements, are excluded for a given TRP.

UE Capability and Antenna Configuration Reporting

To support one or more of the methods described in this disclosure, a UE according to one or more embodiments reports its capabilities and its antenna configuration to the network, e.g., over LPP to the location server and/or over RRC to the gNB.

The UE capability and antenna configuration information reported can contain one or more of the following:
- The number of UE antenna panels for reception and transmission.
- The position of the antenna panels relative to a reference point in a local coordinate system.
- The reference point could, for example, be one of the antenna panel, and the ID of this reference antenna panel could be predefined (e.g., to 1) or it could be signaled to the network.
- The direction of the antenna panels in a local coordinate system.
- The capability of the UE to perform beam and panel sweeping of the SRS.
- The number of beams per antenna panel used for UE beam sweeping of the SRS
- The direction in a local coordinate system, of each beam used for UE beam and/or antenna panel sweeping of the SRS.
- The capability to perform multiple RSTD/UE-Rx-Tx time difference measurements towards the same TRP using different UE antenna panels.
- The capability to perform multiple RSTD/UE-Rx-Tx time difference measurements simultaneously based on the same DL PRS resource.
- The capability in terms of measurement accuracy for RSTD/UE-Rx-Tx time difference measurements.
- The capability in terms of accuracy for TX timing.

For a UE with a physical form that can change with time such as e.g., a foldable UE, the antenna configuration parameters could be updated through UE signaling when the form of the UE is changed. Alternatively, the UE could first signal the antenna configuration for all UE forms and then update the network with the current UE form as described by one or more parameters.

Network Control of the Antenna Panel for the Performed and/or Reported Measurement Network node controlling of whether the UE is allowed or not to use different antenna panels for two different components comprising the same measurement, e.g., by sending a controlling parameter or indicator (e.g., "allowed" or "not allowed") in the assistance data or measurement configuration. This impacts either how the measurement is performed or how the measurement is reported (e.g., may need to be compensated with respect to a reference antenna panel).

Compensation with Respect to a Reference Antenna Panel

When different panels were used for different components comprising the same measurement, the measuring node (e.g., UE or BS or LMU) selects a reference panel configuration and determines the amount of compensation needed to compensate one or both of the components comprising the measurement to achieve such an effect on the component(s) as if it(they) were performed based on the reference antenna panel. The compensation is then either applied to the measurement prior reporting or signaled together with the measurement.

The reference antenna panel can be one of those used for one of the measurement components or can be a third one, e.g., defined based on a pre-defined rule or network configuration such as using as a reference the antenna panel configuration of the reference TRP or reference PRS or using as a reference for UL measurement component the antenna panel used for DL reception for UL components or using as a reference for one or both measurement components the antenna panel used for obtaining the timing reference for the measurement.

Requirements and Test Design

Requirement on the Difference in TX Timing Between Two SRSs Configured to Utilize the Same UE Antenna Panel Requirements for TX timing are defined so that the timing difference is required to be smaller for transmissions utilizing the same antenna panel (or virtual antenna panel or 'UL TCI state TX timing group') than when using different antenna panels.

A TX timing requirement/test is based on configuring two SRS's utilizing the same UE antenna panel and measuring the TX timing of the transmitted SRSs. There is one requirement on the TX timing for each SRS, and a second tighter requirement on the difference in TX timing between the two SRSs.

The requirement may also depend on the time between the transmission of the two SRSs.

Requirement on the Difference Between Two UE Rx-Tx Time Difference Measurements Based on Two Different PRSs Utilizing the Same UE Antenna Panel and Sent from the Same TRP A UE Rx-Tx time difference accuracy requirement is based on configuring two UE Rx-Tx time difference measurements based on two different PRSs utilizing the same UE antenna panel and one SRS. There is one requirement on the accuracy of each UE Rx-Tx time difference measurement, and a second tighter requirement on the difference between the two UE Rx-Tx time difference measurements. The two different PRSs may have different TRP identities but are transmitted from the same TRP (i.e., with the same propagation delay).

Requirement on the Difference Between Two DL TDOA Measurements Based on Two Different PRSs Utilizing the Same UE Antenna Panel and Sent from the Same TRP A DL TDOA accuracy requirement is based on configuring DL TDOA measurements based on two different PRSs utilizing the same UE antenna panel and one SRS. There is one requirement on the accuracy of each DL TDOA measurement, and a second tighter requirement on the difference between the two DL TDOA measurements. The two different PRSs may have different TRP identities but are transmitted from the same TRP (i.e., with the same propagation delay).

Requirement on DL TDOA Measurement Restricted to be Performed Using a Single UE Antenna Panel The two TOA measurements constituting the DL TDOA measurement is restricted by signaling or UE behavior to utilize the same UE antenna panel.

A tighter requirement is defined for this measurement than for an unrestricted DL TDOA measurement.

Multiple Requirements Depending on UE Capabilities and/or UE Class

Different requirements on TX-timing, DL TDOA and/or UE Rx-Tx time difference measurements are defined for UE supporting certain UE capabilities and/or being part of certain UE classes.

The tighter requirements that are defined for certain UE capabilities and/or UE classes are achieved through, for example, improved UE building practice or UE calibration and error compensation.

Requirement Taking Reported Timing Errors into Account

Requirements are defined on TX timing and/or RSTD/UE Rx-Tx time difference measurements after compensation for RX and/or TX timing errors reported by the UE.

Example System Embodiments Combining Solutions Described Above

RTT-Positioning Using UE Antenna Panel Restriction for SRS Transmission

This embodiment is based on a combination of UE antenna panel restriction for SRS transmission and the use of multiple UE Rx-Tx Time difference measurements towards the same TRP but utilizing different UE antenna panels.

Operations from UE Perspective

1) The UE signals its capabilities over LPP to the location server, including the number of UE antenna panels that can be used for UE transmission and reception
2) The UE is configured over RRC by its serving gNB
   a) With a number of SRS's, each with a spatial relation to a DL RS (e.g., a DL PRS or an SSB) transmitted by a TRP and a restriction to which UE antenna panel to use for the SRS transmission. For each TRP one SRS is configured for each of the UE antenna panels.
3) The UE is configured by the location server over LPP
   a) With a number of PRS's, each transmitted by a TRP
   b) To perform and report a UE Rx-Tx Time difference measurement for each UE antenna panel and each TRP in a set of TRPs.
4) The UE performs the UE Rx-Tx Time difference measurements and reports the measurement results to the location server.
5) The UE transmits the configured SRSs.

Operations from Serving Radio Network Node Perspective (e.g., gNB):

1) The gNB provides DL PRS configuration details over NRPPa to the location server for the TRPs controlled by the gNB.
2) The serving gNB receives a request over NRPPa from the location server to configure a UE with a number of SRS's, including proposed SRS configurations.
3) The serving gNB signals an acknowledgement over NRPPa to the location server that a number of SRS's will be configured, including SRS configuration details.
4) The serving gNB configures the UE through signaling
   a) With a number of SRS's, each with a spatial relation to a DL RS (e.g., a DL PRS or an SSB) transmitted by a TRP and a restriction to which UE antenna panel to use for the SRS transmission. For each TRP one SRS is configured for each of the UE antenna panels.
5) The serving gNB receives a request over NRPPa from the location server to perform and report gNB Rx-Tx time difference measurements.
6) The serving gNB transmits a number of DL PRSs from the TRPs that the gNB controls.
7) The serving gNB receives the SRSs configured with a spatial relation towards a DL PRS or SSB transmitted from a TRP controlled by the serving gNB and performs the gNB Rx-Tx time difference measurement for each SRS received with sufficient signal strength. For a given TRP one gNB Rx-Tx time difference is measured for each UE antenna panel, assuming that the corresponding SRS was received with sufficient signal strength.
8) The serving gNB signals the gNB Rx-Tx time difference measurements over NRPPa to the location server.

Operations from Non-Serving Radio Network Node Perspective (e.g., Non-Serving gNBs):

1) The gNB provides DL PRS configuration details over NRPPa to the location server for the TRPs controlled by the gNB.
2) The gNB receives a request over NRPPa from the location server to perform and report gNB Rx-Tx time difference measurements. The request includes SRS configuration details to be used for the measurements.
3) The gNB transmits a number of DL PRSs from the TRPs that the gNB controls.
4) The gNB receives the SRSs configured with a spatial relation towards a DL PRS or SSB transmitted from a TRP controlled by the gNB and performs the gNB Rx-Tx time difference measurement for each SRS received with sufficient signal strength. For a given TRP one gNB Rx-Tx time difference is measured for each UE antenna panel, assuming that the corresponding SRS was received with sufficient signal strength.
5) The gNB signals the gNB Rx-Tx time difference measurements over NRPPa to the location server.

Operations Location Server Perspective:

1) The location server receives DL PRS configuration details from a number of gNBs over NRPPa for the TRPs controlled by the gNBs.
2) The location server receives UE capabilities from a UE over LPP, including the number of UE antenna panels that can be used for UE transmissions and receptions.
3) The location server sends a request to the serving gNB of the UE to configure the UE with a number of SRS's. The request include proposed SRS configurations including UE antenna panel restrictions.
4) The location server receives an acknowledgement from the serving gNB over NRPPa that a number of SRS's will be configured, including SRS configuration details.
5) The location server configures the UE through signaling over LPP
   a) With a number of PRS's, each transmitted by a TRP
   b) To perform and report a UE Rx-Tx Time difference measurement for each UE antenna panel and each TRP in a set of TRPs.
6) The location server receives gNB Rx-Tx time difference measurements over NRPPa from a number of gNBs.
7) The location server receives UE Rx-Tx time difference measurements over LPP from the UE.
8) For each TRP the location server calculates RTTs between the TRP and the UE based on the UE Rx-Tx Time difference and gNB Rx-Tx time difference measurements for the TRP that are based on the same UE antenna panel. For a given TRP, one RTT is calculated for each UE antenna panel, assuming that the corresponding gNB and UE measurements were performed, and the results signaled to the location server. In the RTT calculations the frame offsets between TRPs may also be considered.
9) The location server estimates the position of the UE based on the RT measurements towards a number of TRPs utilizing that the RT measurements corresponding to different UE antenna panels have different systematic errors.

The following items are notable with respect to operations at the respective entities involved in RTT-positioning using UE antenna panel restriction for SRS transmission:

1) The capability signaling of the number of UE antenna panels.
2) The introduction of a restriction to which UE antenna panel to use for the SRS transmission and the corresponding configuration signaling.
3) The use of SRS transmissions from multiple antenna panel towards the same TRP, for positioning.
4) Multiple UE Rx-Tx Time difference measurements being performed by the UE towards the same TRP but utilizing different UE antenna panels
   a) The corresponding UE Rx-Tx Time difference measurement configuration.
5) The use of UE antenna panel info to reduce the impact on positioning accuracy of systematic errors in the TX timing related the different UE antenna panels. RTT-positioning using UE beam and panel sweep This embodiment is based on a combination of UE beam and panel sweep for SRS transmission and the use of multiple UE Rx-Tx Time difference measurements towards the same TRP but utilizing different UE antenna panels.

Operations from UE Perspective
1) The UE signals its capabilities over LPP to the location server, including that the UE supports beam and panel sweeping of the SRS.
2) The UE is configured over RRC by its serving gNB with a beam and panel sweep SRS. The SRS does not have any spatial relation.
3) The UE is configured by the location server over LPP
   a) With a number of PRS's, each transmitted by a TRP
   b) To perform and report a UE Rx-Tx Time difference measurement for each UE antenna panel and each TRP in a set of TRPs.
4) The UE performs the UE Rx-Tx Time difference measurements and reports the measurement results to the location server.
5) The UE transmits the configured SRS using beam and panel sweeping.

Operations from Serving gNB Perspective:
1) The serving gNB provides DL PRS configuration details over NRPPa to the location server for the TRPs controlled by the gNB.
2) The serving gNB receives a request over NRPPa from the location server to configure a UE with a beam and panel sweep SRS, including proposed SRS configurations.
3) The serving gNB signals an acknowledgement over NRPPa to the location server that an SRS will be configured, including SRS configuration details.
4) The serving gNB configures the UE through RRC signaling with a beam and panel sweep SRS.
5) The serving gNB receives a request over NRPPa from the location server to perform and report gNB Rx-Tx time difference measurements.
6) The gNB transmits a number of DL PRSs from the TRPs that the gNB controls.
7) For each TRP controlled by the serving gNB and for each UE antenna panel the gNB receives the SRS beam sweep and performs a gNB Rx-Tx time difference measurement, assuming that at least one SRS beam was received with sufficient signal strength to allow the measurement to be performed.
8) The serving gNB signals the gNB Rx-Tx time difference measurements over NRPPa to the location server.

Operations Non-Serving gNB Perspective:
1) The gNB provides DL PRS configuration details over NRPPa to the location server for the TRPs controlled by the gNB.
2) The gNB receives a request over NRPPa from the location server to perform and report gNB Rx-Tx time difference measurements. The request includes SRS configuration details to be used for the measurements.
3) The gNB transmits a number of DL PRSs from the TRPs that the gNB controls.
4) For each TRP controlled by the gNB and for each UE antenna panel the gNB receives the SRS beam sweep and performs a gNB Rx-Tx time difference measurement, assuming that at least one SRS beam was received with sufficient signal strength to allow the measurement to be performed.
5) The gNB signals the gNB Rx-Tx time difference measurements over NRPPa to the location server.

Operations from Location Server Perspective:
1) The location server receives DL PRS configuration details from a number of gNBs over NRPPa for the TRPs controlled by the gNBs.
2) The location server receives UE capabilities from a UE over LPP, including the number of UE antenna panels that can be used for UE transmissions and receptions.
3) The location server sends a request to the serving gNB of the UE to configure the UE with a beam and panel sweep SRS.
4) The location server receives an acknowledgement from the serving gNB over NRPPa that an SRS's will be configured, including SRS configuration details.
5) The location server sends a request to a number of gNBs to perform and report gNB Rx-Tx time difference measurements.
6) The location server configures the UE through signaling over LPP
   a) With a number of PRS's, each transmitted by a TRP
   b) To perform and report a UE Rx-Tx Time difference measurement for each UE antenna panel and each TRP in a set of TRPs.
7) The location server receives gNB Rx-Tx time difference measurements over NRPPa from a number of gNBs.
8) The location server receives UE Rx-Tx time difference measurements over LPP from the UE.
9) For each TRP the location server calculates RTTs between the TRP and the UE based on the UE Rx-Tx Time difference and gNB Rx-Tx time difference measurements for the TRP that are based on the same UE antenna panel. For a given TRP, one RTT is calculated for each UE antenna panel, assuming that the corresponding gNB and UE measurements were performed, and the results signaled to the location server. In the RTT calculations the frame offsets between TRPs may also be considered.
10) The location server estimates the position of the UE based on the RTT measurements towards a number of TRPs utilizing that the RTT measurements corresponding to different UE antenna panels have different systematic errors.

At least the following items are notable regarding the operations of the respective entities involved in RTT-positioning using UE beam and panel sweep:
1) Signaling of UE beam and panel sweep capability.
2) The use of SRS beam and panel sweeping rather than utilizing spatial relations.
   a) The corresponding SRS configuration signaling.
3) The use of SRS transmissions from multiple antenna panel towards the same TRP, for positioning.

4) Multiple UE Rx-Tx Time difference measurements being performed by the UE towards the same TRP but utilizing different UE antenna panels
   a) The corresponding UE Rx-Tx Time difference measurement configuration.
5) The use of UE antenna panel info to reduce the impact on positioning accuracy of systematic errors in the TX timing related the different UE antenna panels.

RTT-Positioning Using UE Reporting of the Antenna Panel Used for SRS Transmission and UE Rx Tx Time Difference Measurement This embodiment is based on UE reporting of the antenna panel used for SRS transmission and UE Rx Tx time difference measurement.

Operations from UE Perspective
1) The UE signals its capabilities over LPP to the location server, including its capability to report which UE antenna panel that is used for SRS transmissions and for the UE Rx Tx time difference measurement.
2) The UE is configured over RRC by its serving gNB with a number of SRS's, each with a spatial relation to a DL RS (e.g., a DL PRS or an SSB) transmitted by a TRP.
3) The UE is configured by the location server over LPP
   a) With a number of PRS's, each transmitted by a TRP
   b) To perform and report a UE Rx-Tx Time difference measurements for a set of TRPs. The measurement reports are configured to include the ID of the UE antenna panel used for the measurement.
4) The UE performs the UE Rx-Tx Time difference measurements and reports the measurement results to the location server including UE antenna panel IDs.
5) The UE transmits the configured SRS.
6) The UE reports the UE antenna panel ID used for the SRS transmission over LPP to the location server.

Operations from Serving gNB Perspective:
1) The gNB provides DL PRS configuration details over NRPPa to the location server for the TRPs controlled by the gNB.
2) The serving gNB receives a request over NRPPa from the location server to configure a UE with a number of SRS, including proposed SRS configurations.
3) The serving gNB signals an acknowledgement over NRPPa to the location server that a number of SRS's will be configured, including SRS configuration details.
4) The serving gNB configures the UE through signaling with a number of SRS's, each with a spatial relation to a DL RS (e.g., a DL PRS or an SSB) transmitted by a TRP.
5) The serving gNB receives a request over NRPPa from the location server to perform and report gNB Rx-Tx time difference measurements.
6) The serving gNB transmits a number of DL PRSs from the TRPs that the gNB controls.
7) The serving gNB receives the SRSs configured with a spatial relation towards a DL PRS or SSB transmitted from a TRP controlled by the serving gNB and performs the gNB Rx-Tx time difference measurement for each SRS received with sufficient signal strength.
8) The serving gNB signals the gNB Rx-Tx time difference measurements over NRPPa to the location server.

Operations from Non-Serving gNB Perspective:
1) The gNB provides DL PRS configuration details over NRPPa to the location server for the TRPs controlled by the gNB.
2) The gNB receives a request over NRPPa from the location server to perform and report gNB Rx-Tx time difference measurements. The request includes SRS configuration details to be used for the measurements.
3) The gNB transmits a number of DL PRSs from the TRPs that the gNB controls.
4) The gNB receives the SRSs configured with a spatial relation towards a DL PRS or SSB transmitted from a TRP controlled by the gNB and performs the gNB Rx-Tx time difference measurement for each SRS received with sufficient signal strength.
5) The gNB signals the gNB Rx-Tx time difference measurements over NRPPa to the location server.

Operations from Location Server Perspective:
1) The location server receives DL PRS configuration details from a number of gNBs over NRPPa for the TRPs controlled by the gNBs.
2) The location server receives UE capabilities from a UE over LPP, including the capability to report which UE antenna panel that is used for SRS transmissions and for the UE Rx Tx time difference measurement.
3) The location server sends a request to the serving gNB of the UE to configure the UE with a number of SRS's. The request includes proposed SRS configurations including UE antenna panel restrictions.
4) The location server receives an acknowledgement from the serving gNB over NRPPa that a number of SRS's will be configured, including SRS configuration details.
5) The location server configures the UE through signaling over LPP
   a) With a number of PRS's, each transmitted by a TRP
   b) To perform and report a UE Rx-Tx Time difference measurement for a set of TRPs and to include the UE antenna panel ID in the measurement report.
   c) To report the UE antenna panel ID for each SRS transmission.
6) The location server receives gNB Rx-Tx time difference measurements over NRPPa from a number of gNBs.
7) The location server receives UE Rx-Tx time difference measurements over LPP from the UE.
8) The location server receives the UE antenna panel ID used for each SRS transmission over LPP from the UE.
9) For each TRP the location server calculates the RTT between the TRP and the UE based on the UE Rx-Tx Time difference and gNB Rx-Tx time difference measurements. In the RTT calculations the frame offsets between TRPs may also be taken into account.
10) The location server estimates the position of the UE based on the RTT measurements towards a number of TRPs utilizing that the RTT measurements corresponding to different UE antenna panels have different systematic errors.

At least the following operations are notable for the respective entities involved in RTT-positioning using UE reporting of the antenna panel used for SRS transmission and UE Rx Tx time difference measurement:
1) The signaling of the UE capability to report which UE antenna panel that is used for SRS transmissions and for the UE Rx Tx time difference measurements.
2) Signaling of which UE antenna panel that is used for SRS transmissions.
3) Signaling of which UE antenna panel that is used for the UE Rx Tx time difference measurements.
4) The use of UE antenna panel info to reduce the impact on positioning accuracy of systematic errors in the TX timing related the different UE antenna panels.

DL TDOA positioning utilizing multiple RSTD measurements towards the same TRP but using different UE antenna panels.

Operations from UE Perspective
1) The UE signals its capabilities over LPP to the location server, including the number of UE antenna panels that can be used for UE reception.
2) The UE is configured by the location server over LPP
   a) With a number of PRSs, each transmitted by a TRP
   b) To perform and report RSTD measurement for each UE antenna panel and each TRP in a set of TRPs.
3) The UE performs the RSTD measurements and reports the measurement results to the location server.

Operations from gNB Perspective:
1) The gNB provides DL PRS configuration details over NRPPa to the location server for the TRPs controlled by the gNB.
2) The gNB transmits a number of DL PRSs from the TRPs that the gNB controls.

Operations from Location Server Perspective:
1) The location server receives DL PRS configuration details from a number of gNBs over NRPPa for the TRPs controlled by the gNBs.
2) The location server receives UE capabilities from a UE over LPP, including the number of UE antenna panels that can be used for UE reception.
3) The location server configures the UE through signaling over LPP
   a) With a number of PRS's, each transmitted by a TRP
   b) To perform and report RSTD measurement for each UE antenna panel and each TRP in a set of TRPs.
   c) To perform inter panel time difference measurements for the reference TRP.
4) The location server receives RSTD measurements over LPP from the UE for each TRP and UE antenna panel.
5) The location server receives inter panel time difference measurements (IPTD) for the reference TRP.
6) The location server estimates the position of the UE based on the RSTD and IPTD measurements towards a number of TRPs utilizing that the measurements corresponding to different UE antenna panels have different systematic errors.

At least the following aspects are notable regarding DL TDOA positioning utilizing multiple RSTD measurements towards the same TRP but using different UE antenna panels:
1) The capability signaling of the number of UE antenna panels
2) Multiple RSTD measurements being performed by the UE towards the same TRP but utilizing different UE antenna panels
   a) The corresponding RSTD measurement configuration.
3) Inter panel time difference measurements (IPTD measurements)
   a) Configuration, performing, reporting.
4) The use of UE antenna panel info to reduce the impact on positioning accuracy of systematic errors in the TX timing related the different UE antenna panels.

DL TDOA positioning where the UE compensates RSTD measurements for IPTDs.

Operations from UE Perspective
1) The UE signals its capabilities over LPP to the location server, including its capability to measure IPTD's and use this to compensate RSTD measurements as well as the number of UE antenna panels.
2) The UE is configured by the location server over LPP
   a) With two PRS resource sets for each TRP in a set of TRPs. One intended for RSTD measurements and one intended for IPTD measurements.
   b) To perform RSTD measurements for a number of TRPs and to report these RSTD measurements after compensating for measured IPTDs.
3) The UE performs the IPTD measurements and RSTD measurements and reports the RSTD measurement results to the location server after compensating for IPTDs.

Operations from gNB Perspective:
1) The gNB provides DL PRS configuration details over NRPPa to the location server for two DL PRS resource sets for each TRP controlled by the gNB.
2) The gNB transmits two DL PRS resource sets from each TRP controlled by the gNB.

Operations from Location Server Perspective:
1) The location server receives DL PRS configuration details from a number of gNBs over NRPPa for two DL PRS resource sets for each TRP controlled by the gNB.
2) The location server receives UE capabilities from a UE over LPP, including its capability to measure IPTD's and use this to compensate RSTD measurements as well as the number of UE antenna panels.
3) The location server configures the UE through signaling over LPP
   a) With two PRS resource sets for each TRP in a set of TRPs. One intended for RSTD measurements and one intended for IPTD measurements.
   b) To perform RSTD measurements for a number of TRPs and to report these RSTD measurements after compensating for measured IPTDs.
4) The location server receives RSTD measurements (compensated for IPTDs by the UE) over LPP from the UE for each TRP.
5) The location server estimates the position of the UE based on the RSTD measurements towards a number of TRPs.

At least the following aspects are notable regarding DL TDOA positioning where the UE compensates RSTD measurements for IPTDs:
1) The capability signaling of the number of UE antenna panels and of the UE capability to measure IPTD's and to use this to compensate RSTD measurements.
2) Configuration of DL PRS resource set for IPTD measurements.
3) Configuration of IPTD measurements.
4) IPTD measurements being performed by the UE.
5) RSTD measurements being compensated for IPTDs by the UE.

UL TDOA-Positioning Using UE Beam and Panel Sweep

This embodiment is based on UE beam and panel sweep for SRS transmission.

Operations from UE Perspective
1) The UE signals its capabilities over LPP to the location server, including that the UE supports beam and panel sweeping of the SRS and the number of UE antenna panels that can be used for UE transmissions.
2) The UE is configured over RRC by its serving gNB with a beam and panel sweep SRS. The SRS doesn't have any spatial relation.
3) The UE transmits the configured SRS using beam and panel sweeping.

Operations from Serving gNB Perspective:
1) The serving gNB receives a request over NRPPa from the location server to configure a UE with a beam and panel sweep SRS, including proposed/recommended SRS configurations.
2) The serving gNB signals an acknowledgement over NRPPa to the location server that an SRS will be configured, including SRS configuration details.
3) The serving gNB configures the UE through RRC signaling with a beam and panel sweep SRS.
4) The serving gNB receives a request from the location server to perform and report RTOA measurements for multiple UE antenna panels based on a beam and panel swept SRS.
5) For each TRP controlled by the serving gNB and for each UE antenna panel the gNB receives the SRS beam sweep and performs a RTOA measurement, assuming that at least one SRS beam was received with sufficient signal strength to allow the measurement to be performed.
6) The serving gNB signals the RTOA measurements to the location server.

Operations from Non-Serving gNB Perspective:
1) The non-serving (can be a neighbor) gNB receives a request from the location server to perform and report RTOA measurements for multiple UE antenna panels based on a beam and panel swept SRS.
2) For each TRP controlled by the non-serving gNB and for each UE antenna panel the gNB receives the SRS beam sweep and performs a RTOA measurement, assuming that at least one SRS beam was received with sufficient signal strength to allow the measurement to be performed.
3) The non-serving gNB signals the RTOA measurements to the location server.

Operations from Location Server Perspective:
1) The location server receives UE capabilities from a UE over LPP, including that the UE supports beam and panel sweeping of the SRS and the number of UE antenna panels that can be used for UE transmissions.
2) The location server sends a request to the serving gNB of the UE to configure the UE with a beam and panel sweep SRS.
3) The location server sends a request to a number of gNBs to perform and report RTOA measurements.
4) The location server receives RTOA measurements from gNBs for each TRP and UE antenna panel.
5) The location server estimates the UE position based on the RTOA measurements for each TRP and UE antenna panel utilizing that the RTOA measurements corresponding to different UE antenna panels have different systematic errors.

At least the following aspects are notable regarding UL TDOA-positioning using UE beam and panel sweep:
1) Signaling of UE beam and panel sweep capability.
2) The use of SRS beam and panel sweeping rather than utilizing spatial relations.
    a) The corresponding SRS configuration signaling.
3) The use of SRS transmissions from multiple antenna panel towards the same TRP, for positioning.
4) Multiple RTOA measurements being performed by the gNB for the same TRP and UE but utilizing different UE antenna panels.
5) The use of UE antenna panel info to reduce the impact on positioning accuracy of systematic errors in the TX timing related the different UE antenna panels.

Alternative Signaling for Set Up of DL PRS Transmissions from gNB

In the system embodiments above the gNB is configured with DL PRS's e.g., over O&M and the gNB provides the DL PRS configuration details over NRPPa to the location server.

The signaling for this is simply as below:
Operations from gNB Perspective:
1) The gNB provides DL PRS configuration details over NRPPa to the location server for the TRPs controlled by the gNB.

Operations from Location Server Perspective:
1) The location server receives DL PRS configuration details from the gNB over NRPPa for the TRPs controlled by the gNB.

In alternative embodiments the DL PRS configuration is steered by the location server by the location server requesting the gNB to transmit a number of DL PRSs including proposed/recommended DL PRS configuration details. The gNB then replies with an acknowledgement including that a number of DL PRS's will be configured, including DL PRS configuration details. The DL PRS related signaling between the gNB and the location server then instead looks like this:

Operations from gNB Perspective:
1) The serving gNB receives a request over NRPPa from the location server to transmit a number of DL PRSs from the TRPs controlled by the serving gNB including proposed/recommended DL PRS configuration details.
2) The serving gNB sends an acknowledgement to the location server over NRPPa that a number of DL PRS's will be configured, including DL PRS configuration details.

Operations from Location Server Perspective:
1) The location server sends a request to the gNB over NRPPa to transmit a number of DL PRSs from the TRPs controlled by the serving gNB including proposed/recommended DL PRS configuration details.
2) The location server receives an acknowledgement from the gNB over NRPPa that a number of DL PRS's will be configured, including DL PRS configuration details.

Terminology

The term 'UE antenna panel' may refer to physically distinctly separated UE antenna panels but could alternatively be interpreted as virtual UE antenna panels that are independent of UE building practice. Virtual antenna panels may here be viewed as groups of UE antenna Tx beams such that the maximum Tx timing differences within a group (i.e., within a virtual UE antenna panel) is smaller than the maximum Tx timing differences for all beams.

Similarly, a 'UE antenna panel ID' may identify physically distinctly separated UE antenna panels or alternatively a 'UE antenna panel ID' may identify a group of UE antenna Tx beams, as described above.

This disclosure uses the term DL PRS. The DL PRS could, however, be replaced with another DL RS. This disclosure also uses the term UL PRS. The UL PRS could, however, be replaced with another UL RS. Further, the disclosure uses the term gNB, the gNB could however be replaced by a differently named network node controlling Rx and/or Tx from the TRPs. Such terminology is based on the 5G NR specifications, but the techniques disclosed herein apply to LTE, 6G, and other radio access technologies. Still further, the term UL TCI state could also refer to a generic TCI state utilized for both uplink and downlink signals.

Example Features or Operations of Interest

The use of UE antenna panel information for SRS transmissions to reduce errors in positioning due to RX and TX timing differences between UE antenna panels.

The use of multiple measurements towards the same TRP but based on different UE antenna panels for SRS transmissions and/or UE RSTD/UE Rx-Tx time difference measurements to reduce errors in positioning due to RX and TX timing differences between UE antenna panels.

Estimating systematic errors related to RX/TX timing errors for different UE antenna panels.

Forming measurement differences for which systematic errors related to RX/TX timing errors cancel out.

Embodiments herein also include corresponding apparatuses. Embodiments herein for instance include a wireless device configured to perform any of the steps of any of the embodiments described above for a UE, also referred to as a "wireless device".

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a UE that comprises an antenna configured to send and receive wireless signals. The UE also comprises radio front-end circuitry connected to the antenna and to processing circuitry and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node, such as a gNB, configured to perform any of the steps of any of the embodiments described above for radio network nodes.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

Embodiments herein also include a location server, such as an LMF, configured to perform any of the steps of any of the embodiments described above for location servers.

Embodiments also include a location server comprising processing circuitry and power supply circuitry. The processing circuitry is configured to perform any of the steps of any of the embodiments described above for the location server. The power supply circuitry is configured to supply power to the location server.

Embodiments further include a location server comprising processing circuitry. The processing circuitry is configured to perform any of the steps of any of the embodiments described above for the location server. In some embodiments, the location server further comprises communication circuitry.

Embodiments further include a location server comprising processing circuitry and memory. The memory contains instructions executable by the processing circuitry whereby the locations server is configured to perform any of the steps of any of the embodiments described above for the location server.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 3:
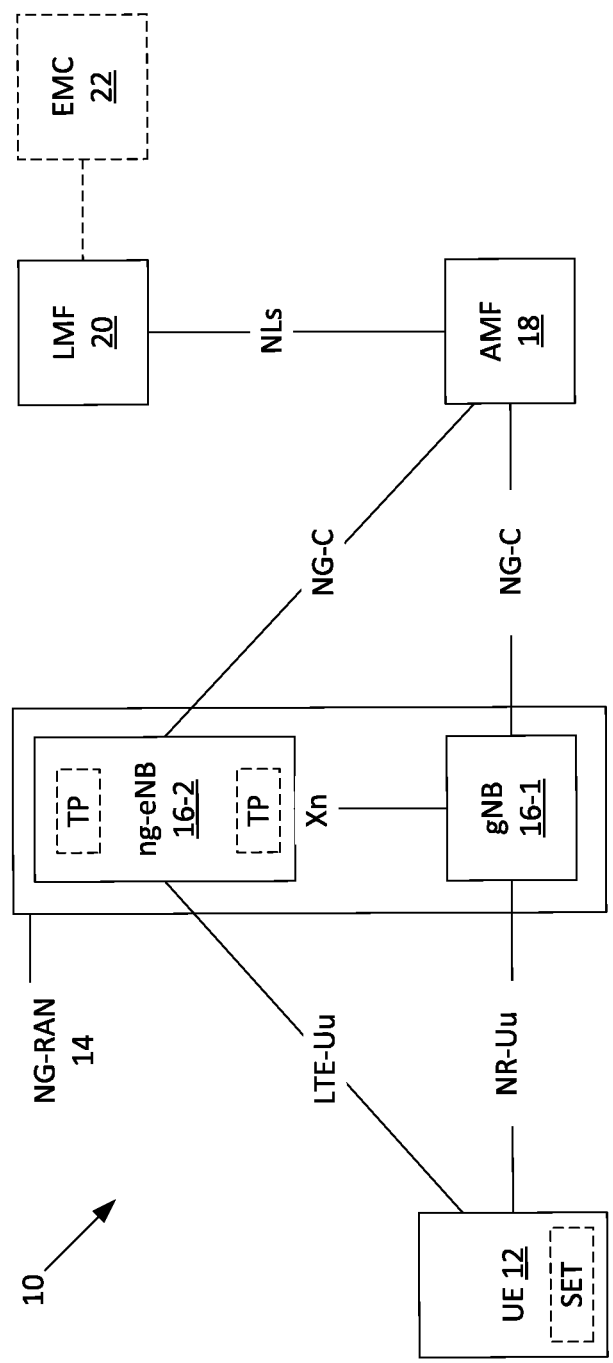
FIG. 3 is a block diagram of one embodiment of a wireless communication network and an associated UE.

FIG. 3 illustrates one embodiment of a wireless communication network 10 that operates as an access network for UEs 12 (one shown) or otherwise provides one or more communication services to UEs 12. Although the depicted entities are labelled according to 5G NR nomenclature, the illustrated arrangement is a non-limiting example.

The network 10 includes a Radio Access Network (RAN) 14 that includes one or more radio network nodes 16—e.g., one or both of a 5G NR base station (gNB) 16-1 and a 4G LTE base station (ng-eNB) 16-2, configured for connection to a 5G core network that includes an Access and Mobility Management Function (AMF) 18, to manage access and mobility of UEs 12, and a location server 20, also referred to as a "Location Management Function" 20 or LMF 20. Additionally, or alternatively, the core network portion of the network 10 includes an EMC 22.

As seen in FIGS. 4 and 5, the network 10 may be understood as comprising a plurality of transmission/reception points (TRPs) 30, with 30-1 through 30-4 shown by way of example. Positioning of a UE 12 is accomplished, for example, based on one or more of the TRPs 30 transmitting signals to or receiving signals from a UE 12. Each TRP 30 comprises a transmit/receive antenna or antennas—such as beamforming antenna arrays—and may be integrated within or co-located with a radio network node 32, with network nodes 32-1 through 32-4 shown for example.

In one or more embodiments, each combination of TRP 30 and a co-located network node 32 can be understood as being a radio network node 16 in the context of FIG. 3—e.g., one of the base stations 16 shown in FIG. 3. FIG. 5 illustrates a variation in which one network node 32 controls or is otherwise associated with multiple TRPs 30. As an example, a base station 16 may be implemented in a distributed fashion, wherein a digital unit (DU) that controls one or more remote radio units (RRUs), with each RRU providing antenna transmission/reception. Thus, it will be understood that a pairing of a network node 32 with a TRP 30 may function as a base station of a RAN and that one network node 32 may pair with one or more than one TRP 30.

In practice, a wireless network may further include any additional elements suitable to support communication between wireless devices or between a wireless device and another communication device, such as a landline telephone, a service provider, or any other network node or end device. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network 10 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 32 and UE 12 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

As seen in FIG. 5, the radio link(s) between a UE 12 and each of one or more TRPs 30 may carry signals used for positioning the UE, e.g., Downlink (DL) Positioning Reference Signals (PRS) or Uplink (UL) Sounding Reference Signals (SRS). The signal measurements used for positioning include, for example, angle-of-arrival (AOA) measurements or time-of-arrival (TOA) measurements. Measurements made on multiple radio links with respect to geographically-separated TRPs 30 support multilateration-based positioning of the UE 12, with the understanding that the signal measurements may be made at any one of or any combination of the UE 12 and the involved TRP(s) 30, and that the corresponding positioning calculations may be made at any one of or any combination of the UE 12, the involved TRP(s) 30/network nodes 32, and LMF 20.

Figure 6:
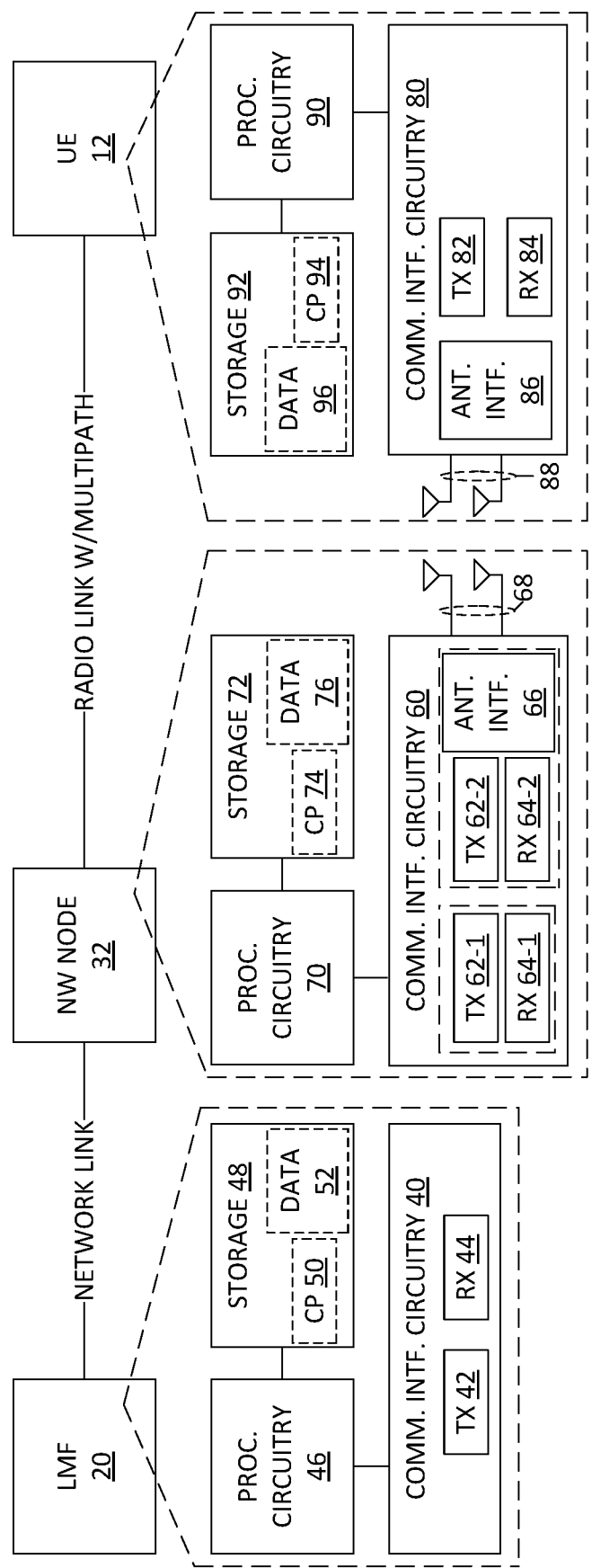
FIG. 6 is a block diagram of example implementation details for a location management function LMF, a network node, and a UE.

FIG. 6 illustrates example embodiments for a UE 12, a network node 32, and an LMF 20, where the network node 32 impliedly integrates a TRP 30 for radio transmission/reception. However, it should be understood that the radio antennas and at least some of the associated interface and radio circuitry may be remote—e.g., implemented in a remotely located TRP 30.

The example LMF 20 includes communication interface circuitry 40, including transmitter circuitry 42 and receiver circuitry 44. The communication interface circuitry 40 comprises, for example, a computer-network interface for communicatively coupling to one or more network nodes 32, in support of exchanging positioning-protocol signaling with one or more network node 32 and, via one or more of the network nodes 32, a UE 12 that is targeted for positioning.

The LMF 20 further includes processing circuitry 46, which in one or more embodiments includes or is associated with storage 48. The storage 48 comprises one or more types of memory or storage devices and may be broadly understood as comprising one or more types of computer-readable media. Example storage includes any one or more of short-term storage (volatile) and long-term storage (non-volatile), such as SRAM, DRAM, FLASH, EEPROM, Solid State Disk (SSD), magnetic disk, etc.

In at least one embodiment, the storage 48 stores one or more computer programs (CPs) 50 comprising computer program instructions that, when executed by one or more processors of the LMF 20, configure the processor(s)—specially adapt the processor(s)—to carry out any of the LMF operations described herein. In such cases, the processing circuitry 46 comprises one or more processors, such as one or more microprocessors or digital signal processors (DSPs) or processing "cores" implemented in one or more FPGAs, ASICs, or Systems-on-a-Chip (SoCs).

The storage 48 may also include one or more items of data 52. Such data may be configuration data that is pre-provisioned or acquired during live operation.

Broadly, the processing circuitry 46 is configured to carry out any of the LMF operations described herein and comprises fixed circuitry or programmatically configured circuitry, or a mix of fixed and programmatically configured circuitry. Further, it will be understood that the processing circuitry 46 may receive input data for processing and may output data as processing results, via messages or other signaling exchanged through the communication interface circuitry 40.

The example network node 32 includes communication interface circuitry 60, including transmitter circuitry 62-1 and receiver circuitry 64-1 that are configured as a computer-network interface or are otherwise adapted for communicatively coupling to other nodes, such as the LMF 20, in support of exchanging positioning-protocol signaling. The communication interface circuitry 60 further comprises transmitter circuitry 62-2 and receiver circuitry 64-2 that are configured for radio communications via one or more antennas 68 that are communicatively coupled to the transmitter/receiver circuitry 62-2 and 64-2 via antenna interface circuitry 66.

As noted earlier, at least some of the radio-communication and antenna-interfacing circuitry may be implemented remotely from the network node 32, as a remote TRP 30. Regardless of whether the network node 32 integrates one or more TRPs 30 or interfaces with one or more remote TRPs 30, the network node 32 in one or more embodiments may be regarded as a base station or other radio network node that makes signal-timing measurements with respect to radio signals transmitted to or received from one or more UEs 12 via one or more TRPs 30 or has access to such measurements.

The network node 32 further includes processing circuitry 70, which in one or more embodiments includes or is associated with storage 72. The storage 72 comprises one or more types of memory or storage devices and may be broadly understood as comprising one or more types of computer-readable media. Example storage includes any one or more of short-term storage (volatile) and long-term storage (non-volatile), such as SRAM, DRAM, FLASH, EEPROM, Solid State Disk (SSD), magnetic disk, etc.

In at least one embodiment, the storage 72 stores one or more computer programs (CPs) 74 comprising computer program instructions that, when executed by one or more processors of the network node 32, configure the processor(s)—specially adapt the processor(s)—to carry out any of the network-node operations described herein. In such cases, the processing circuitry 70 comprises one or more processors, such as one or more microprocessors or digital signal processors (DSPs) or processing "cores" implemented in one or more FPGAs, ASICs, or Systems-on-a-Chip (SoCs).

The storage 72 may also include one or more items of data 76. Such data may be configuration data that is pre-provisioned or acquired during live operation.

Broadly, the processing circuitry 70 is configured to carry out any of the network-node operations described herein and comprises fixed circuitry or programmatically configured circuitry, or a mix of fixed and programmatically configured circuitry. Further, it will be understood that the processing circuitry 70 may receive input data for processing and may output data as processing results, via messages or other signaling exchanged through the communication interface circuitry 60.

Network node 32 may also include multiple sets of the various illustrated components for different wireless technologies integrated into network node 32, such as, for example, GSM, WCDMA, LTE, NR, Wi-Fi, or Bluetooth wireless technologies. These wireless technologies may be integrated into the same or different chip or set of chips and other components within network node 32. The example UE 12—or wireless device 12—includes communication interface circuitry 80, including transmitter circuitry 82 and receiver circuitry 84 that are configured for radio communications with TRPs 30 of the network 10, according to the Radio Access Technology (RAT) or RATs used by respective ones of the TRPs 30. The communication interface circuitry 80 supports, for example, radiofrequency signal transmission and reception in one or more frequency bands below 6 GHz or in one more frequency bands above 6 GHz and may be configured to operate in accordance with the 3GPP specification for 5G NR or one or more other 3GPP network types. In any case, the transmitter/receiver circuitry 82 and 84 interface to two or more antennas 88 via antenna interface circuitry 86.

Each of the antennas 88 may be an antenna panel and it will be understood that the UE has internal (signal) paths corresponding to each of the antennas 88 and that these paths may have different path delays—e.g., differences in filter group delays. Internal timing differences in the receive direction at the UE 12 affect signal-timing measurements made by the UE 12 on a signal received on different antennas 88, and internal timing differences in the transmit direction at the UE 12 affect signal-timing measurements made by the network 10 when the network 10 receives signals transmitted by more than one of the antennas 88.

The UE 12 further includes processing circuitry 90, which in one or more embodiments includes or is associated with storage 92. The storage 92 comprises one or more types of memory or storage devices and may be broadly understood as comprising one or more types of computer-readable media. Example storage includes any one or more of short-term storage (volatile) and long-term storage (non-volatile), such as SRAM, DRAM, FLASH, EEPROM, Solid State Disk (SSD), magnetic disk, etc.

In at least one embodiment, the storage 92 stores one or more computer programs (CPs) 94 comprising computer program instructions that, when executed by one or more processors of the UE 12, configure the processor(s)—specially adapt the processor(s)—to carry out any of the network-node operations described herein. In such cases, the processing circuitry 70 comprises one or more processors, such as one or more microprocessors or digital signal processors (DSPs) or processing "cores" implemented in one or more FPGAs, ASICs, or Systems-on-a-Chip (SoCs).

The storage 92 may also include one or more items of data 96. Such data may be configuration data that is pre-provisioned or acquired during live operation.

Broadly, the processing circuitry 90 is configured to carry out any of the UE operations described herein and comprises fixed circuitry or programmatically configured circuitry, or a mix of fixed and programmatically configured circuitry. Further, it will be understood that the processing circuitry 90 may receive input data for processing and may output data as processing results, via messages or other signaling exchanged through the communication interface circuitry 80.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Wireless device 12 may include multiple sets of one or more of the illustrated components for different wireless technologies supported by wireless device 12, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within wireless device 12.

Figure 7:
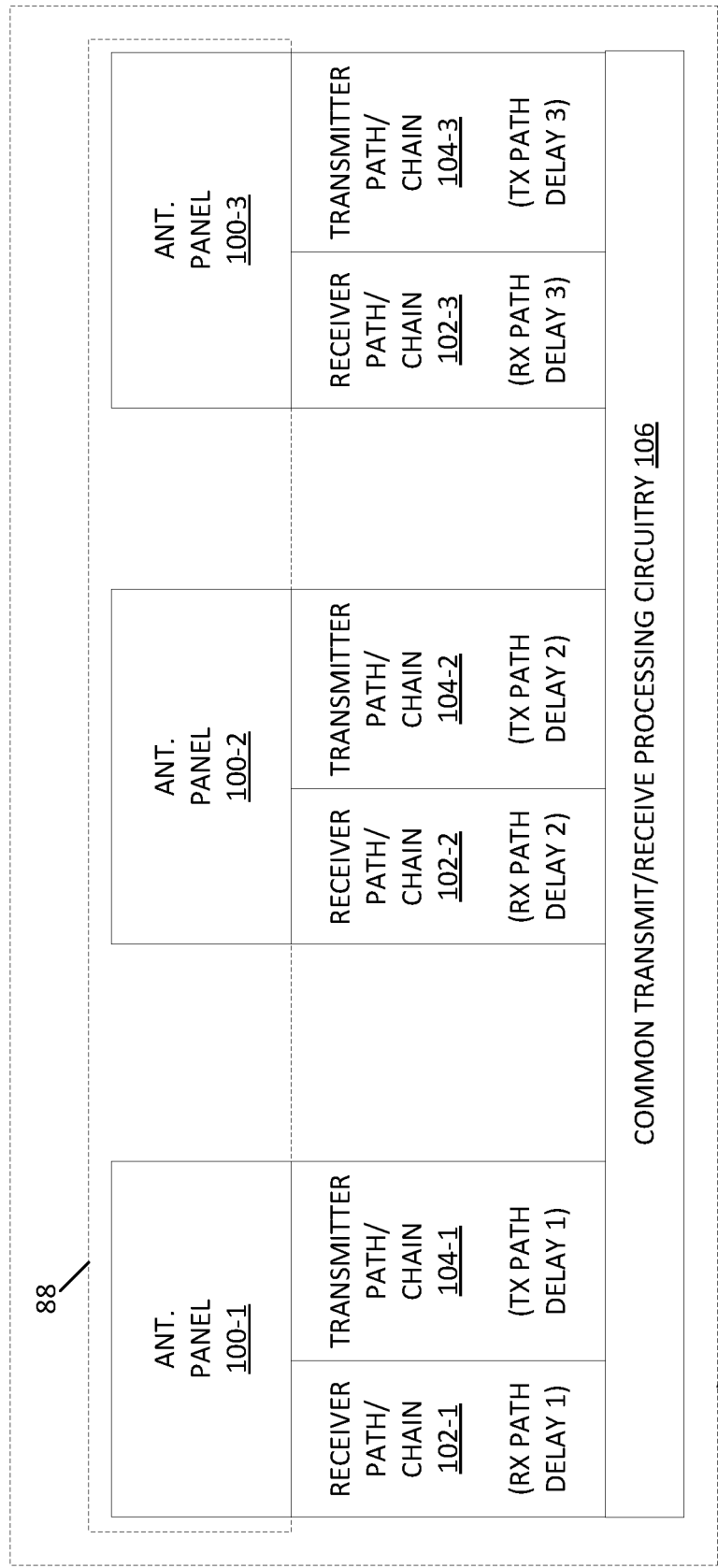
FIG. 7 is a block diagram of example details highlighting inter-antenna timing differences internal to a UE, as a consequence of differences in the internal path delays of the UE with respect to different antennas of the UE.

FIG. 7 offers more detail for an example arrangement where the multiple antennas 88 of the UE 12 comprise multiple antenna panels 100, e.g., antenna panel 100-1, antenna panel 100-2, and antenna panel 100-3. Each antenna panel 100 couples to common transmit/received processing circuitry 106 of the UE 12 through a respective receiver path/chain 102 and a respective transmitter/path chain 104. That is, the antenna panel 100-1 couples to the common circuitry 106 via a receiver path/chain 102-1 and a transmitter path/chain 104-1, the antenna panel 100-2 couples to the common circuitry 106 via a receiver path/chain 102-2 and a transmitter path/chain 104-2, and the antenna panel 100-3 couples to the common circuitry 106 via a receiver path/chain 102-3 and a transmitter path/chain 104-3.

Here, the phrase "path/chain" means that the circuit path internal to the UE between the common processing circuitry 106 and any respective one of the antenna panels 100 may be regarded as a circuit path or chain. "Branch" is another term that might be used in this context. A key point here is that the internal connections within the UE 12 to the respective antenna panels 100 (or, more generally, the respective antennas 88) may impart different delays, such that any comparison or use of signal-arrival times as measured at the UE 12 across two or more of the antenna panels 100 will have systematic errors arising from differences in the receiver-path delays associated with the respective antenna panels 100. Likewise, to the extent that the network 10 makes arrival-time measurements on signals transmitted from more than one of the antenna panels 100 of the UE 12, those arrival-time measurements will have systematic errors arising from differences in the transmitter-path delays associated with the respective antenna panels 100.

Figure 8:
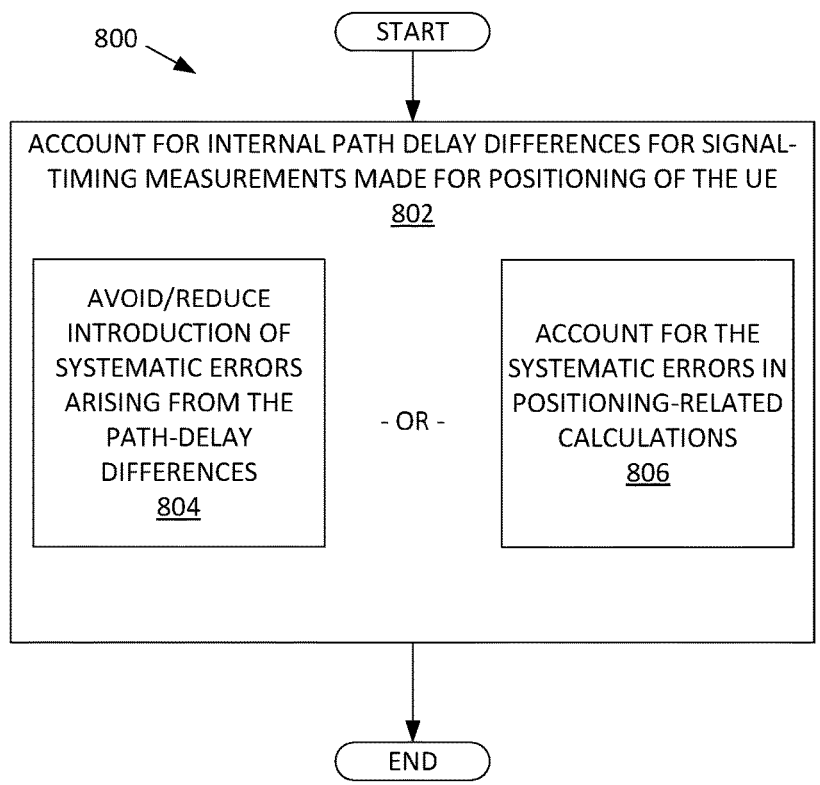
FIGS. 8-10 are logic flow diagrams of example embodiments of methods of accounting for differences in the internal path delays as between the different antennas of a UE, for improving positioning of the UE.

FIG. 8 illustrates an example method 800 of accounting (Block 802) for path delay differences internal to the UE as between different antennas of a User Equipment (UE) in signal-timing measurements made for signals transmitted between the UE and a plurality of transmission/reception points (TRPs) of a wireless communication network for positioning of the UE.

The accounting includes (Block 804) avoiding or reducing the introduction of systemic errors arising from the internal path delay differences at the UE by coordinating, such as by signaling, which antenna is used at the UE with respect to each TRP among the involved TRPs or with respect to each radio resource among a plurality of radio resources configured for conveyance of the signals, or (Block 804) accounting for the systemic errors in positioning-related calculations that are on the signal-timing measurements.

Each antenna of the UE is an antenna panel, for example, with each antenna panel comprising an array of antenna elements for transmit or receive beamforming, such that the different antennas of the UE are different antenna panels and such that the internal path delay differences are inter-panel timing differences.

Accounting for the systemic errors in the positioning-related calculations comprises, in one example, compensating the signal-timing measurements using determined values for the internal path delay differences to compensate time-of-arrival measurements made at the UE across the different antennas. As another example, accounting for the systemic errors in the positioning-related calculations comprises using determined values for the internal path delay differences to compensate time-of-arrival measurements made at one or more of the involved TRPs with respect to the different antennas.

In one or more embodiments, the determined values for the internal path delay differences are preconfigured values stored in the UE. However, in one or more other embodiments, the determined values for the internal path delay differences are determined dynamically, based on the transmission of signals on a per antenna basis between the UE and a same one of the involved TRPs. Of course, the UE may be provisioned with preconfigured values for the inter-antenna delay differences and may replace or revise those values based on measurements made during live operation.

For example, the method 800 may include or be supported by performing a calibration procedure for determining the determined values for the internal path delay differences. However, the determined values are determined, one of the antennas may be designated as a reference antenna and the determined values for the internal path delay differences at the UE may correspondingly comprise a relative time difference for each remaining antenna, with respect to the reference antenna.

The method 800 may be performed in the wireless communication network, by one or more of the involved TRPs (or controlling network node) or a location server associated with the TRPs. The method may include the network determining the determined values for the internal path delay differences at the UE based on calibration operations between at least one of the TRPs and the UE or based on the network receiving the determined values for the internal path delay differences via reporting by the UE.

In embodiments that involve coordinating which antenna is used at the UE with respect to each TRP among the TRPs involved in positioning the UE, or with respect to each radio resource among the plurality of radio resources configured for conveyance of the signals used for positioning, the coordination may comprise restricting the signal-timing measurements to use a same one of the antennas of the UE, for all involved TRPs.

In another example, accounting for the systemic errors in positioning-related calculations that are based on the signal-timing measurements affected by the internal path delay differences at the UE comprises compensating the signal-timing measurements using determined values for the internal path delay differences.

In an example case, for determining the determined values for the internal path delay differences, the UE performs a plurality of transmit beam sweeps according to a configuration known to the network, where each transmit beam sweep involves transmission of a reference signal from a particular one of the antennas, as a particular one of the signals transmitted between the UE and the involved TRPs, and the network determines the determined values of the internal path delay differences based on receiving the signals transmitted in the respective transmit beam sweeps.

As another example, accounting for the systematic errors comprises accounting for the systematic errors within a system of equations that depends on the signal-timing measurements.

In another example, the method includes exchanging signaling between the UE and the network, to indicate which antennas are used with respect to each of the involved TRPs and/or with respect to particular ones among different radio resources that are configured for transmitting the signals.

In a case where the positioning is based on Downlink (DL) Time of Arrival (TOA) measurements made by the UE with respect to the involved TRPs, the method may include estimating the internal path delay differences of the UE based on receiving signals from a same one of the TRPs using each of the antennas, and either compensating raw TOA measurements made by the UE across the different antennas for the estimated internal path delay differences or reporting the raw TOA measurements to the network, along with the estimated internal path delay differences.

In a case where the positioning is based on Uplink (UL) Time of Arrival (TOA) measurements made by the involved TRPs with respect to the UE, the method may include the network compensating the TOA measurements using values for the internal path delay differences as reported by the UE or based on the network estimating the internal path delay differences, in dependence on at least one of the involved TRPs receiving signals from each of the antennas.

In a case where the positioning is based on Uplink (UL) Time of Arrival (TOA) measurements made by the involved TRPs with respect to the UE, the method may include the network compensating the TOA measurements using values for the internal path delay differences as reported by the UE or based on the network estimating the internal path delay differences, in dependence the involved TRPs collectively receiving signals from each of the antennas.

In a case where the signal-measurements involve signal reception at the UE using the different antennas, the internal path delay differences comprise receiver-path delay differences internal to the UE, and, in a case where the signal measurements involve signal transmission at the UE using the different antennas, the internal path delay differences comprise transmit-path delay differences internal to the UE. The receiver-path delay differences are not necessarily equal to the transmit-path delay differences. That is, with respect to signal reception by the UE, the internal path delays are receiver (RX) path delays internal to the UE and, with respect to signal transmission by the UE, the internal path delays are transmitter (TX) path delays internal to the UE.

With the above in mind, a UE configured for operation with respect to a wireless communication network includes, for example, communication interface circuitry configured for transmitting and receiving signals according to a Radio Access Technology (RAT) of the wireless communication network. Further, the UE includes processing circuitry operatively associated with the communication interface circuitry.

The processing circuitry of the UE is configured to perform at least one of: (a) performing signal-timing measurements involving downlink signals received on different antennas of the UE and compensating the measurements for path delay differences internal to the UE as between the different antennas, and reporting the compensated measurements to the network and/or using them at the UE for positioning-related calculations; (b) performing signal-timing measurements involving downlink signals received on different antennas of the UE and reporting the measurements to the network for positioning-related calculations, along with reporting path delay differences internal to the UE as between the different antennas, for network-based compensation of the measurements; and (c) transmitting uplink signals from the different antennas for use in positioning-related calculations by the network and reporting transmit-path delay differences between the different antennas of the UE.

Figure 9:
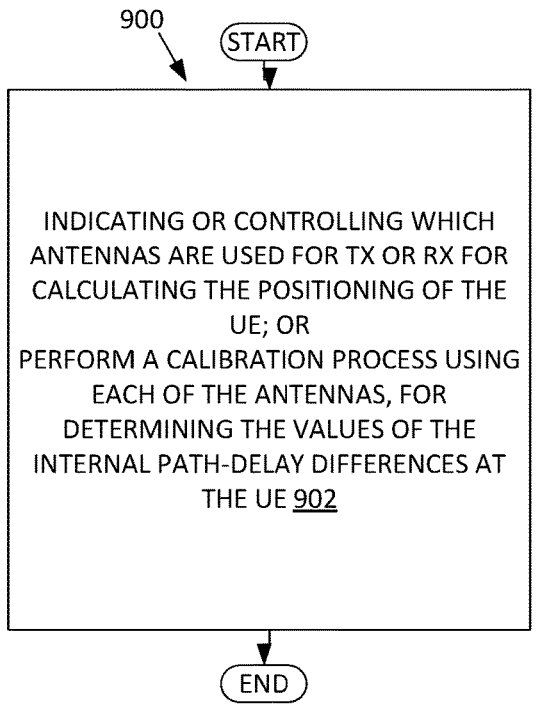

FIG. 9 illustrates another example method of operation 900, wherein (Block 902) a UE cooperates with a wireless communication network with respect to indicating or controlling which antenna or antennas of the UE are used for the transmission or reception of signals between the UE and a plurality of Transmission/Reception Points (TRPs) of the network, for calculating the positioning of the UE, or performs a calibration process that involves the transmission of signals between the UE and one or more of the TRPs, using each of the antennas, for determining the values of the internal path-delay differences at the UE. "Cooperating" with the network comprises, for example, the UE receiving configuration signaling from the network indicating which antennas to use when or with respect to which radio resources, and using the antennas as indicated.

Figure 10:
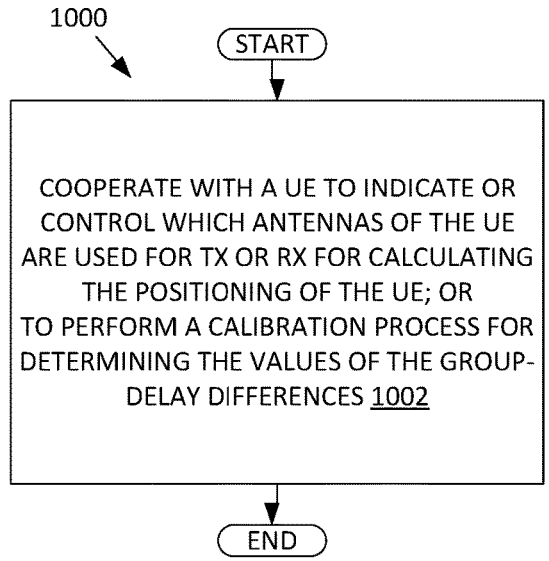

FIG. 10 illustrates an example method 1000 performed by a network node, e.g., by a base station acting as serving base station with respect to a UE targeted for positioning. The method 1000 includes (Block 1002), the network node cooperating with a UE with respect to indicating or controlling which antenna or antennas of the UE are used for the transmission or reception of signals between the UE and a plurality of Transmission/Reception Points (TRPs) of the network, for calculating the positioning of the UE, or performing a calibration process that involves the transmission of signals between the UE and one or more of the TRPs, using each of the antennas, for determining the values of the group-delay differences.

FIG. 11 illustrates another example method 1100 performed by a UE 12, also referred to as a wireless device 12. The method 1100 includes the wireless device 12 performing (Block 1102) reference-signal transmissions or measurements, for positioning of the wireless device 12. "Performing reference-signal transmissions or measurements" means that the wireless device 12 performs reference-signal transmissions, or performs reference-signal measurements, or performs both. Performing reference-signal measurements refers to the wireless device 12 performing measurements on reference signals received at the wireless device 12, e.g., measurements on DL PRS received from one or more TRPs 30.

The method 1100 further includes transmitting (Block 1104) information for a network node involved in the positioning of the wireless device 12. The network node is an LMF 20, for example. The information indicates associations of the reference-signal transmissions or measurements with respective timing groups of the wireless device 12. Each timing group represents a related set of transmission or reception timing errors within the wireless device 12.

Each related set of transmission or reception timing errors are transmission or reception timing errors that are related based on having relative timing-error differences that are smaller than a maximum. The transmission or reception timing errors within the wireless device 12 are related to path-delay or timing-reference differences among multiple transmitter or receiver branches within the wireless device 12.

In an example embodiment, reference-signal transmissions or measurements involving different antennas of the wireless device 12 have different timing-group associations. See, for example, the antennas 88 of the example wireless device 12 ("UE") shown in FIG. 6. Each antenna 88 may be an antenna panel or other array of antenna elements configured for transmit or receive beamforming, with the antenna elements corresponding to a plurality of receiver or transmitting branches—also referred to as receiver or transmitter chains.

There may be different timing errors internal to the wireless device 12 associated with each of the antennas 88, such that timing errors associated with transmitter or receiver paths belonging to a particular one of the antennas 88 being related and constituting a respective timing group of the wireless device 12. Reference-signal transmissions or measurements made using a particular one of the antennas 88 would, therefore, have the same timing-group association. Conversely, reference-signal transmissions or measurements made using different ones of the antennas 88 would have different timing-group associations.

Performing the reference-signal transmissions or measurements comprises, for example, performing Reference Signal Time Difference (RSTD) measurements for two or more downlink reference signals received by the wireless device 12, with the RSTD measurements being associated with one or more timing groups of the wireless device 12. The information indicates the timing-group associations of the RSTD measurements.

The RSTD measurements are associated with one timing group if the two or more downlink reference signals are received on a same antenna 88 of the wireless device 12 and are associated with more than one timing group if respective ones of the two or more downlink reference signals are received on different antennas 88 of the wireless device 12.

Performing the reference-signal transmissions or measurements in another example comprises the wireless device 12 determining reception/transmission (RX/TX) time differences. Here, the information indicates the timing-group associations of the RX/TX time differences.

In another example, performing the reference-signal transmissions or measurements comprises the wireless device 12 performing time difference of arrival (TDOA) measurements on downlink reference signals received at the wireless device. Here, the information indicates the timing-group associations of the downlink TDOA measurements.

Transmitting the information in one or more embodiments comprises the wireless device 12 including the information in a measurement report transmitted by the wireless device 12 to the network node. For example, in a scenario where the wireless device 12 performs reference-signal measurements and sends a report of those measurements to the LMF 20, the wireless device 12 extends or supplements the measurement report by indicating timing-group associations of the measurements. The indications allow, for example, the LMF 20 to determine whether measurements by the wireless device 12 on different DL reference signals involve the same timing group or different timing groups at the wireless device 12.

In another example, performing the reference-signal transmissions or measurements comprises the wireless device 12 performing uplink sounding reference signal (SRS) transmissions. The information indicates the timing-error-group associations of the uplink SRS transmissions. Performing the uplink SRS transmissions comprises, for example, the wireless device 12 transmitting on respective SRS resources, where the information indicates the timing-group associations of the respective SRS resources.

In another example, performing the reference-signal transmissions or measurements comprises the wireless device 12 performing downlink time difference of arrival (TDOA) measurements for downlink reference signals received at the wireless device 12, and transmitting uplink reference signals from the wireless device 12. The information in this example case indicates the timing-group associations of the downlink TDOA measurements and indicates the timing-group associations of the uplink reference-signals.

As noted, the antennas 88 of the wireless device 12 may be antenna panels. Each antenna panel comprises an array of antenna elements for transmit or receive beamforming, and each antenna panel corresponds to a different timing group.

In one or more embodiments, a wireless device 12 comprises communication interface circuitry 80 and processing circuitry 90 configured to use the communication interface circuitry 80 to: perform reference-signal transmissions or measurements, for positioning of the wireless device 12, and transmit information for a network node involved in the positioning of the wireless device 12. The network node is an LMF 20, for example, and the information indicates associations of the reference-signal transmissions or measurements with respective timing groups of the wireless device 12. Each timing group represents a related set of transmission or reception timing errors within the wireless device 12.

To perform the reference-signal transmissions or measurements, the processing circuitry 90 in one or more embodiments is configured to perform Reference Signal Time Difference (RSTD) measurements for two or more downlink reference signals received by the wireless device 12. The RSTD measurements are associated with one or more timing groups of the wireless device 12 and the information indicates the timing-group associations of the RSTD measurements. The RSTD measurements are associated with one timing group if the two or more downlink reference signals are received on a same antenna 88 of the wireless device 12 and are associated with more than one timing group if respective ones of the two or more downlink reference signals are received on different antennas 88 of the wireless device 12.

In another example, to perform the reference-signal transmissions or measurements, the processing circuitry 90 is configured to determine reception/transmission (RX/TX) time differences. Here, the information indicates the timing-group associations of the RX/TX time differences.

To perform the reference-signal transmissions or measurements, the processing circuitry 90 in one or more embodiments is configured to perform time difference of arrival (TDOA) measurements on downlink reference signals received at the wireless device 12. Here, the information indicates the timing-group associations of the downlink TDOA measurements.

The processing circuitry 90 in one or more embodiments is configured to include the information in a measurement report transmitted by the wireless device 12 to the network node.

In another example embodiment or operating scenario, to perform the reference-signal transmissions or measurements, the processing circuitry 90 is configured to perform uplink sounding reference signal (SRS) transmissions. Here, the information indicates the timing-error-group associations of the uplink SRS transmissions. In at least one example, to perform the uplink SRS transmissions, the processing circuitry 90 is configured to transmit on respective SRS resources, and the information indicates the timing-group associations of the respective SRS resources.

To perform the reference-signal transmissions or measurements in another embodiment or another example scenario, the processing circuitry 90 is configured to perform downlink time difference of arrival (TDOA) measurements for downlink reference signals received at the wireless device 12 and transmit uplink reference signals from the wireless device 12. The information indicates the timing-group associations of the downlink TDOA measurements and indicates the timing-group associations of the uplink reference-signals.

As noted, in one or more embodiments, the antennas 88 of the wireless device 12 are antenna panels, with each antenna panel comprising an array of antenna elements for transmit or receive beamforming, and with each antenna panel corresponding to a different timing group.

FIG. 12 illustrates an example method 1200 performed by a network node, such as an LMF 20. The method 1200 includes receiving (Block 1202) information transmitted by the wireless device 12. The information indicates associations of reference-signal transmissions or measurements by the wireless device 12 with respective timing groups of the wireless device 12. The method 1200 further includes accounting (Block 1204) for the different timing-group associations when performing positioning calculations that are based on the reference-signal transmissions or measurements performed by the wireless device 12.

Each timing group represents a related set of transmission or reception timing errors within the wireless device 12. For example, a plurality of timing errors, such as arising from path delays internal to the wireless device 12, are related if the relative differences in timing errors among them do not exceed some maximum value. As a particular example, the wireless device 12 includes a respective plurality of receiver or transmitter chains associated with each antenna 88 among a plurality of antennas 88 of the wireless device 12. One or more characteristic timing errors are common—or within a defined range of relative differences—to each such respective plurality of receiver or transmitter chains, such that the timing errors for each respective plurality may be considered as forming or belonging to a respective timing group.

With the above details in mind, an example "system" comprises a wireless device 12 and a network node, such as an LMF 20.

The example wireless device 12 comprises communication interface circuitry 80 and processing circuitry 90 that is configured to use the communication interface circuitry 80 to: perform reference-signal transmissions or measurements, for positioning of the wireless device 12. The processing circuitry 90 of the wireless device 12 is further configured to transmit information for the network node, which is involved in positioning of the wireless device 12. The information indicates associations of the reference-signal transmissions or measurements with respective timing groups of the wireless device 12, where each timing group represents a related set of transmission or reception timing errors within the wireless device 12.

The network node comprises communication interface circuitry configured to receive the information transmitted by the wireless device 12 and processing circuitry configured to account for the different timing-group associations when performing positioning calculations that are based on the reference-signal transmissions or measurements performed by the wireless device 12. In the LMF-based example, the communication interface circuitry is depicted by reference number 40 in FIG. 6, and the processing circuitry is depicted by reference number 46 in FIG. 6.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 13:
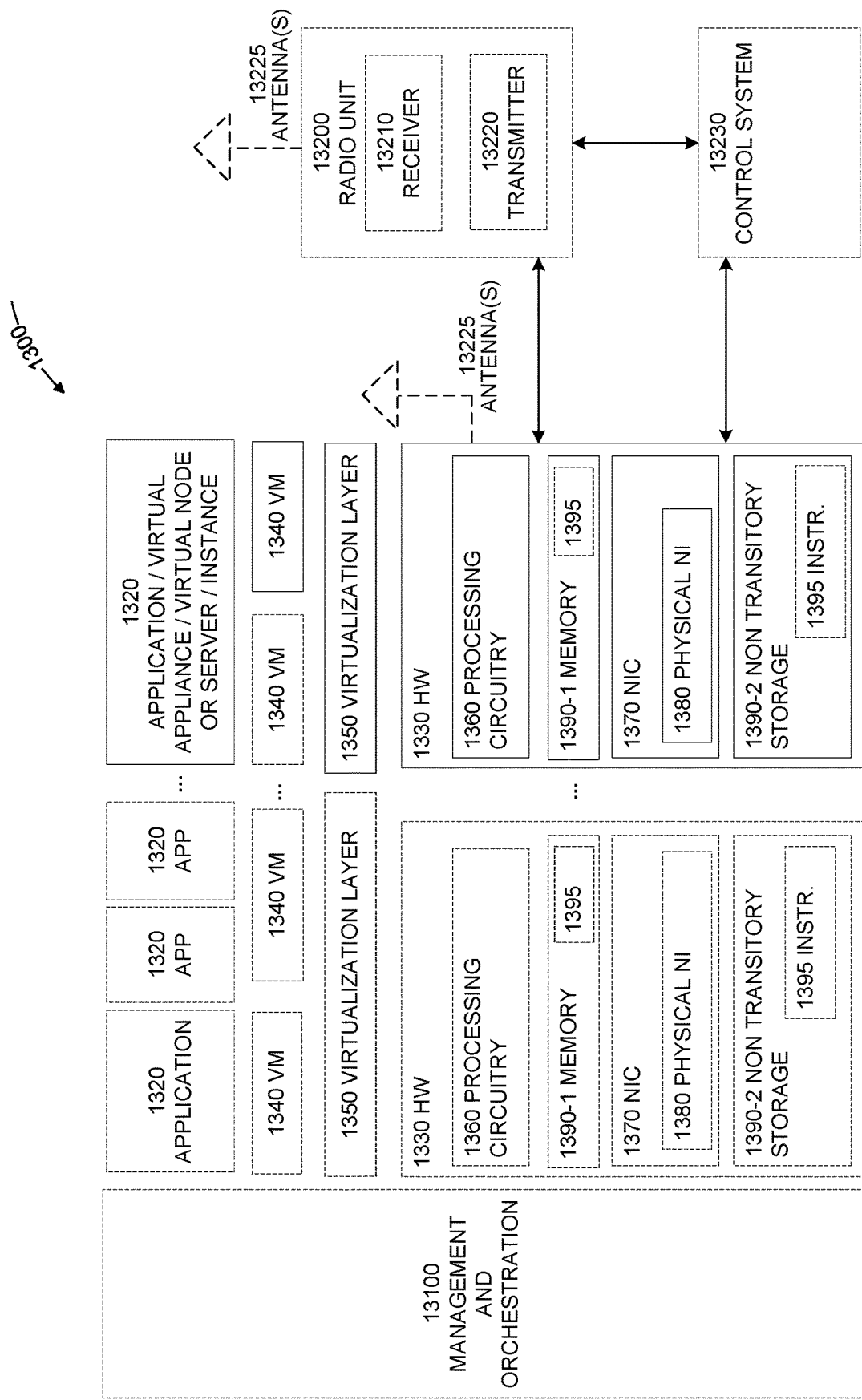
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 14:
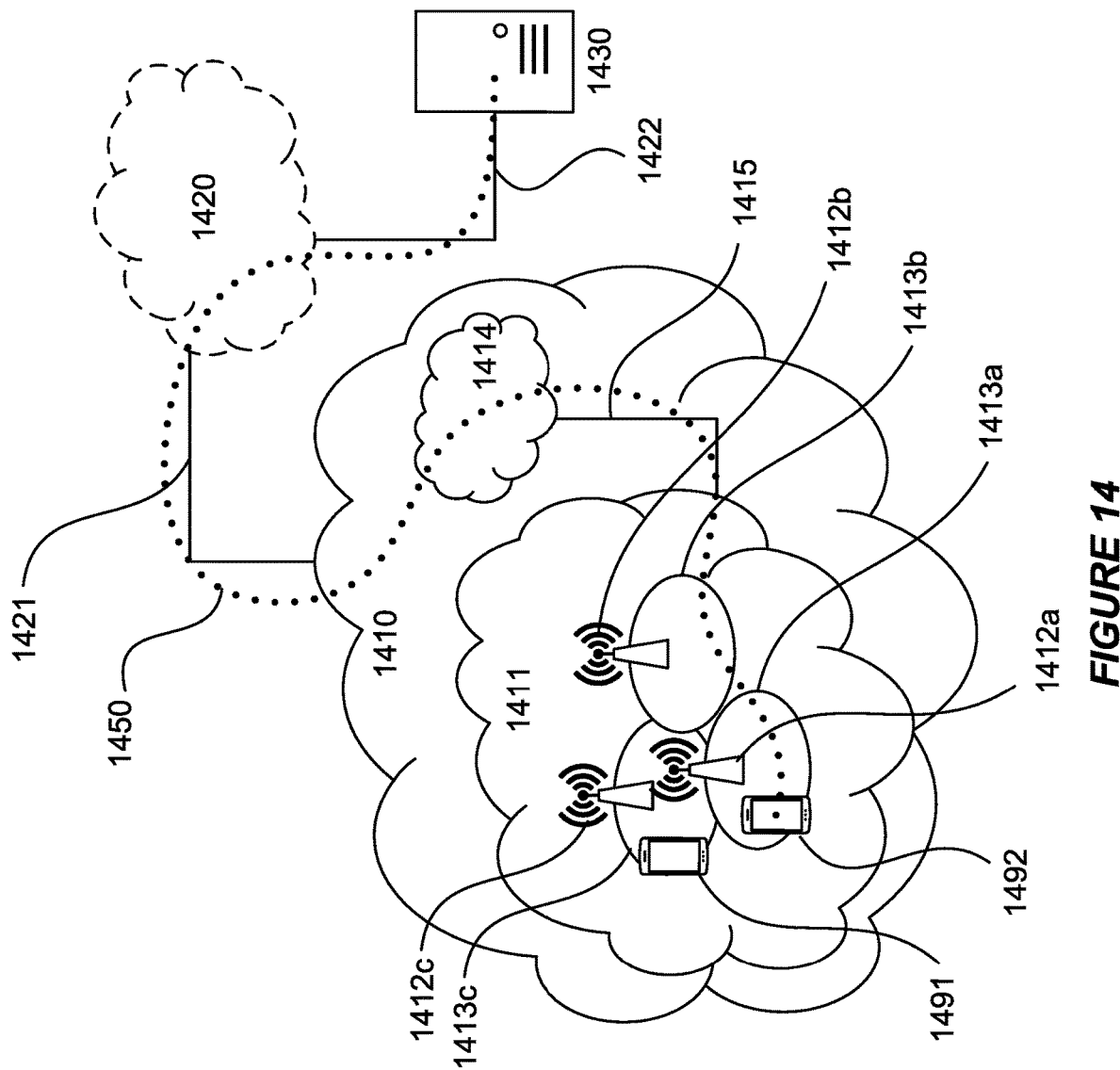
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private, or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
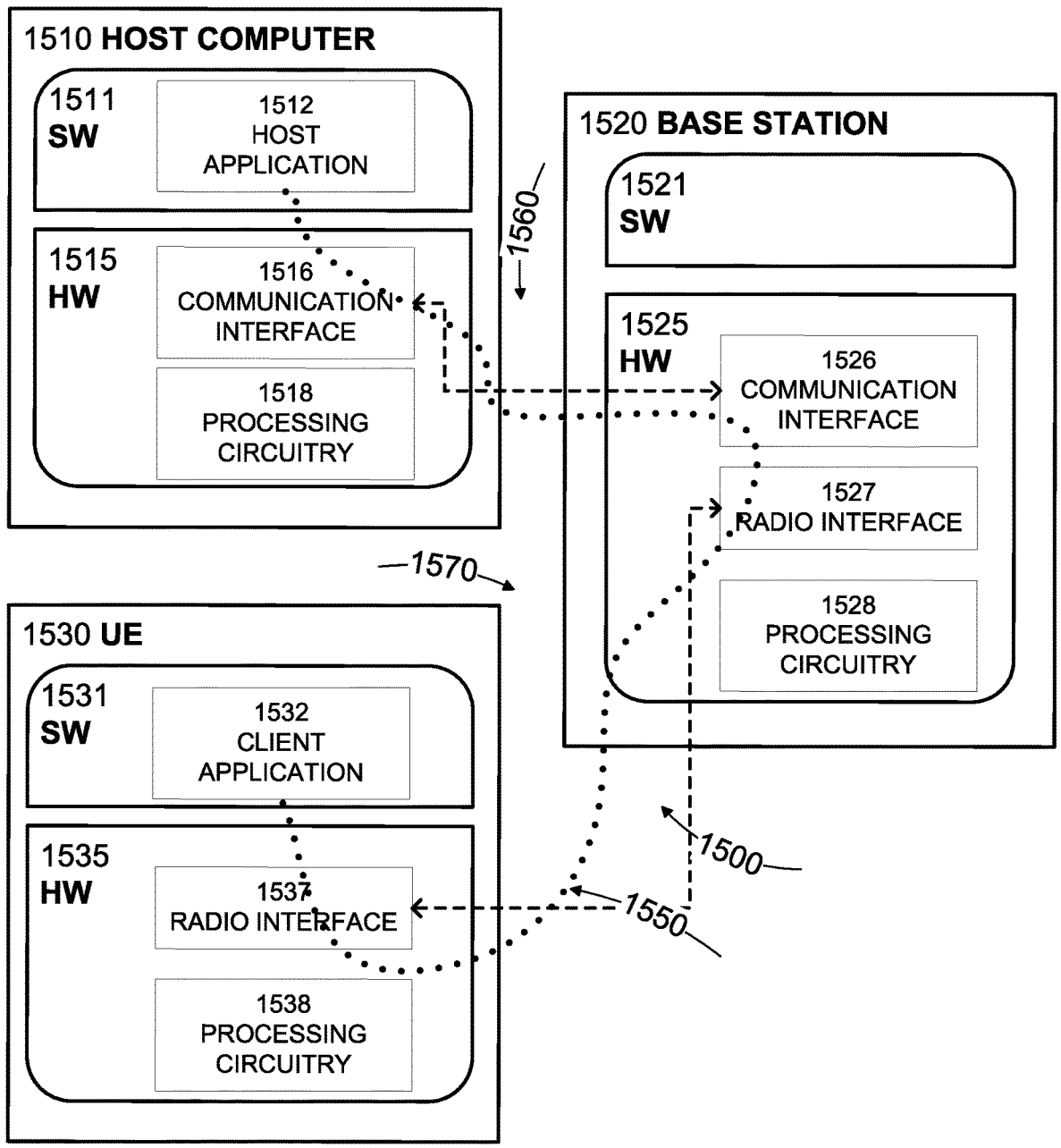
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct, or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment.

A measurement procedure may be provided for the purpose of monitoring data rate, latency, and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above or supplying values of other physical quantities from which software 1511, 1531 may compute or estimate the monitored quantities. The reconfiguring of OT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
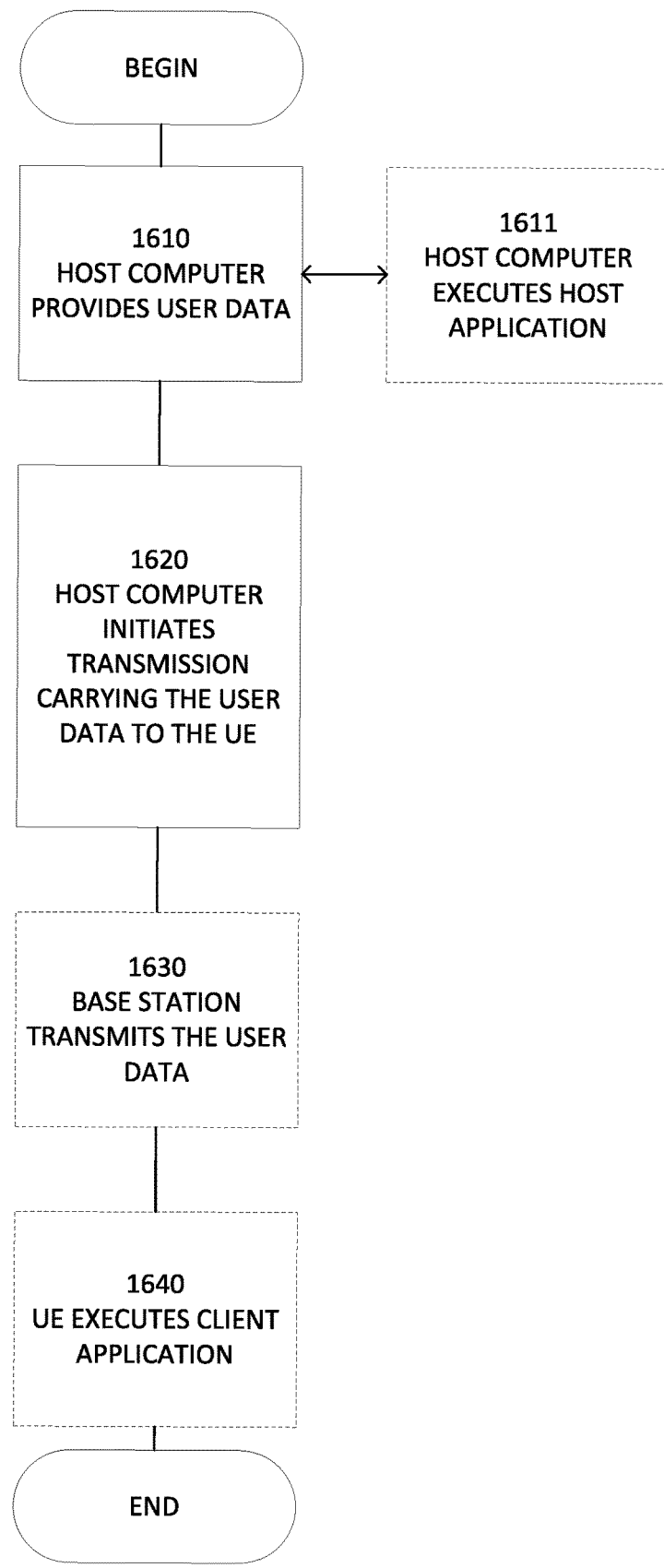
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In sub step 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
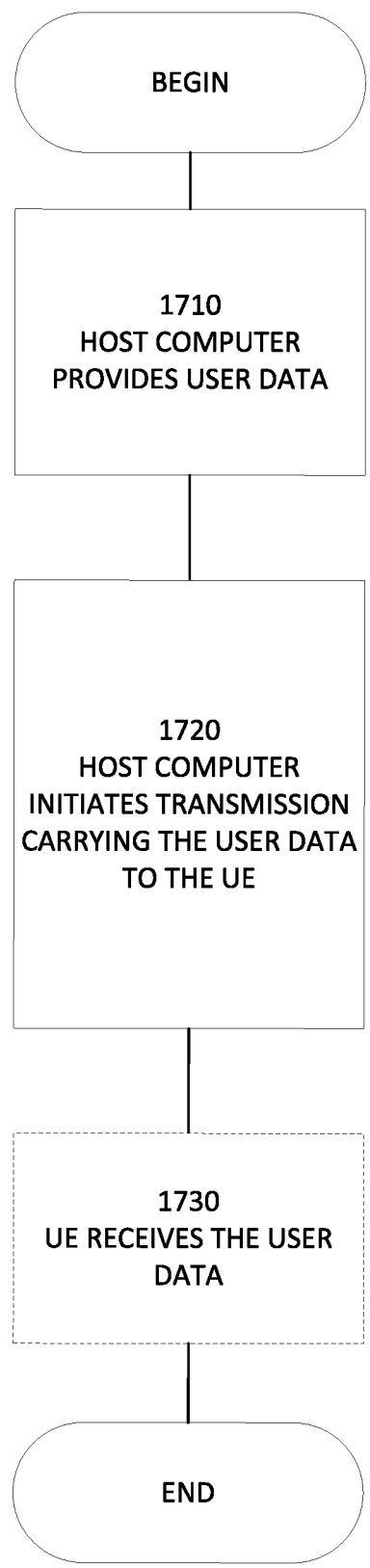
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional sub step (not shown), the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
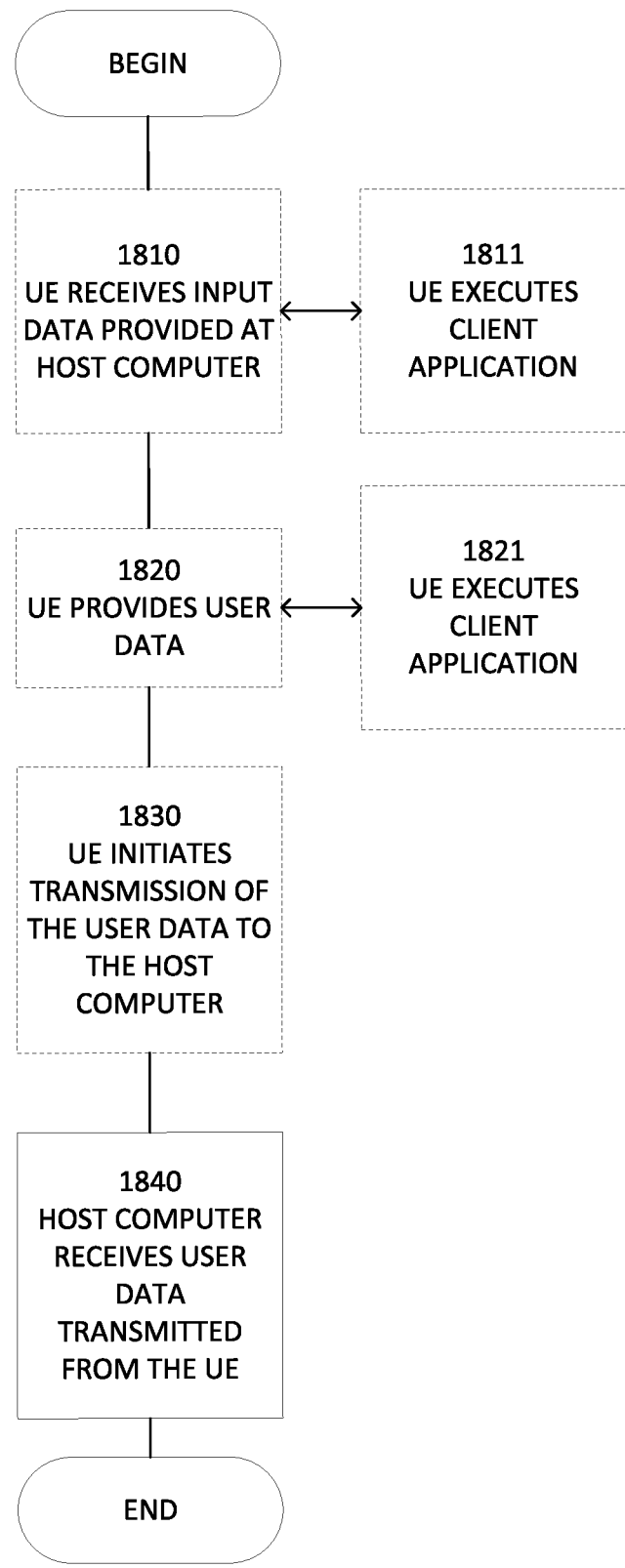
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In sub step 1821 (which may be optional) of step 1820, the UE provides the user data by executing a client application. In sub step 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in sub step 1830 (which may be optional), transmission of the user data to the host computer. In step 1840 of the method, the host computer receives the user data transmitted from the UE, in accordance with the teachings of the embodiments described throughout this disclosure.

Figure 19:
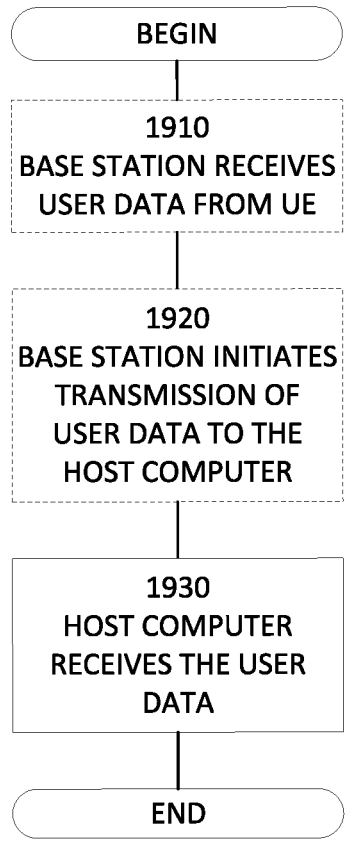
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 20:
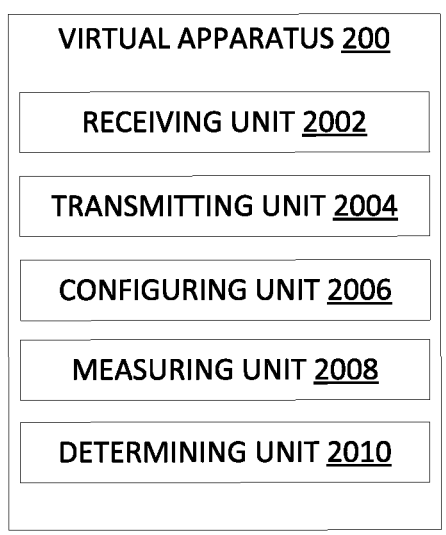
FIGS. 20, 21, and 22 are block diagrams of virtualized apparatuses corresponding to an LMF, a network node of a wireless communication network, and a UE.

For example, FIG. 20 illustrates a virtual apparatus 200 as an example implementation of a virtualized LMF, e.g., the LMF 20 introduced in FIG. 3. The virtual apparatus 200 includes a receiving unit 2002 and a transmitting unit 2004, for communicatively coupling the apparatus 20 to one or more other entities, e.g., a network node 32. The virtual apparatus 200 further includes a configuring unit 2006, e.g., for configuring which TRPs are to be used for positioning a UE or to configure the positioning reference signals (PRS or SRS) to be used in positioning the UE.

The virtual apparatus 200 further includes a measuring unit 2008, which may be configured to carry out positioning measurements for a UE, e.g., based on AOA or TOA measurements made on radio signals going between a UE and one or more TRPs. Still further, the virtual apparatus 200 may include a determining unit 2010, which may be configured to determine, or assist in determining, the values of the inter-antenna timing differences in a UE, for improving the accuracy of positioning measurements made with respect to the UE.

Figure 21:
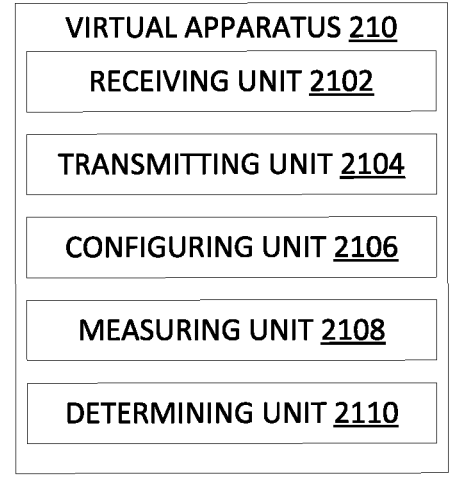

As another example, FIG. 21 illustrates a virtual apparatus 210 as an example implementation of a virtualized network node, e.g., a base station 16 as introduced in FIG. 3 or the further example network nodes shown in FIGS. 4 and 5.

The virtual apparatus 210 includes a receiving unit 2102 and a transmitting unit 2104, for communicatively coupling the apparatus 210 to one or more other entities, e.g., a LMF 20 (via one type of communication circuitry/interface) and a UE 12 (via another type of communication circuitry/interface). The virtual apparatus 210 further includes a configuring unit 2106, e.g., for configuring the transmission of DL PRS or the reception of UL SRS according to configuration information incoming from an LMF 20.

The virtual apparatus 210 further includes a measuring unit 2108, which may be configured to carry out positioning measurements with respect to a UE, e.g., based on AOA or TOA measurements made on radio signals going between a UE and one or more TRPs. Still further, the virtual apparatus 210 may include a determining unit 2110, which may be configured to determine, or assist in determining, the values of the inter-antenna timing differences in a UE, for improving the accuracy of positioning measurements made with respect to the UE.

Figure 22:
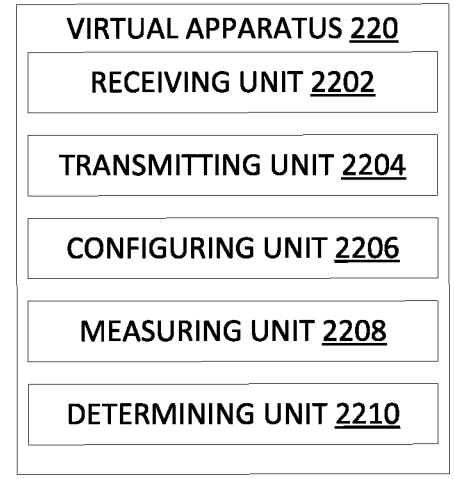

FIG. 22 illustrates a virtual apparatus 220 as an example implementation of a wireless device, e.g., a UE 12 as introduced in FIG. 3.

The virtual apparatus 220 includes a receiving unit 2202 and a transmitting unit 2204, for communicatively coupling the apparatus 220 to one or more other entities, e.g., one or more TRPs 30 via DL/UL radio signals. The virtual apparatus 22 further includes a configuring unit 2206, e.g., for configuring the transmission of UL SRS or the reception of DL PRS according to configuration information incoming from an LMF 20.

The virtual apparatus 220 further includes a measuring unit 2208, which may be configured to carry out positioning measurements, e.g., based on AOA or TOA measurements made on radio signals going between the UE and one or more TRPs. Still further, the virtual apparatus 220 may include a determining unit 2210, which may be configured to determine, or assist in determining, the values of the inter-antenna timing differences in a UE, for improving the accuracy of positioning measurements made with respect to the UE.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station, and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station, and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

FURTHER EXAMPLES

Example 1. A method of accounting for path delay differences internal to the UE as between different antennas of a User Equipment (UE) in signal-timing measurements made for signals transmitted between the UE and a plurality of transmission/reception points (TRPs) of a wireless communication network for positioning of the UE, the method comprising at least one of: avoiding the introduction of systemic errors arising from the internal path delay differences by coordinating, such as by signaling, which antenna is used at the UE with respect to each TRP among the involved TRPs or with respect to each radio resource among a plurality of radio resources configured for conveyance of the signals; and accounting for the systemic errors in positioning-related calculations that are on the signal-timing measurements.

Example 2. The method of example 1, wherein each antenna of the UE is an antenna panel, each antenna panel comprising an array of antenna elements for transmit or receive beamforming, such that the different antennas of the UE are different antenna panels and such that the internal path delay differences are inter-panel timing differences.

Example 3. The method of example 1 or 2, wherein accounting for the systemic errors in the positioning-related calculations comprises compensating the signal-timing measurements using determined values for the internal path delay differences to compensate time-of-arrival measurements made at the UE across the different antennas.

Example 4. The method of example 1 or 2, wherein accounting for the systemic errors in the positioning-related calculations comprises using determined values for the internal path delay differences to compensate time-of-arrival measurements made at one or more of the involved TRPs with respect to the different antennas.

Example 5. The method of example 3 or 4, wherein the determined values for the internal path delay differences are preconfigured values stored in the UE.

Example 6. The method of example 3 or 4, wherein the determined values for the internal path delay differences are determined dynamically, based on the transmission of signals on a per antenna basis between the UE and a same one of the involved TRPs.

Example 7. The method of any of examples 3-6, wherein the method includes performing a calibration procedure for determining the determined values for the internal path delay differences.

Example 8. The method of any of examples 3-7, wherein one of the antennas is designated as a reference antenna and wherein the determined values for the internal path delay differences comprise a relative time difference for each remaining antenna, with respect to the reference antenna.

Example 9. The method of any of examples 3-8, wherein the method is performed in the wireless communication network, by one or more of the involved TRPs or a location server associated with the TRPs, and wherein the method includes the network determining the determined values for the internal path delay differences based on calibration operations between at least one of the TRPs and the UE, or based on the network receiving the determined values for the internal path delay differences via reporting by the UE.

Example 10. The method of example 1, wherein coordinating which antenna is used at the UE with respect to each TRP among the involved TRPs or with respect to each radio resource among the plurality of radio resources configured for conveyance of the signals comprises restricting the signal-timing measurements to use a same one of the antennas of the UE, for all involved TRPs.

Example 11. The method of example 1, wherein accounting for the systemic errors in positioning-related calculations that are on the signal-timing measurements comprises compensating the signal-timing measurements using determined values for the internal path delay differences.

Example 12. The method of example 11, wherein, for determining the determined values for the internal path delay differences, the UE performs a plurality of transmit beam sweeps according to a configuration known to the network, where each transmit beam sweep involves transmission of a reference signal from a particular one of the antennas, as a particular one of the signals transmitted between the UE and the involved TRPs, and the network determines the determined values of the internal path delay differences based on receiving the signals transmitted in the respective transmit beam sweeps.

Example 13. The method of example 1, wherein accounting for the systematic errors comprises accounting for the systematic errors within a system of equations that depends on the signal-timing measurements.

Example 14. The method of example 1, wherein the method includes exchanging signaling between the UE and the network, to indicate which antennas are used with respect to each of the involved TRPs and/or with respect to particular ones among different radio resources that are configured for transmitting the signals.

Example 15. The method of example 1, wherein, in a case where the positioning is based on Downlink (DL) Time of Arrival (TOA) measurements made by the UE with respect to the involved TRPs, the method includes estimating the internal path delay differences based on receiving signals from a same one of the TRPs using each of the antennas, and either compensating raw TOA measurements made by the UE across the different antennas for the estimated internal path delay differences or reporting the raw TOA measurements to the network, along with the estimated internal path delay differences.

Example 16. The method of example 1, wherein, in a case where the positioning is based on Uplink (UL) Time of Arrival (TOA) measurements made by the involved TRPs with respect to the UE, the method includes the network compensating the TOA measurements using values for the internal path delay differences as reported by the UE, or based on the network estimating the internal path delay differences, in dependence on at least one of the involved TRPs receiving signals from each of the antennas.

Example 17. The method of example 1, wherein, in a case where the positioning is based on Uplink (UL) Time of Arrival (TOA) measurements made by the involved TRPs with respect to the UE, the method includes the network compensating the TOA measurements using values for the internal path delay differences as reported by the UE, or based on the network estimating the internal path delay differences, in dependence the involved TRPs collectively receiving signals from each of the antennas.

Example 18. The method of any of examples 1-16, wherein, in a case where the signal-measurements involve signal reception at the UE using the different antennas, the internal path delay differences comprise receiver-path delay differences internal to the UE, and, in a case where the signal measurements involve signal transmission at the UE using the different antennas, the internal path delay differences comprise transmit-path delay differences internal to the UE, and wherein the receiver-path delay differences are not necessarily equal to the transmit-path delay differences.

Example 19. The method of any of examples 1-17 wherein, with respect to signal reception by the UE, the internal path delays are receiver (RX) path delays internal to the UE and, with respect to signal transmission by the UE, the internal path delays are transmitter (TX) path delays internal to the UE.

Example 20. A User Equipment (UE) configured for operation with respect to a wireless communication network, the UE comprising: communication interface circuitry configured for transmitting and receiving signals according to a Radio Access Technology (RAT) of the wireless communication network; and processing circuitry operatively associated with the communication interface circuitry and configured to perform at least one of: performing signal-timing measurements involving downlink signals received on different antennas of the UE and compensating the measurements for path delay differences internal to the UE as between the different antennas, and reporting the compensated measurements to the network and/or using them at the UE for positioning-related calculations; performing signal-timing measurements involving downlink signals received on different antennas of the UE and reporting the measurements to the network for positioning-related calculations, along with reporting path delay differences internal to the UE as between the different antennas, for network-based compensation of the measurements; and transmitting uplink signals from the different antennas for use in positioning-related calculations by the network and reporting transmit-path delay differences between the different antennas of the UE.

Example A1. A method performed by a UE having multiple antennas with path delay differences internal to the UE between or among different ones of the antennas, the method comprising at least one of: cooperating with a wireless communication network with respect to indicating or controlling which antenna or antennas of the UE are used for the transmission or reception of signals between the UE and a plurality of Transmission/Reception Points (TRPs) of the network, for calculating the positioning of the UE; or performing a calibration process that involves the transmission of signals between the UE and one of the TRPs, using each of the antennas, for determining the values of the internal path delay differences.

Example A2. The method of example A1, further comprising reporting capability information to the network, indicating a capability of the UE with respect to the cooperating or performing steps.

Example A3. The method of example A1 or A2, further comprising: performing signal-timing measurements for signals received at the UE from the plurality of TRPs; and compensating the signal-timing measurements for differences in receive-path delays internal to the UE, as said internal path delay differences, or reporting the signal-timing measurements to the network without compensation, and further reporting the differences in receive-path delays, for use by the network in compensating the signal-timing measurements.

Example AA. The method of any of the previous examples, further comprising: providing user data; and forwarding the user data to a host computer via the transmission to a base station.

Example B1. A method performed by a network node, the method comprising: cooperating with a User Equipment (UE) with respect to indicating or controlling which antenna or antennas of the UE are used for the transmission or reception of signals between the UE and a plurality of Transmission/Reception Points (TRPs) of the network, for calculating the positioning of the UE; or performing a calibration process that involves the transmission of signals between the UE and one of the TRPs, using each of the antennas, for determining the values of internal path delay differences internal to the UE between or among different ones of multiple antennas of the UE that are involved in the transmission of the signals.

Example B2. The method of example B1, further comprising receiving capability information from the UE, indicating a capability of the UE with respect to the cooperating or performing steps.

Example B3. The method of example B1 or B2, further comprising compensating signal-timing measurements for signals received from the UE at the plurality of TRPs, based on the determined values of the internal path delay differences.

Example B4. The method of any of examples B1-B3, further comprising receiving the determined values of the internal path delay differences from the UE and compensating signal-timing measurements made by the UE, using the determined-values of the internal path delay differences.

Example B5. The method of any of examples B1-B4, wherein the network node is a radio network node.

Example BB. The method of any of the previous examples, further comprising: obtaining user data; and forwarding the user data to a host computer or a wireless device.

Example C1. A wireless device configured to perform any of the steps of any of the Group A examples.

Example C2. A wireless device comprising processing circuitry configured to perform any of the steps of any of the Group A examples.

Example C3. A wireless device comprising: communication circuitry; and processing circuitry configured to perform any of the steps of any of the Group A examples.

Example C4. A wireless device comprising: processing circuitry configured to perform any of the steps of any of the Group A examples; and power supply circuitry configured to supply power to the wireless device.

Example C5. A wireless device comprising: processing circuitry and memory, the memory containing instructions executable by the processing circuitry whereby the wireless device is configured to perform any of the steps of any of the Group A examples.

Example C6. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example C7. A computer program comprising instructions which, when executed by at least one processor of a wireless device, causes the wireless device to carry out the steps of any of the Group A examples.

Example C8. A carrier containing the computer program of example C7, wherein the carrier is one of an electronic signal, optical signal, radio signal, or computer readable storage medium.

Example C9. A network node configured to perform any of the steps of any of the Group B examples.

Example C10. A network node comprising processing circuitry configured to perform any of the steps of any of the Group B examples.

Example C11. A network node comprising: communication circuitry; and processing circuitry configured to perform any of the steps of any of the Group B examples.

Example C12. A network node comprising: processing circuitry configured to perform any of the steps of any of the Group B examples; and power supply circuitry configured to supply power to the radio network node.

Example C13. A network node comprising: processing circuitry and memory, the memory containing instructions executable by the processing circuitry whereby the radio network node is configured to perform any of the steps of any of the Group B examples.

Example C14. The network node of any of examples C9-C13, wherein the network node is a base station or other radio network node.

Example C15. A computer program comprising instructions which, when executed by at least one processor of a network node, causes the network node to carry out the steps of any of the Group B examples.

Example C16. The computer program of example C14, wherein the network node is a base station or other radio network node.

Example C17. A carrier containing the computer program of any of examples C15-C16, wherein the carrier is one of an electronic signal, optical signal, radio signal, or computer readable storage medium.

Example D1. A communication system including a host computer comprising: processing circuitry configured to provide user data; and a communication interface configured to forward the user data to a cellular network for transmission to a user equipment (UE), wherein the cellular network comprises a network node having processing circuitry, the network node's processing circuitry configured to perform any of the steps of any of the Group B examples.

Example D2. The communication system of the previous example further including the network node.

Example D3. The communication system of the previous 2 examples, further including the UE, wherein the UE is configured to communicate with the network node.

Example D4. The communication system of the previous 3 examples, wherein: the processing circuitry of the host computer is configured to execute a host application, thereby providing the user data; and the UE comprises processing circuitry configured to execute a client application associated with the host application.

Example D5. A method implemented in a communication system including a host computer, a network node and a user equipment (UE), the method comprising: at the host computer, providing user data; and at the host computer, initiating a transmission carrying the user data to the UE via a cellular network comprising the network node, wherein the network node performs any of the steps of any of the Group B examples.

Example D6. The method of the previous example, further comprising, at the network node, transmitting the user data.

Example D7. The method of the previous 2 examples, wherein the user data is provided at the host computer by executing a host application, the method further comprising, at the UE, executing a client application associated with the host application.

Example D8. A user equipment (UE) configured to communicate with a network node, the UE comprising a radio interface and processing circuitry configured to perform any of the previous 3 examples.

Example D9. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

Example D10. The communication system of the previous example, wherein the cellular network further includes a network node configured to communicate with the UE.

Example D11. The communication system of the previous 2 examples, wherein: the processing circuitry of the host computer is configured to execute a host application, thereby providing the user data; and the UE's processing circuitry is configured to execute a client application associated with the host application.

Example D12. A method implemented in a communication system including a host computer, a network node, and a user equipment (UE), the method comprising: at the host computer, providing user data; and at the host computer, initiating a transmission carrying the user data to the UE via a cellular network comprising the network node, wherein the UE performs any of the steps of any of the Group A examples.

Example D13. The method of the previous example, further comprising at the UE, receiving the user data from the network node.

Example D14. A communication system including a host computer comprising: communication interface configured to receive user data originating from a transmission from a user equipment (UE) to a network node, wherein the UE comprises a radio interface and processing circuitry, the UE's processing circuitry configured to perform any of the steps of any of the Group A examples.

Example D15. The communication system of the previous example, further including the UE.

Example D16. The communication system of the previous 2 examples, further including the network node, wherein the network node is a base station comprising a radio interface configured to communicate with the UE and a communication interface configured to forward to the host computer the user data carried by a transmission from the UE to the network node.

Example D17. The communication system of the previous 3 examples, wherein: the processing circuitry of the host computer is configured to execute a host application; and the UE's processing circuitry is configured to execute a client application associated with the host application, thereby providing the user data.

Example D18. The communication system of the previous 4 examples, wherein: the processing circuitry of the host computer is configured to execute a host application, thereby providing request data; and the UE's processing circuitry is configured to execute a client application associated with the host application, thereby providing the user data in response to the request data.

Example D19. A method implemented in a communication system including a host computer, a network node and a user equipment (UE), the method comprising: at the host computer, receiving user data transmitted to the network node from the UE, wherein the UE performs any of the steps of any of the Group A examples.

Example D20. The method of the previous example, further comprising, at the UE, providing the user data to the network node.

Example D21. The method of the previous 2 examples, further comprising: at the UE, executing a client application, thereby providing the user data to be transmitted; and at the host computer, executing a host application associated with the client application.

Example D22. The method of the previous 3 examples, further comprising: at the UE, executing a client application; and at the UE, receiving input data to the client application, the input data being provided at the host computer by executing a host application associated with the client application, wherein the user data to be transmitted is provided by the client application in response to the input data.

Example D23. A communication system including a host computer comprising a communication interface configured to receive user data originating from a transmission from a user equipment (UE) to a network node, wherein the network node comprises processing circuitry configured to perform any of the steps of any of the Group B examples.

Example D24. The communication system of the previous example further including the network node.

Example D25. The communication system of the previous 2 examples, further including the UE, wherein the UE is configured to communicate with the network node.

Example D26. The communication system of the previous 3 examples, wherein: the processing circuitry of the host computer is configured to execute a host application; and the UE is configured to execute a client application associated with the host application, thereby providing the user data to be received by the host computer.

Example D27. A method implemented in a communication system including a host computer, a network node and a user equipment (UE), the method comprising: at the host computer, receiving, from the network node, user data originating from a transmission which the network node has received from the UE, wherein the UE performs any of the steps of any of the Group A examples.

Example D28. The method of the previous example, further comprising at the network node, receiving the user data from the UE.

Example D29. The method of the previous 2 examples, further comprising at the network node, initiating a transmission of the received user data to the host computer.

Example D30. The method of any of the Group D examples, wherein the network node is a location server or a base station that operates as or is associated with a Transmission/Reception Point (TRP) used for exchanging signals with the UE.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed by a wireless device, the method comprising:
performing reference-signal transmissions or measurements, for positioning of the wireless device; and
transmitting information for a network node involved in the positioning of the wireless device, the information indicating associations of the reference-signal transmissions or measurements with respective timing groups of the wireless device, each timing group representing a related set of transmission or reception timing errors within the wireless device.

2. The method of claim 1, wherein each related set of transmission or reception timing errors are transmission or reception timing errors that are related based on having relative timing-error differences that are smaller than a maximum.

3. The method of claim 1, wherein the transmission or reception timing errors within the wireless device are related to path-delay or timing-reference differences among multiple transmitter or receiver branches within the wireless device.

4. The method of claim 1, wherein reference-signal transmissions or measurements involving different antennas of the wireless device have different timing-group associations.

5. The method of claim 1, wherein reference-signal transmissions or measurements involving the same antenna of the wireless device have the same timing-group association.

6. The method of claim 1, wherein performing the reference-signal transmissions or measurements comprises measuring times of arrival for downlink reference signals from two or more transmission points of a wireless communication network associated with the network node, wherein the wireless device transmits a time-difference-of-arrival (TDOA) report containing reference signal time difference (RSTD) measurements for respective pairs of the two or more transmission points.

7. The method of claim 6, wherein transmitting the information comprises including the information in the TDOA report, the information indicating timing-group associations of the time-of-arrival measurements used to determine the RSTD measurements.

8. The method of claim 1, wherein performing the reference-signal transmissions or measurements comprises determining reception/transmission (RX/TX) time differences, and wherein the information indicates the timing-group associations of the RX/TX time differences.

9. The method of claim 1, wherein performing the reference-signal transmissions or measurements comprises performing uplink sounding reference signal (SRS) transmissions, and wherein the information indicates the timing-error-group associations of the uplink SRS transmissions.

10. The method of claim 9, wherein performing the uplink SRS transmissions comprises transmitting on respective SRS resources, and wherein the information indicates the timing-group associations of the respective SRS resources.

11. The method of claim 1, wherein performing the reference-signal transmissions or measurements comprises performing downlink time difference of arrival (TDOA) measurements for downlink reference signals received at the wireless device, and transmitting uplink reference signals from the wireless device, and wherein the information indicates the timing-group associations of the downlink TDOA measurements and indicates the timing-group associations of the uplink reference-signals.

12. The method of claim 1, wherein the wireless device has multiple antenna panels, with each antenna panel comprising an array of antenna elements for transmit or receive beamforming, and with each antenna panel corresponding to a different timing group.

13. A wireless device comprising:
communication interface circuitry; and
processing circuitry configured to use the communication interface circuitry to:
- perform reference-signal transmissions or measurements, for positioning of the wireless device; and
- transmit information for a network node involved in the positioning of the wireless device, the information indicating associations of the reference-signal transmissions or measurements with respective timing groups of the wireless device, each timing group representing a related set of transmission or reception timing errors within the wireless device.

14. A method performed by a network node, the method comprising:
receiving information transmitted by a wireless device, wherein the information indicates associations of reference-signal transmissions or measurements by the wireless device with respective timing groups of the wireless device, each timing group representing a related set of transmission or reception timing errors within the wireless device.

15. The method of claim 14, further comprising:
accounting for the different timing-group associations when performing positioning calculations that are based on the reference-signal transmissions or measurements performed by the wireless device.

16. The method of claim 14, wherein a plurality of timing errors are related if the relative differences in timing errors among them do not exceed some maximum value.

17. The method of claim 14, wherein the wireless device includes a respective plurality of receiver or transmitter chains associated with each antenna among a plurality of antennas of the wireless device.

18. The method of claim 17, wherein one or more characteristic timing errors are common, or within a defined range of relative differences, in each respective plurality of receiver or transmitter chains, such that each respective plurality forms one of the respective timing groups.

19. The method of claim 14, wherein the method is performed by a location management function.

20. A system comprising:
a wireless device comprising:
  communication interface circuitry; and
  processing circuitry configured to use the communication interface circuitry to:
    perform reference-signal transmissions or measurements, for positioning of the wireless device; and
    transmit information for a network node involved in the positioning of the wireless device, the information indicating associations of the reference-signal transmissions or measurements with respective timing groups of the wireless device, each timing group representing a related set of transmission or reception timing errors within the wireless device; and
the network node, which comprises:
  communication interface circuitry configured to receive the information transmitted by the wireless device; and
  processing circuitry configured to account for the different timing-group associations when performing positioning calculations that are based on the reference-signal transmissions or measurements performed by the wireless device.

* * * * *